(12) United States Patent
Robinson et al.

(10) Patent No.: US 8,356,077 B2
(45) Date of Patent: Jan. 15, 2013

(54) LINKING USERS INTO LIVE SOCIAL NETWORKING INTERACTIONS BASED ON THE USERS' ACTIONS RELATIVE TO SIMILAR CONTENT

(75) Inventors: Jack D. Robinson, Vacaville, CA (US); Peter Muller, Woodside, CA (US); Timothy Noke, Los Gatos, CA (US); Teng Lew Lim, Toronto (CA); Wallace Glausi, Portland, OR (US); James Cluff, Saint George, UT (US); Larry Fullerton, New Hope, AL (US)

(73) Assignee: ADDnCLICK, Inc., Vacaville, CA (US)

( * ) Notice: Subject to any disclaimer, the term of this patent is extended or adjusted under 35 U.S.C. 154(b) by 0 days.

(21) Appl. No.: 13/546,383

(22) Filed: Jul. 11, 2012

(65) Prior Publication Data

US 2012/0278740 A1    Nov. 1, 2012

Related U.S. Application Data

(63) Continuation of application No. 13/332,835, filed on Dec. 21, 2011, now Pat. No. 8,244,830, which is a continuation of application No. 11/982,707, filed on Nov. 2, 2007, now Pat. No. 8,117,281, which is a continuation-in-part of application No. 09/686,206, filed on Oct. 10, 2000, now abandoned.

(60) Provisional application No. 60/856,404, filed on Nov. 2, 2006.

(51) Int. Cl.
*G06F 15/16* (2006.01)
(52) U.S. Cl. .................... 709/207; 709/224; 715/757
(58) Field of Classification Search .................. 709/207, 709/224
See application file for complete search history.

*Primary Examiner* — Wing F Chan
*Assistant Examiner* — Andrew Woo
(74) *Attorney, Agent, or Firm* — Ater Wynne LLP

(57) ABSTRACT

A system and method that uses interne content and/or content metadata as a means to establish social networks. Examples include linking internet users, searchers, viewers and/or listeners of the same and/or similar internet content to each other via a platform that enables any of the following in n-dimensional environments: social networking, communications, sharing, e-commerce, advertising, search, hosting and registry services, push and pull applications, anonymous communications, and rich presence.

14 Claims, 125 Drawing Sheets

Joining the ADDnCLICK Community

Referral from a Sponsoring Website (i.e., from a Website that is licensing the use of the ADDnCLICK application for their users in return for revenue sharing with ADDnCLICK):

(1) Click on referral link and be brought to ADDnCLICK website.

(2) Register user information.

(3) Download ADDnCLICK application.

ADDnCLICK™ — A New Means of Social Networking, Communications, Search, Sharing, eCommerce, Advertising, and Insertion of Brand Advertising

Fig. 1B

Joining the ADDnCLICK Community

Referral from a Sponsoring Search Engine (i.e., from a search engine (such as Google) that is licensing the use of the ADDnCLICK application for their users in return for revenue sharing with ADDnCLICK):

(1) Click on referral link and be brought to ADDnCLICK website.

(2) Register user information.

(3) Download ADDnCLICK application.

ADDnCLICK™ — A New Means of Social Networking, Communications, Search, Sharing, eCommerce, Advertising, and Insertion of Brand Advertising

Fig. 1C

Joining the ADDnCLICK Community

Referral from a Friend (i.e., in return for revenue sharing with ADDnCLICK):

(1) Click on referral link and be brought to ADDnCLICK website.

(2) Register user information.

(3) Download ADDnCLICK application.

ADDnCLICK™  Fig. 1D  A New Means of Social Networking, Communications, Search, Sharing, eCommerce, Advertising, and Insertion of Brand Advertising

Registering & Sharing Content with the ADDnCLICK community

Drag-and-drop content into the registration area of the PCW or the ADDnCLICK toolbar to register the location of the content (i.e., what server it is being stored on).

Tag the content (i.e., insert words (metadata) that describe the content).

Upload the content onto ADDnCLICK's servers or to other servers. The URLs and metadata of the content are stored on ADDnCLICK registry servers.

ADDnCLICK™ — A New Means of Social Networking, Communications, Search, Sharing, eCommerce, Advertising, and Insertion of Brand Advertising

Fig. 1L

Explore the ADDnCLICK Community

Linking content to ADDnCLICK rooms.

Rooms are categorized as:
- Public
- Discussion
- Shared
- Private
- Sponsored

ADDnCLICK™ Fig. 1Q — A New Means of Social Networking, Communications, Search, Sharing, eCommerce, Advertising, and Insertion of Brand Advertising

Communicate Within the ADDnCLICK Community

Integrated existing tools into the ADDnCLICK application:

Email
    Text Chat
        Instant Messaging (IM)
        Short Message Service (SMS)
        (for portable devices)
    VoIP
    Video Chat
    Video Conferencing ADDnCLICK™ — A New Means of Social Networking, Communications, Search, Sharing, eCommerce, Advertising, and Insertion of Brand Advertising

Fig. 1CC

ADDnCLICK Anonymous Communications

A subscriber establishes an account with a server and establishes an associated token. The subscriber then publishes the token associated with information of interest, e.g. an advertisement for an item, an online auction item, a persona ad, or other information. The publication media may be any media, e.g. newspapers, magazines, flyers, radio, television, web page, e-mail, online auction, direct mail, public address announcement, or any other media. The subscriber then receives a call from a caller, the call being established by the server base on the token provided by the caller. Once the call is terminated, the subscriber may further initiate an anonymous callback to the caller, if the caller established callback information with the server. In one embodiment, the caller may establish a token with the server for callback purposes.

ADDnCLICK™ — A New Means of Social Networking, Communications, Search, Sharing, eCommerce, Advertising, and Insertion of Brand Advertising

Fig. 1FF

ADDnCLICK Anonymous Communications cont.

The caller observes the interesting information and notes the associated contact information for the server together with the token. The caller then calls the server and provides the token. The caller also typically is given a brief explanation of the system and is offered an opportunity to provide callback information anonymously. If the subscriber is successfully contacted, the caller then is connected to the subscriber for a conversation. Once the conversation is completed, the caller may be offered further options, e.g. anonymous callback. If the subscriber cannot be contacted, the caller may be offered voice mail and may again be offered anonymous callback.

ADDnCLICK™ — A New Means of Social Networking, Communications, Search, Sharing, eCommerce, Advertising, and Insertion of Brand Advertising

Fig. 1GG

ADDnCLICK Revenue Models

- Contextual ads (delivered from existing search engines.

- Registration fees for public rooms (private rooms are free)

- Hosting fees for public rooms (private rooms are free)

- Referral fees from sales to user (refer to "clickability" feature)

- Sale of virtual objects for virtual rooms.

- Revenue sharing from e-commerce within the ADDnCLICK room.

ADDnCLICK™ — A New Means of Social Networking, Communications, Search, Sharing, eCommerce, Advertising, and Insertion of Brand Advertising

Fig. 1HH

ADDnCLICK Revenue Models continued

- When users have registered with ADDnCLICK, have made content "clickable" and a click on that content results in a sale, that user plus ADDnCLICK will receive a referral fee.

(ADDnCLICK makes "clickable" content to be shared socially while at the same time making it trackable for recognition of any resulting sale)

ADDnCLICK™ — A New Means of Social Networking, Communications, Search, Sharing, eCommerce, Advertising, and Insertion of Brand Advertising

Fig. 1II

ADDnCLICK Revenue Models continued

- ADDnCLICK provides a paid commercial service that creates clickable areas/objects in still and motion images that allows users to buy products/services they see by simply clicking on the areas/objects.

(The clickable features can be inserted post-production for existing material or during production of the content)

ADDnCLICK™ — A New Means of Social Networking, Communications, Search, Sharing, eCommerce, Advertising, and Insertion of Brand Advertising

Fig. 1JJ

ADDnCLICK "Clickability" Feature

Technology for sponsors to define "clickable" content within photos and video for theirs or related products.

Content that is clicked could be seen in several ways:

- The user could be sent to a full screen of the linked content
- The user could see a small preview next to the content
- The user could save the link into an "media tray" to be viewed at a later time ADDnCLICK™ A New Means of Social Networking, Communications, Search, Sharing, eCommerce, Advertising, and Insertion of Brand Advertising

Fig. 1KK

Summary Documentation 1

Web communities (such as Google, etc.) will want to register the location and metadata (descriptive language tags) of their content with ADDnCLICK (typically done by their users) who (along with the Web Community) will be compensated (by revenue sharing) for registering the content with AnC). In this way, we are a Web 2.0 company -- the web users build, monitor & maintain the database that stores on our registry servers the location and description of the web content.

ADDnCLICK™ — A New Means of Social Networking, Communications, Search, Sharing, eCommerce, Advertising, and Insertion of Brand Advertising

Fig. 1SS

Summary Documentation 2

When an internet user clicks on content that has been registered with ADDnCLICK, they will be invited to download the ADDnCLICK application to their desktop (or to their mobile phone, PDA or other internet-connected device) to link the content they are viewing with social networking, communications, ecommerce, news, etc.

ADDnCLICK™ — A New Means of Social Networking, Communications, Search, Sharing, eCommerce, Advertising, and Insertion of Brand Advertising

Fig. 1TT

Summary Documentation 3

The AnC application that is downloaded to the user's computer will install a Persistent Client Window that will always reside (as an opened window) on the desktop of the user's computer.

ADDnCLICK™ — A New Means of Social Networking, Communications, Search, Sharing, eCommerce, Advertising, and Insertion of Brand Advertising

Fig. 1UU

Summary Documentation 4

The Persistent Client Window(PCW) (that resides on the user's desktop as an opened window) has browser type qualities (search, messaging, etc.) that help the user to define and "push" information that is of importance to him. For any website, if they were to invite and sponsor the use of the ADDnCLICK application with their viewers, the PCW would "push" the specific news, ecommerce and other topics that their individual viewers are interested in receiving. What is most important (and it is not being done by any application on the internet today) is that their content is being pushed into an always-open and live window on the user's desktop or other display. This will give these websites the chance to be the first thing that their users see when they turn their computer on (along with whatever else the user has on their desktop).

ADDnCLICK™ — A New Means of Social Networking, Communications, Search, Sharing, eCommerce, Advertising, and Insertion of Brand Advertising

Fig. 1VV

Summary Documentation 5

Once the PCW has been installed on the user's desktop, then when an internet user clicks onto content that has been registered with AnC, a separate window/room will open on the user's desktop that contains a thumbnail-size representation of the content they have clicked on as well as their user ID information. The AnC application will link (into that same room) other AnC members who have clicked on the same or similar content -- bringing with them the thumbnails of the content that they have clicked in. This is a unique way to link content with social networking -- the AnC users can communicate with others on the topic of the content they have clicked on, they can simultaneous view the content together and communicate with each other, they can simultaneous move from one room to another to explore other links related to their subject, etc. Users can drag and drop content into the AnC window/room to share with others in the AnC window/room. Users can create their private AnC rooms for archiving content for their personal use or for bookmarking.

ADDNCLICK™   A New Means of Social Networking, Communications, Search, Sharing, eCommerce, Advertising, and Insertion of Brand Advertising

Fig. 1WW

Summary Documentation 6

The ADDnCLICK application will exist as a huge underlayer connecting all content of the entire internet to push applications and for social networking, ecommerce, ad revenue opportunities, etc.

ADDnCLICK™  Fig. 1XX   A New Means of Social Networking, Communications, Search, Sharing, eCommerce, Advertising, and Insertion of Brand Advertising

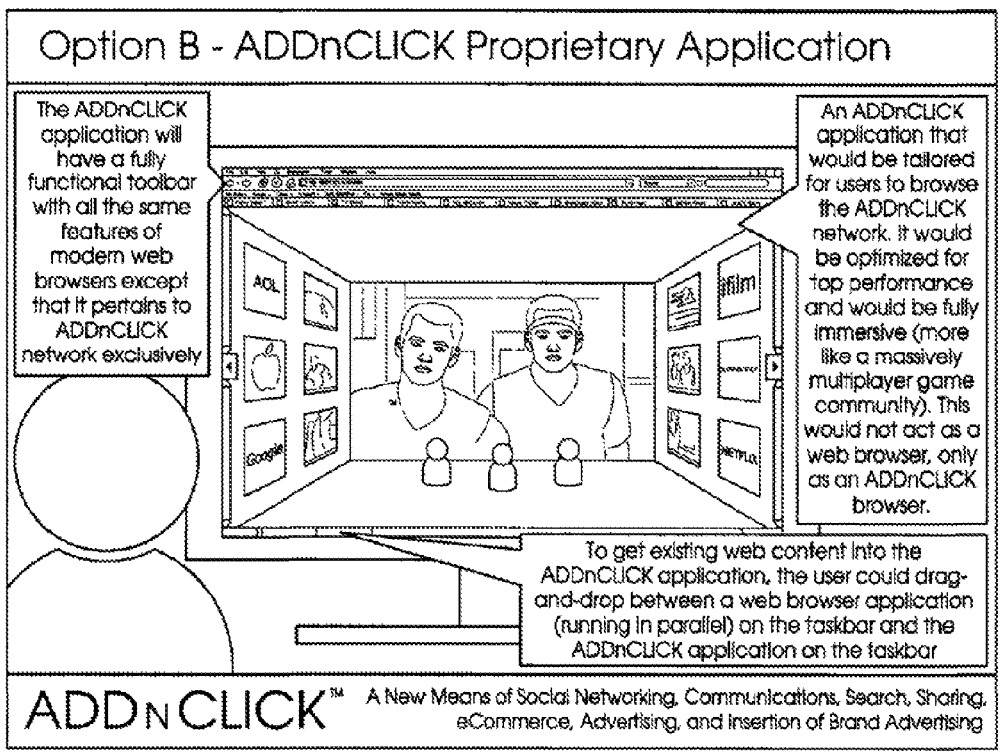
Fig. 1AAA

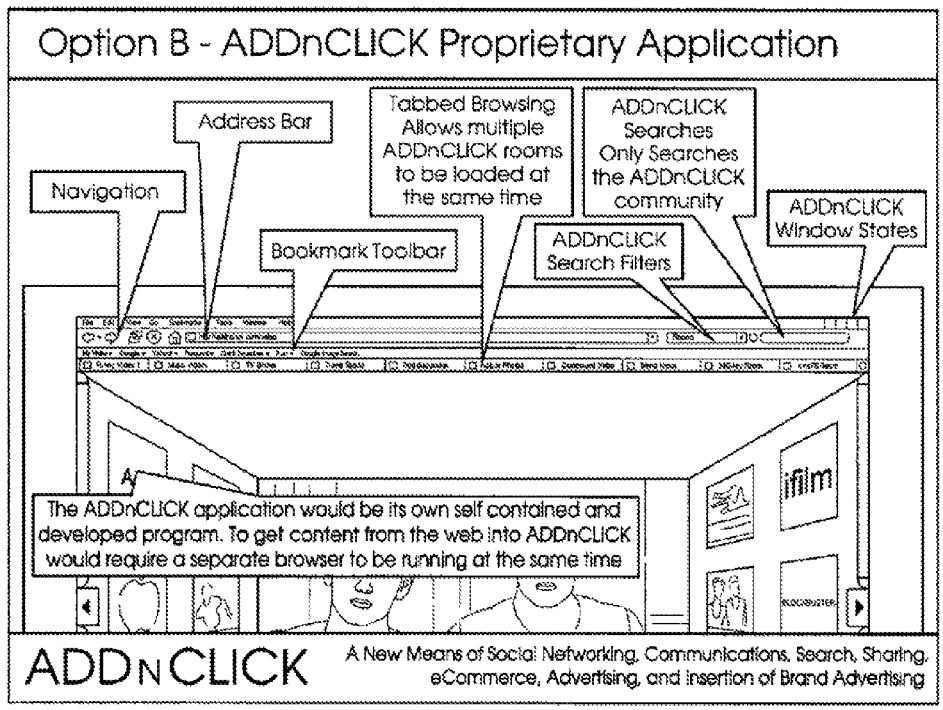
Fig. 1BBB

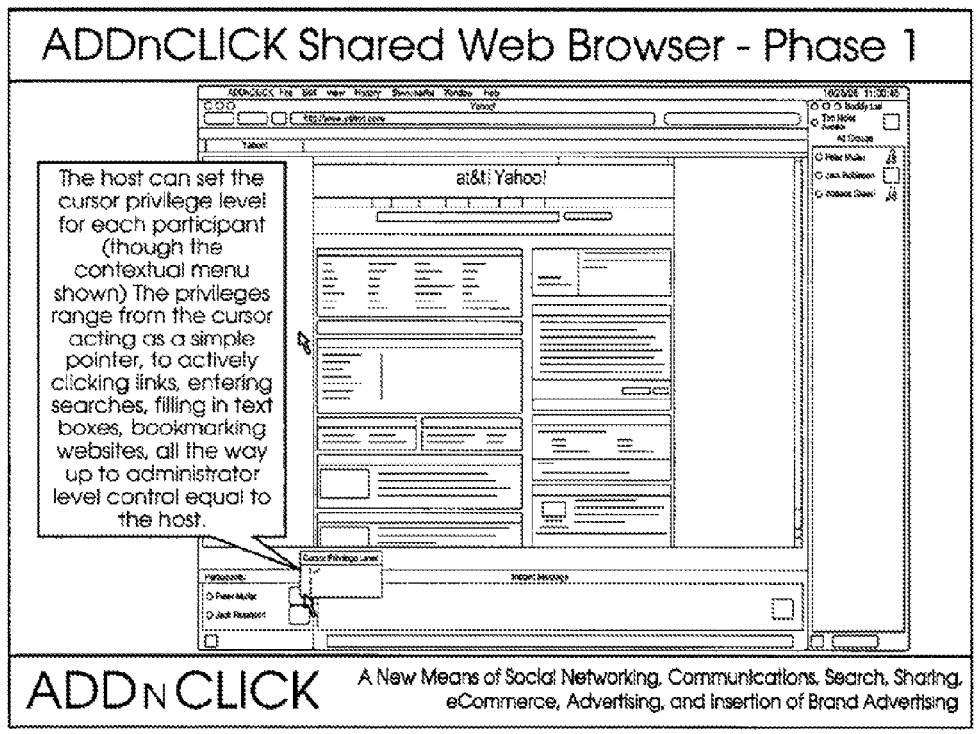
Fig. 1CCC

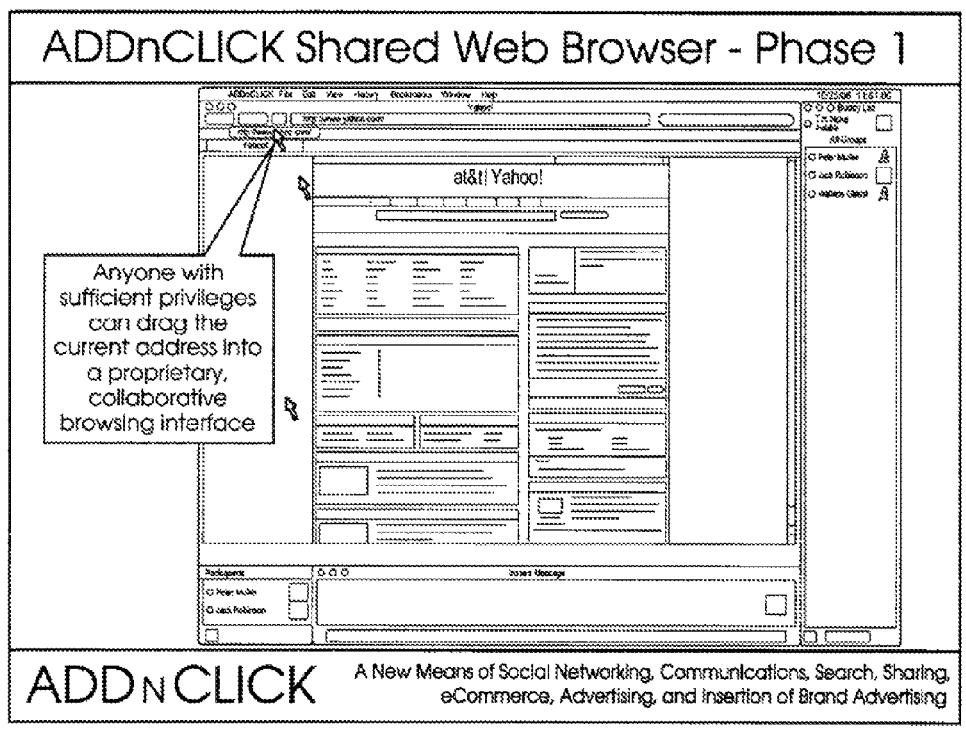
Fig. 1DDD

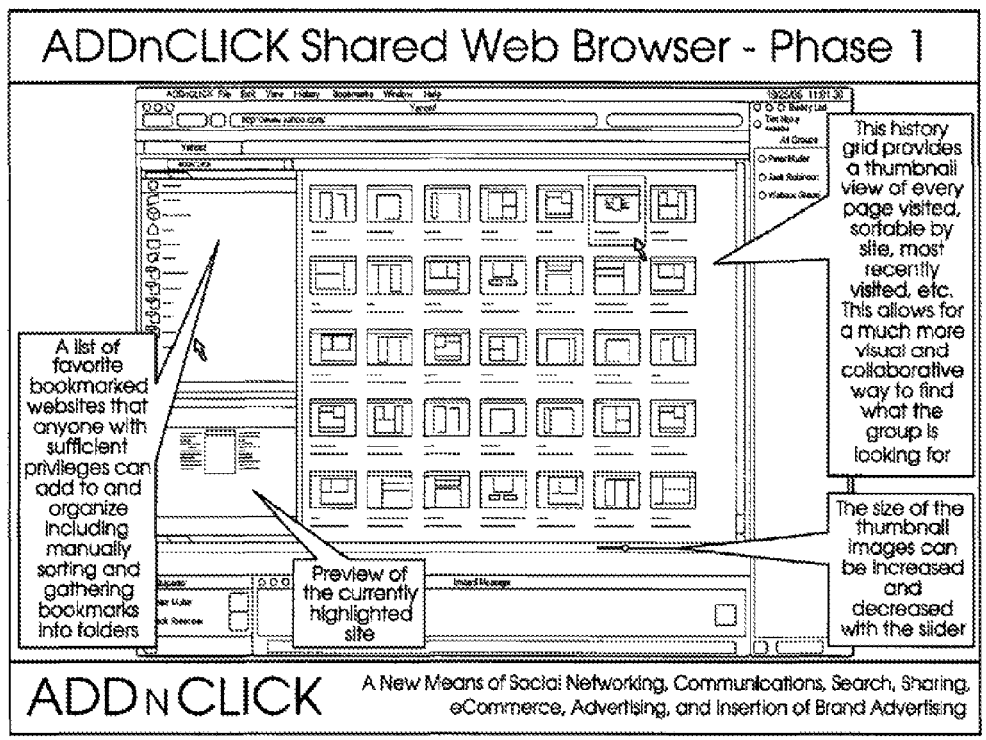
Fig. 1EEE

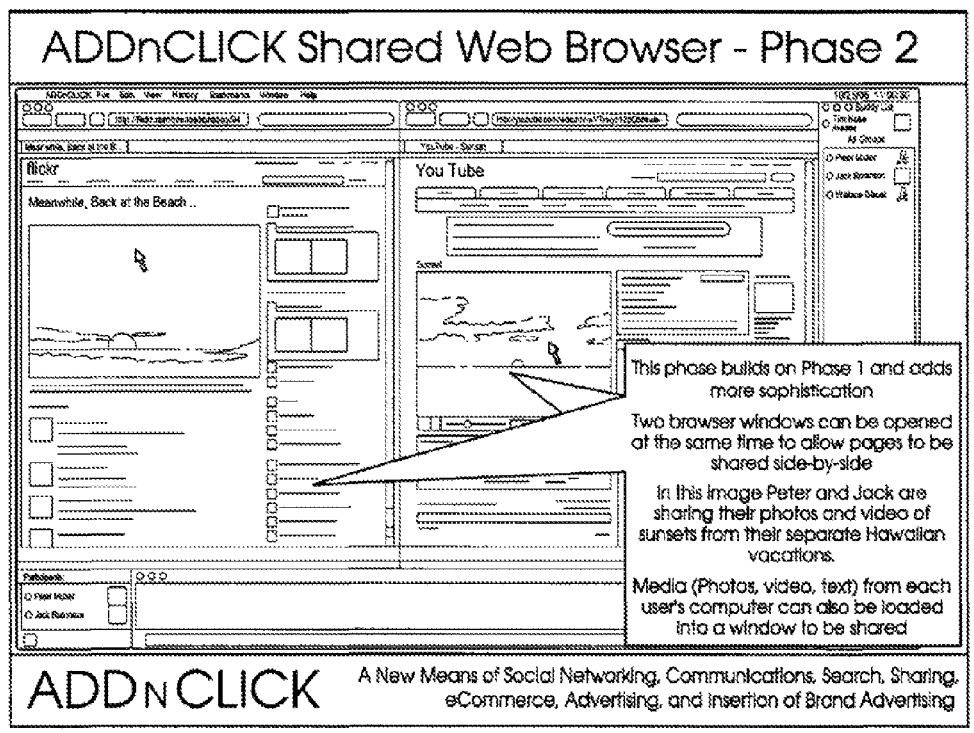
Fig. 1FFF

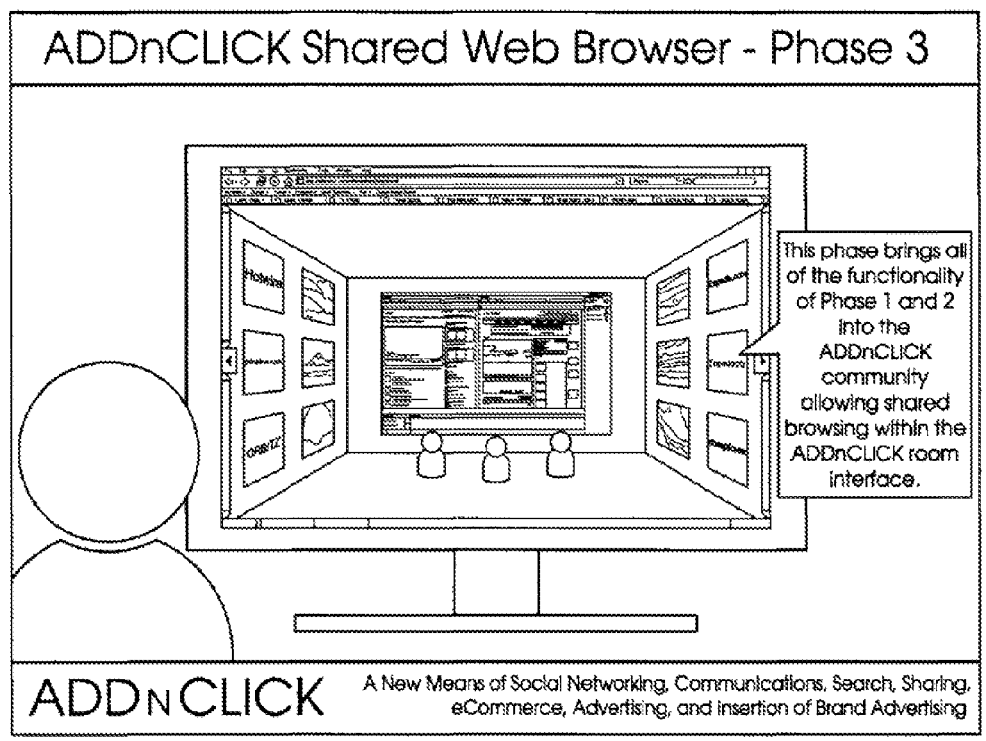
Fig. 1GGG

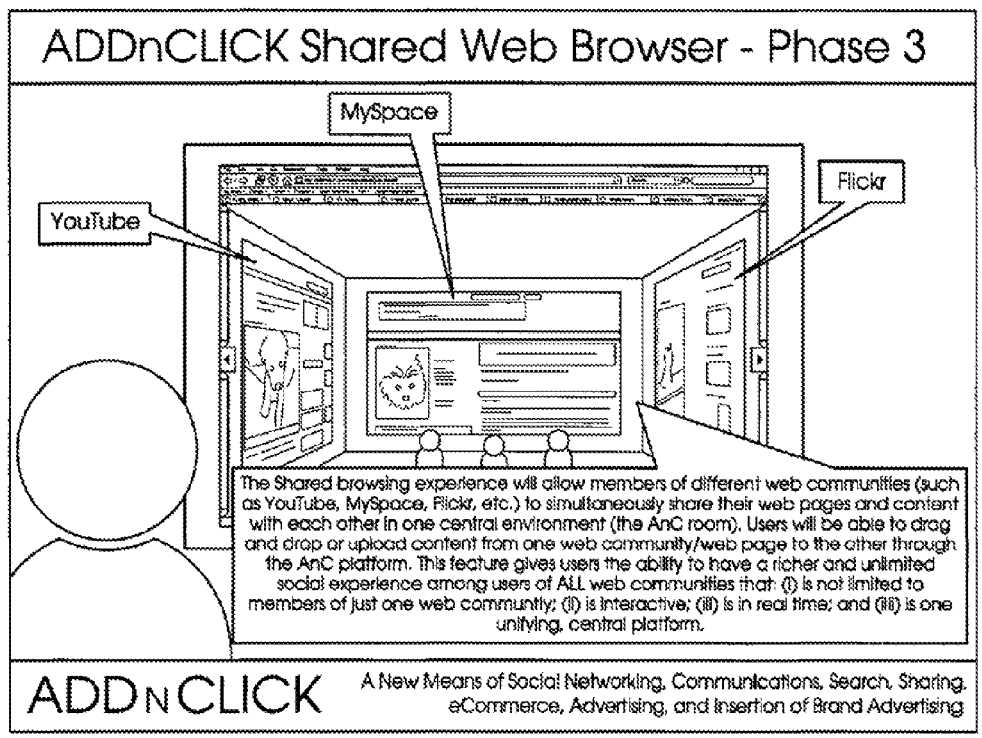
Fig. 1HHH

ADDnCLICK Description

ADDnCLICK

Is an application that links internet users into social networks with other internet users who are simultaneously viewing, reading or listening to the same or similar content on the internet.

Fig. 11A

ADDnCLICK - Summary

ADDnCLICK is a unique application that can link internet users together in a SOCIAL NETWORK that is based on the users' commonality of being simultaneously online and engaged in the same/similar content as each other.

Once linked, these users can interact with each other, communicate, trade advice, share content files, co-browse the internet, and engage in enhanced means of e-commerce, advertising, and generating new sources of revenue.

In doing so, ADDnCLICK will exist as one of the largest, most-used applications on the internet; serving as a ubiquitous underlayer that can connect users of all internet communities together into social experiences that can enrich every user's experience on the internet.

Fig. 11B

ADDnCLICK - How it Works

The ADDnCLICK Application

Analyzes the embedded or the user-defined description codes (the "metadata") of the Content that is being viewed (such as a video), or read (such as an article) or listened to (such as a song), and then searches ADDnCLICK's servers for other internet users who are simultaneously viewing, reading or listening to Content having the same or similar metadata and then links those users together into a live social network with each other.

Fig. 11C

ADDnCLICK - How it Works (cont.)

Once the match has been found (of users whose various pieces of Content have the same/similar metadata), those users are linked into a live social network with each other for the purposes of: communicating with each other; file sharing; sharing interests, ideas, and recommendations; e-commerce; building community; and enriching every internet application experience of the ADDnCLICK users (through the added benefit of social networking with other users). The content remains persistent on their device for future reference.

Fig. 11D

The User Downloads the AnC Installer

The User Installs the AnC Suite

The AnC suite includes the following applications:
Unified Media Center (UMC) and Same/Similar Content Viewer (SSCV)

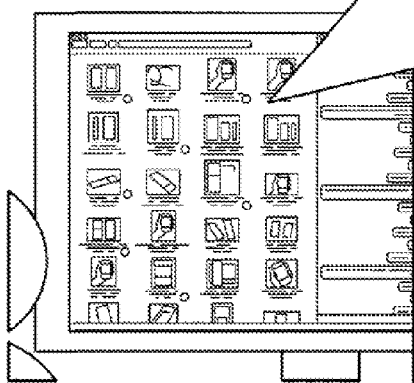

UMC Search Features

Fig.12C

Generation 1:

Search to be used to link the user to others and their Shared Social Window Experiences.

Future Generations:

Search (by keywords) for relevant rooms within the AnC community.

Search (by keywords) for relevant discussions within the AnC community.

Search for items being sold through the AnC community.

Search (for discussions, products or profiles that the member has visited in the past.

Search for other AnC users (by member profile data from any community) to socialize with.

Search for anything on the internet (by an existing search engine such as Google that pays for its placement in the UMC) and be connected to other users of that same or similar content from the search results.

The UMC & AnC Application in Use

How AnC Enhances each User's Internet Experience Through Live Social Interactions with others in AnC's Social Windows.

When the user views, reads, or listens to content on the Internet that is of interest, they have the option of asking the AnC application to search the AnC databases for other users who are currently engaged in content with the same or similar metadata (coded information/data that is embedded with the content that describes what it is). This process is discussed in detail under "Tag & Connect". For instance, if the user is doing a search on "Apple" and "cellphone", they can drag a resulting link to the UMC, or press a button from a browser plugin, or right click on the content, which will initiate the "Tag & Connect" process and which will tell the system to match them to other users discussing similar content. Once the match is found, the AnC application will open a separate window that will be shared among all users that have been linked together into a live social network based on having the same/similar metadata of content that they are engaged in, as described in "Tag & Connect Process". In that "separate, newly-opened window each user can talk to other users, compare notes, trade information, share files, share sites etc. -- thereby establishing a new means of social networking to enrich the internet experience of the users.

Fig. 13A

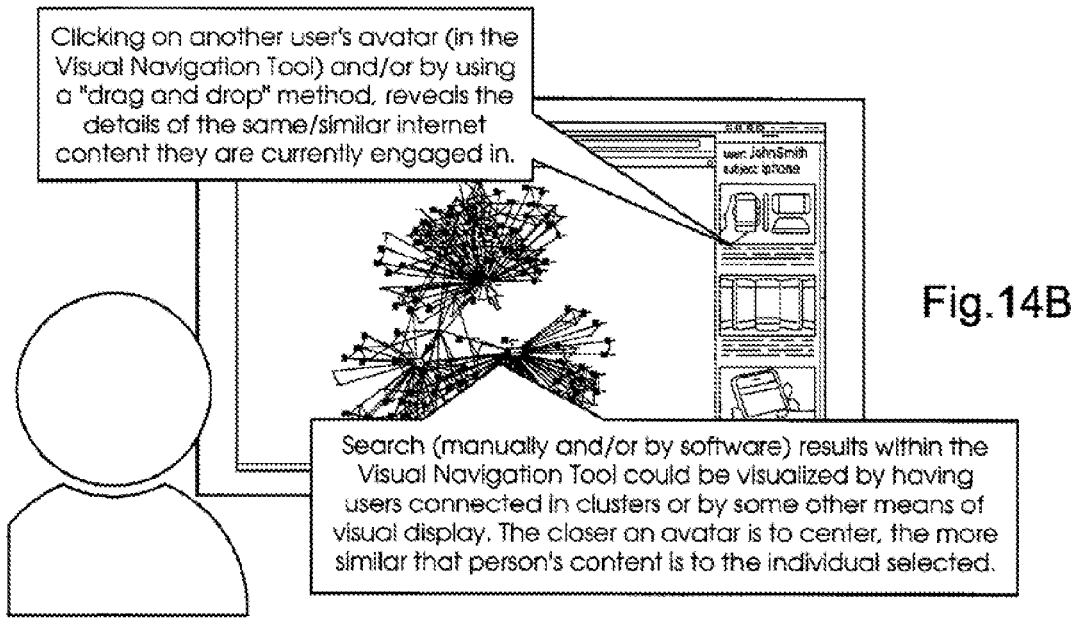

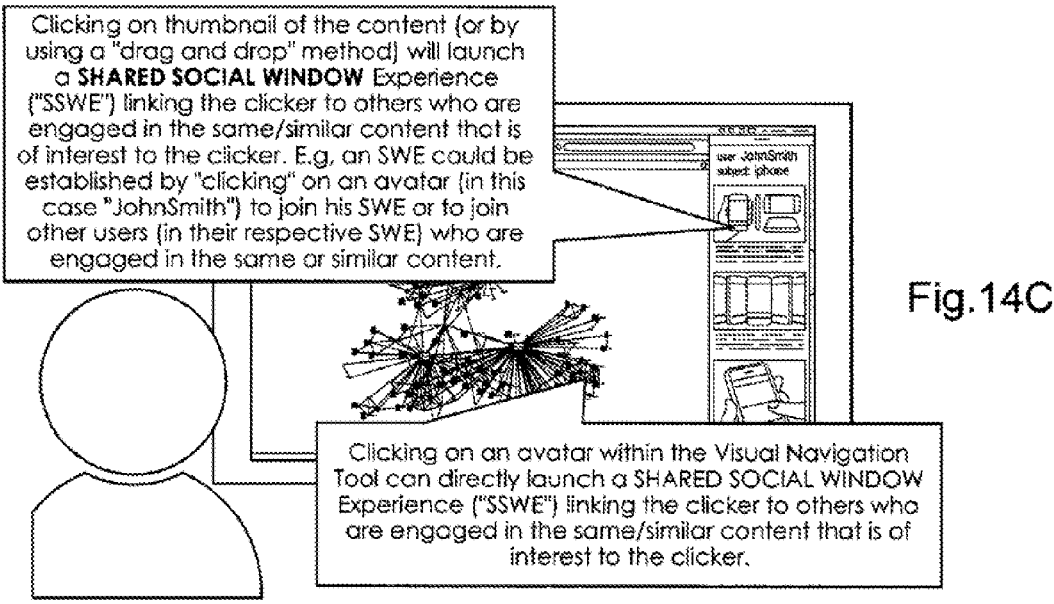

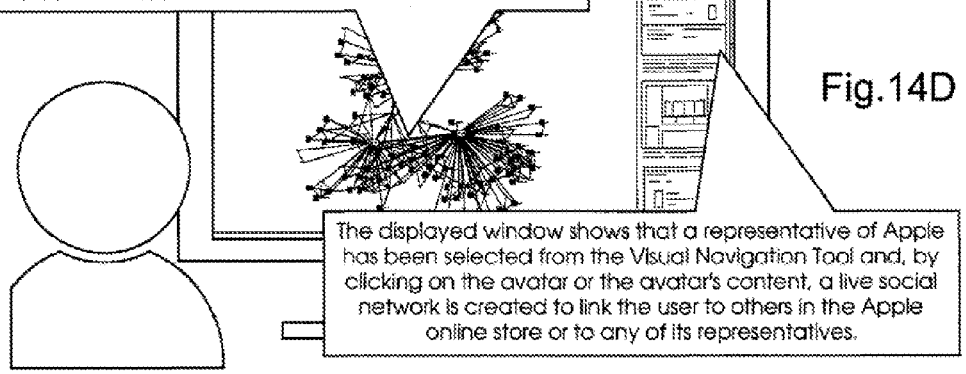

Why Would Anyone Want to Use AnC?

(1) To establish LIVE social networks among users who are engaged in the same/similar content.

(2) To communicate and to share ideas, files and resources with others who are simultaneously online and who share common interests each other (as determined by an analysis of the same/similar content, webpage or website that they are engaged in).

(2) Every internet community can benefit from the added exposure to new internet users in other web communities through the AnC Shared Windows -- which can help to increase membership (from outside of their usual audience), add greater stickiness to their sites, and enable more opportunities for generating revenue, targeted advertising, content broadcasting, content delivery, content sharing and e-commerce.

Fig. 15A

How do I get the ADDnCLICK application?

How is it spread to other users throughout the internet?

By "referral from a licensed Internet application or community".

For instance, from an application (such as Google) or community (such as AOL) that has obtained a license from AnC to promote the use of AnC among their users in return for sharing in the revenue generated by the AnC application):

- Click on referral link and be brought to ADDnCLICK website.

(2) Register user information.

(3) Download ADDnCLICK application.

Fig. 15B

How do I get the ADDnCLICK application?

How is it spread to other users throughout the internet?

By "referral from a Friend" (e.g., in return for revenue sharing with ADDnCLICK):

(1) Click on referral link and be brought to ADDnCLICK website.

(2) Register user information.

(3) Download ADDnCLICK application.

Fig. 15C

Content Tracking (1) AnC keeps history on content to know where it is going.

(2) AnC keeps history and will store metadata on the user's interests. This is accomplished by gathering metadata on the content that the user is engaged in, which is captured in the "Tag & Connect" session, "Search for Shared Windows" (public and private with friends) session. In the future, tracking will be done on any content that the user clicks onto in the Shared Content Window that others have brought in. (This is done to be able to work with advertisers who are interested in specific ads to be delivered to each individual and that is geared to that user's interests.)

Fig. 16A

Potential Uses of ADDnCLICK (1) A user on eBay can be connected to others (on eBay or from any auction site or any other web application or web community)that are online and interested in the same/similar things that the user is seeing on E-Bay. They can exchange information and increase more traffic to the auction items being looked at -- which could help to support greater sales on the eBay site.

Fig. 16B

Potential Uses of ADDnCLICK (cont.)

- A MySpace member could be viewing content on the internet and be linked to other users (from anywhere in the world and who may on from other social networks) who are viewing the same or similar content (based on AnC's analysis of their content's metadata) -- thereby creating a link to meet others who have the same interests. When MySpace members simultaneously meet other internet users through the AnC SHARED SOCIAL WINDOW, they can invite and expand MySpace's membership to other users in any country around the world. The AnC application can link users of one social network to users in any other social network (such as LinkedIn, Facebook, etc.).

Fig. 16C

Potential Uses of ADDnCLICK (cont.)

- Just as it is common and expected to have salespersons available for assistance when visiting a store when a person is shopping for an item (another form of "Social Experience"), AnC can link users on e-commerce sites to other people in the AnC SHARED SOCIAL WINDOW who are interested in that same/similar e-commerce item ... and among these people in the AnC SHARED SOCIAL WINDOW can be real salespersons or representatives of the e-commerce item who are online and who can be in the AnC Shared Window to assist and influence the user in making a sales decision.

Fig. 16D

Potential Uses of ADDnCLICK (cont.)

(4) AnC's "Unified Media Center" can always stay open, visible and active on the user's desktop and serve as a "set-top box" and "entertainment area" (like a TV set) on the user's desktop to display channels of content that web communities (such as YouTube, Dave.tv, AOL Video, Veoh, LaLa.com, etc.) or content distributors (such as SkypeTV (Joost), NetFlix and Blockbuster Videos) could target and deliver to the user.

Fig. 16E

ADDnCLICK Revenue Models

- Contextual ads (delivered from existing search engines.

- Registration fees for public rooms (private rooms are free.

- Hosting fees for public rooms (private rooms are free).

- Referral fees from sales to user (refer to "clickability" feature.

- Sale of virtual objects for virtual rooms.

- Revenue sharing from e-commerce within the ADDnCLICK room.

Fig. 17A

ADDnCLICK Revenue Models (cont.)

Revenue from "Clickable" Content

AnC Users will be able to make content "clickable". Clickable areas/objects in content will allow users to buy products/services they see by simply clicking on the clickable areas/objects and when a click on that content results in a sale, that user plus ADDnCLICK will receive a referral fee for the transaction.

(ADDnCLICK enables "clickable" content to be shared socially while at the same time making it trackable for recognition of any resulting sale).

Fig. 17B

LINKING USERS INTO LIVE SOCIAL NETWORKING INTERACTIONS BASED ON THE USERS' ACTIONS RELATIVE TO SIMILAR CONTENT

RELATED APPLICATIONS

This application is a Continuation of and claims the benefit of priority to U.S. patent application Ser. No. 13/332,835 filed on 21 Dec. 2011, now U.S. Pat. No. 8,244,830, which in turn is a continuation of U.S. patent application Ser. No. 11/982,707 filed on 2 Nov. 2007 and issued as U.S. Pat. No. 8,117,281 on 14 Feb. 2012, which in turn is a Continuation-in-Part of U.S. patent application Ser. No. 09/686,206 filed 10 Oct. 2000 and now abandoned, the contents of each of which are hereby incorporated herein in their entirety by this reference. Application Ser. No. 11/982,707 also claims priority to Provisional application No. 60/856,404 filed on 2 Nov. 2006. The contents of U.S. patent application Ser. No. 09/745,257 filed 20 Dec. 2000 and issued as U.S. Pat. No. 7,168,051 on 23 Jan. 2007, of U.S. patent application Ser. No. 09/749,091 filed 26 Dec. 2000, of U.S. patent application Ser. No. 11/477,162 filed 28 Jun. 2006, and of U.S. Provisional application No. 60/856,404 filed on 2 Nov. 2006, are also each incorporated herein in their entirety by this reference.

FIELD OF THE INVENTION

The invention relates generally to the field of online networking and communications. More particularly, the invention relates to using internet content as the means to establish live social networks by linking internet users, searchers, readers, viewers and/or listeners of the same and/or similar internet content to each other via a platform that enables any of the following in n-dimensional environments: social networking, communications, sharing, co-browsing, e-commerce, advertising, search, learning/education, hosting and registry services, push and pull applications, anonymous communications, and rich presence on a real time basis (hereafter referred to as "ADDnCLICK" (or "AnC") and/or the "invention").

BACKGROUND OF THE INVENTION

The internet is the world's largest and most content-rich network accessible to the average person. It is possible for nearly any person in the world, provided they have access to an internet-linkable device, to almost instantly obtain content from nearly any source in the world. However, content-based experiences on the internet still remain a relatively individual event. Each user accesses, downloads and views content. While others may simultaneously and individually access and view the same content, and may send content to each other via e-mail or some similar means, the content remains a passive medium. Social interaction largely takes place separately from content.

Search tools such as GOGGLE and YAHOO! allow users to specify keywords to guide a search and return a result that is relevant to their interests. However, those search tools only provide access to content, they do not link the user with other users who are also sharing an interest in either the same or similar content. Likewise, innumerable chat rooms, forums, interactive games, clubs, and other interest-centric user interactions exist and are interne accessible, but a user must typically become aware of them then affirmatively contact the group(s) to interact with others relative to their shared interests.

Thus, content and users remain relatively compartmentalized in internet space, with any overlap between the two being limited to that resulting from the creativity and affirmative actions of each individual user. Further, the creation of links between users unknown to each other are additionally limited temporally, in that a user of a chat room, for example, cannot generally interact with other users who are not also in the chat room at that particular time. Thus, many opportunities for social linking of users having the same and/or similar interests are missed due to a lack of temporal coincidence in their actions.

At current, there do not appear to be any tools or methods by which a user can instantly become aware of and interact with others sharing a common interest using content itself as a linking basis. Additionally, the existing methods for interaction on the internet (or any network) are limited in their capabilities with regard to sharing content real-time between users. Users simply continue to perform internet searches both for content and for opportunities to interact with others sharing similar interests.

BRIEF DESCRIPTION OF THE DRAWINGS

FIGS. 9A-9M are a series of screen-grab depictions of vertical marketing opportunities or applications rendered possible by the invented system.

FIGS. 11A-11I present functions, purposes, and methods for acquiring social networking tools according to embodiments of the invention.

FIGS. 12A-12C depict a Unified Media Center social networking method and/or system according to an embodiment of the invention.

FIGS. 13A-13H depict a tagging and connecting method and/or system for social networking according to an embodiment of the invention.

FIGS. 14A-14D depict an ontological visual mapping method and/or system for social networking according to an embodiment of the invention.

FIGS. 15A-15C describe exemplary benefits obtainable using social networking methods and/or systems according to an embodiment of the invention.

FIGS. 16A-16E depict various potential uses and benefits of social networking methods and/or systems according to an embodiment of the invention.

FIGS. 17A-17B depict exemplary revenue models according to embodiments of the invention.

DETAILED DESCRIPTION OF THE PREFERRED EMBODIMENTS

Figure 1E:
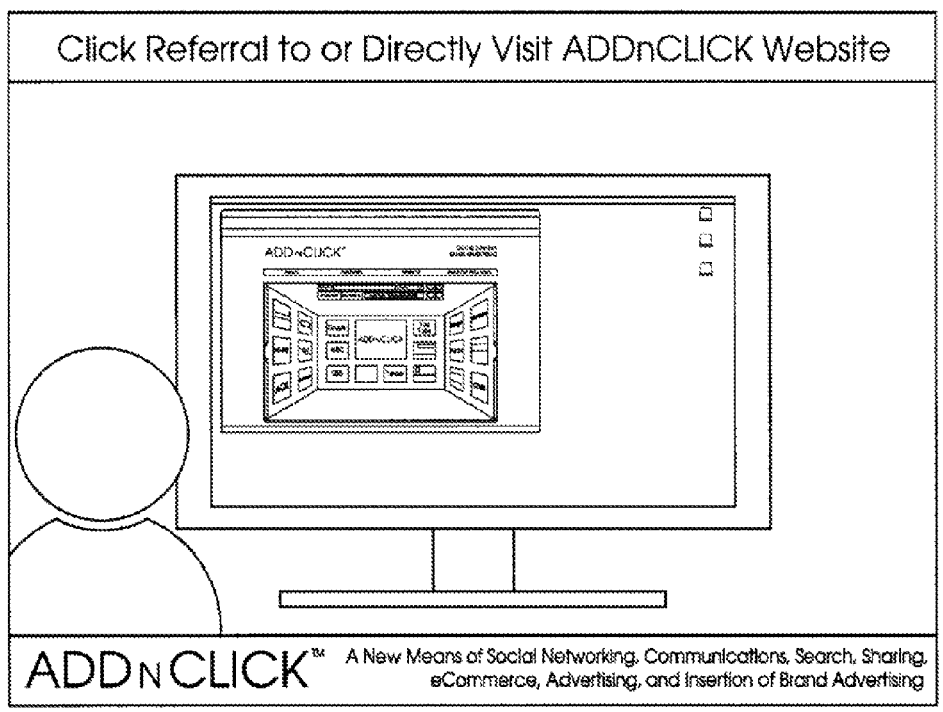
FIGS. 1A-1Z, 1AA-1ZZ, and 1AAA-1HHH collectively represent a graphic and textual summary of one embodiment of the invention depicted by a series of slides that self-explanatorily illuminate some of the inventive features.
Figure 1F:
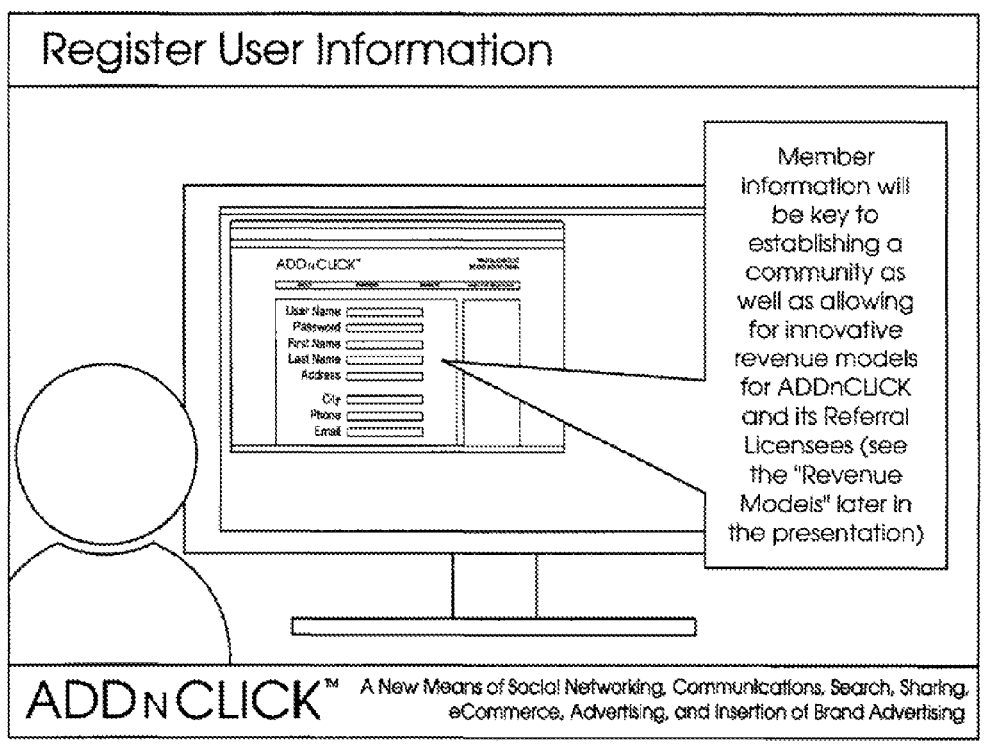
Figure 1G:
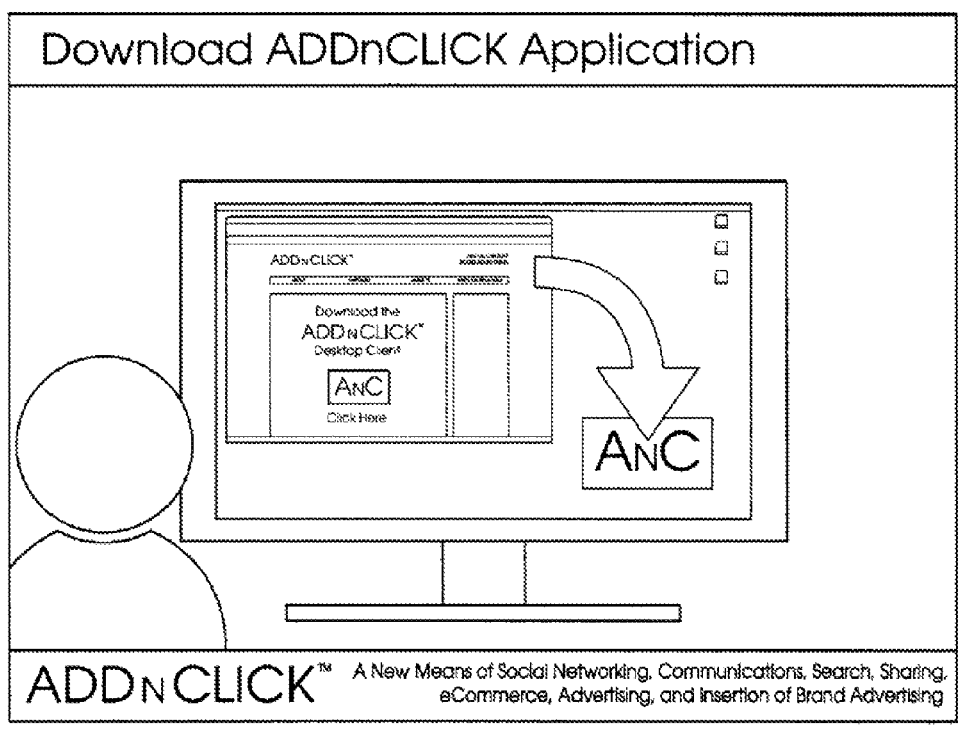
Figure 1H:
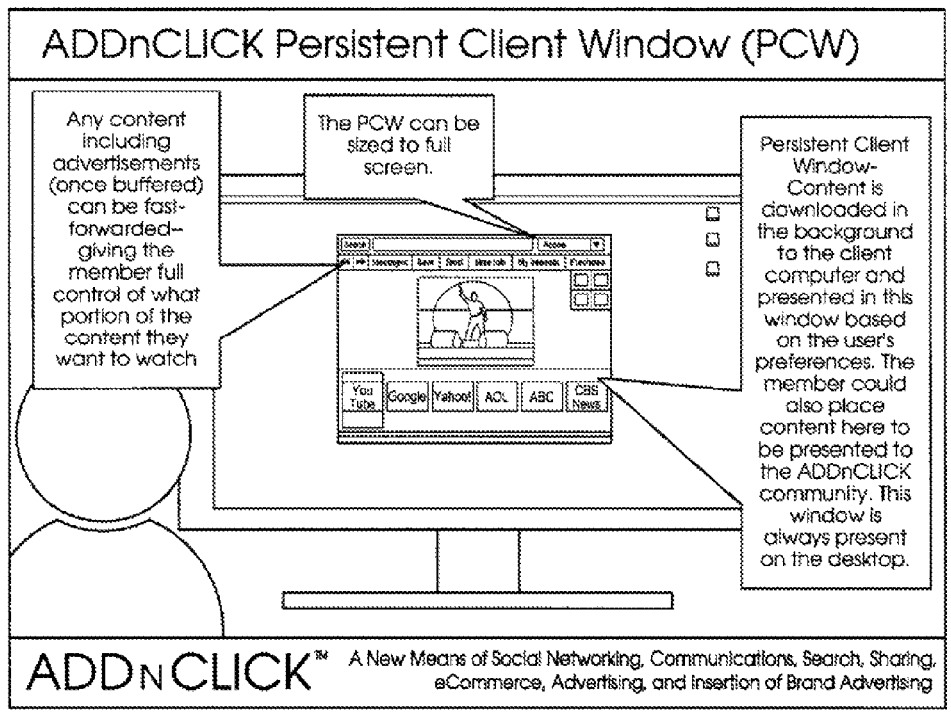
Figure 1L:
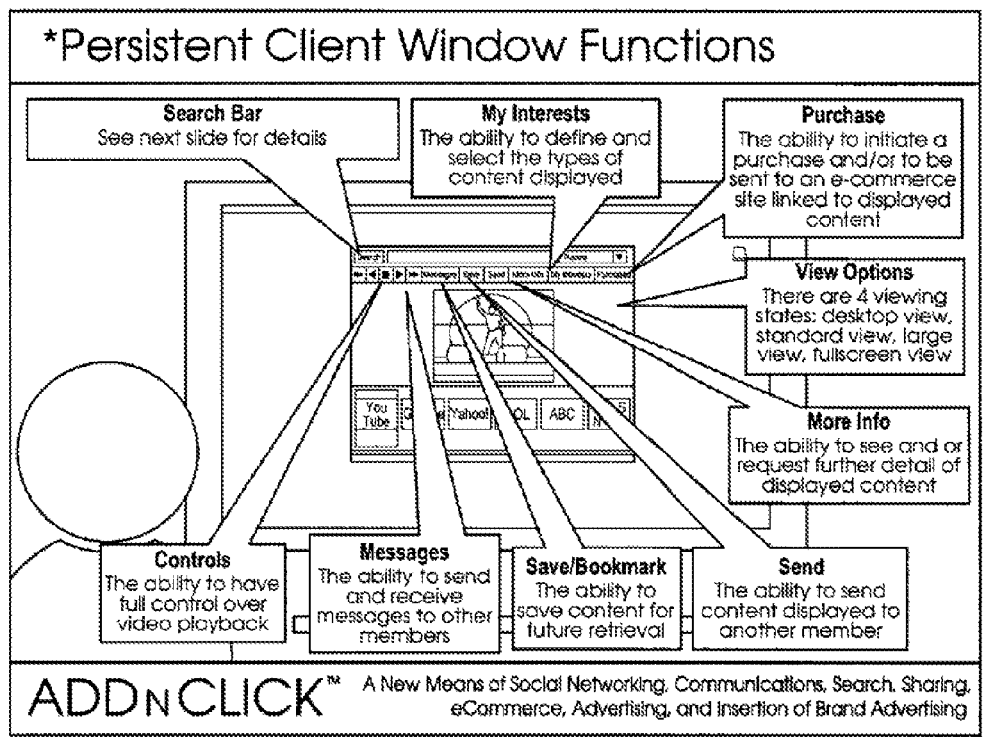
Figure 1J:
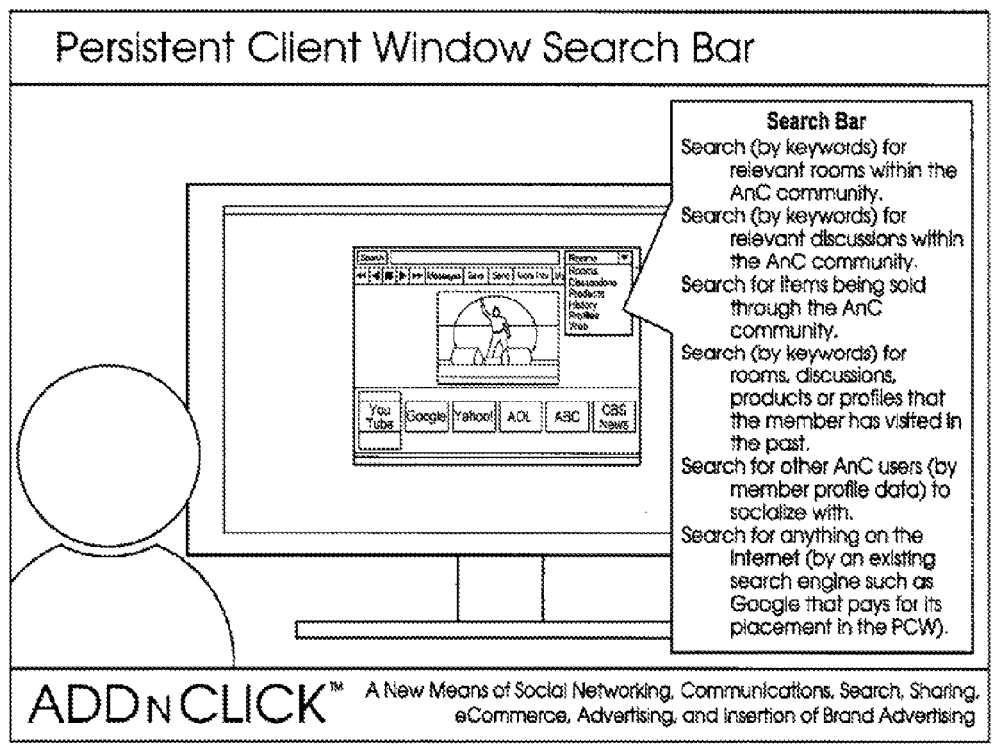
Figure 1K:
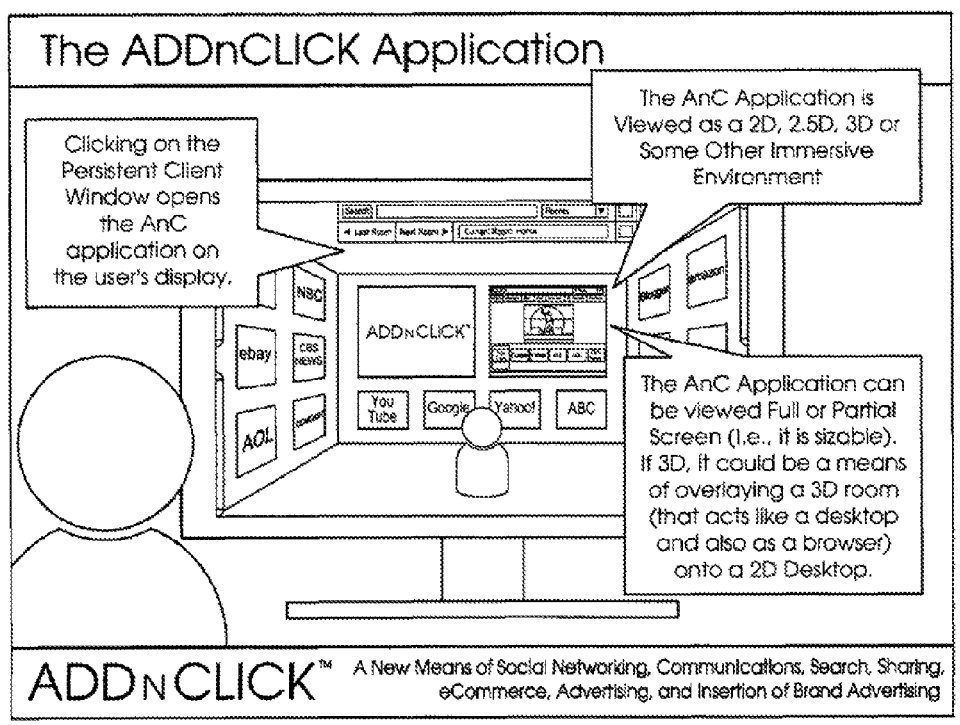
Figure 1M:
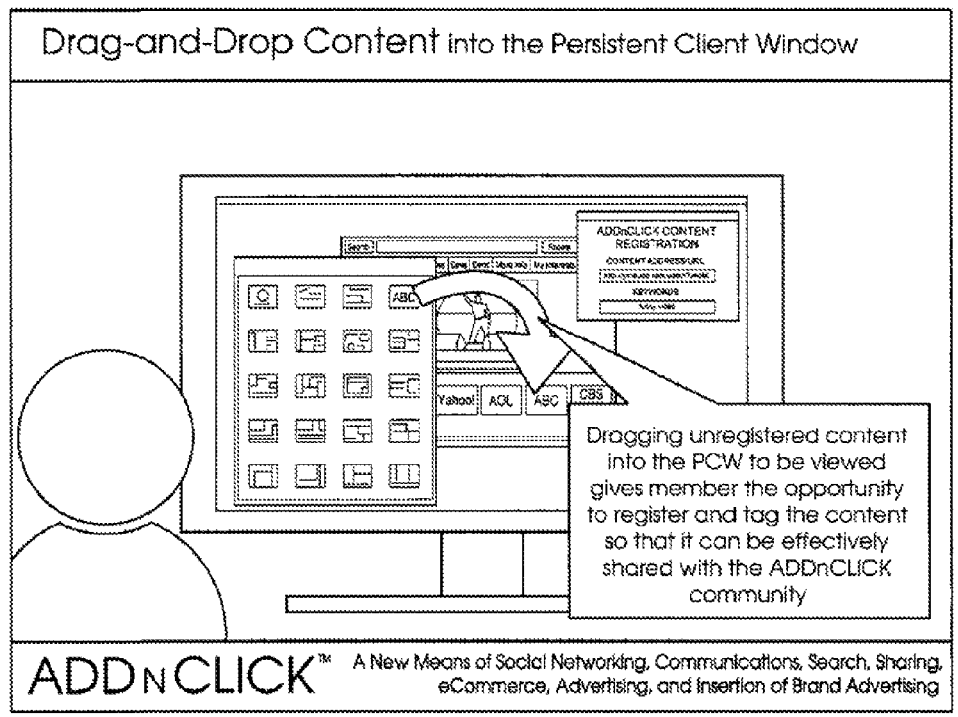
Figure 1N:
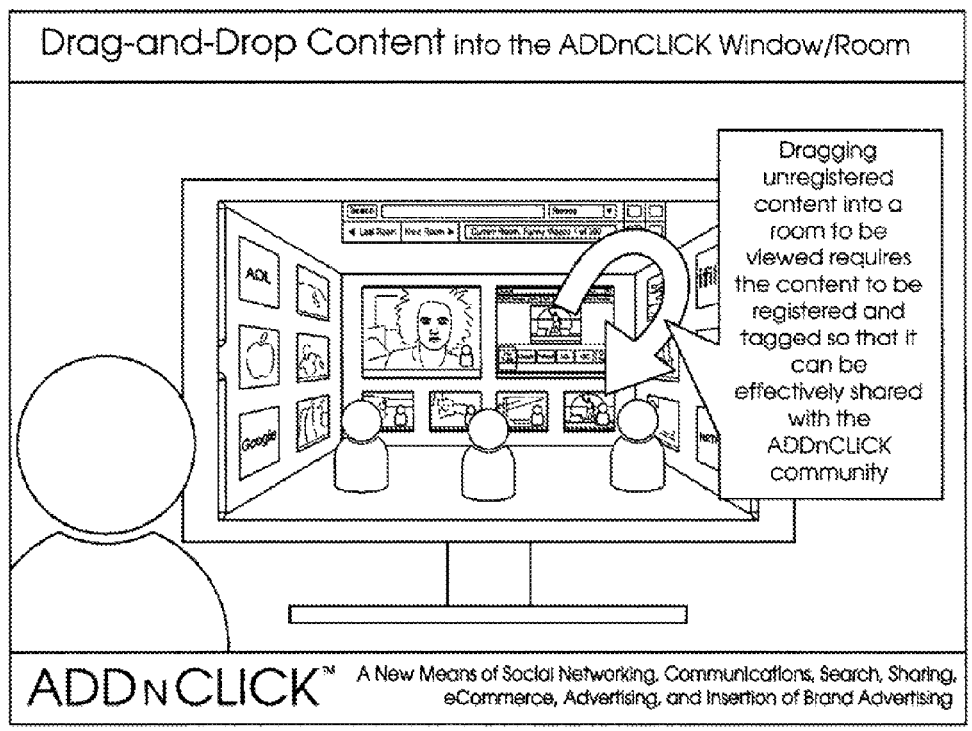

The invention in accordance with a preferred embodiment involves a system, method and graphic user interface (GUI) that uses internet content as the means to establish social networks by linking internet users, searchers, viewers and/or listeners of the same and/or similar internet content to each other via a platform that enables any of the following in n-dimensional environments: social networking, communications, sharing, e-commerce, advertising, search, learning/education, hosting and registry services, push and pull applications, anonymous communications, and rich presence. Embodiments are referred to herein using the exemplary nomenclature "ADDnCLICK" for convenience only, and no limitation is intended, nor should any limitation be interpreted therefrom.

The ADDnCLICK GUI features n-dimensional (nD) (e.g. three-dimensional (3D) models of landscapes, buildings, rooms, desktops, furnishings, software applications, accessories, decorations, transparencies (e.g. of web pages, documents, websites, etc.) against a more visual background, and the like that are created, edited, presented and viewed on the display of a computer, a Personal Digital Assistant (PDA), a cellular telephone, and/or any type of device that can be connected to the internet or any other type of network (hereainafter referred to as the "Device"). The ADDnCLICK system utilizes the world-wide web, or internet, to permit such models to be shared by other users in an interactive, online environment in which the metadata of the content are used to link users to social networking with other users. "Metadata" is information about data and/or other information. Metadata is typically structured, encoded data that describes one or more characteristics of information-bearing content to aid in identifying, locating, discovering, assessing, linking, and managing content bearing one or more metadata tags. Metadata described herein can be associated with content and provide a basis for identifying same and/or similar content, and linking users of same/similar content via live social networks.

The method involves using Content (as defined herein, see below) to enrich a user's life and to link users with other users having a community of interests. Branding can be overlaid or inserted within the Content and/or within the ADDnCLICK environment for commercial gain. (ADDnCLICK is a trademark owned by ADDnCLICK, Inc., assignee of the present patent. All rights are reserved world-wide.)

The invention thus couples users (viewers and/or listeners) of content with others by the association of common interests they have that is determined through an analysis of the metadata of the Content each is viewing or listening to, (or that they have defined e.g., in a search, defined through an invitation, etc.) in a social network that enables communication, sharing, e-commerce, anonymous communications, financial gain, etc.

Numerous references to 'the internet' occur throughout this description as an example of a network embodiment. While such references can include the World Wide Web (the 'Internet'), as has become broadly understood and used by the general public, such references are illustrative and the embodiments are not so limited. Embodiments of the invention could function and provide benefits equally or substantially as well when implemented on or with various limited access and/or entirely proprietary networks, public networks or any other systems of electronically interconnected nodes and/or devices. Examples of networks according to alternative embodiments and/or applications could include Arpanet, proprietary intranet systems, heavily censored national networks (e.g., China), and others. Likewise, a network can be partially or entirely configured as a wireless (e.g., WAN, WiFi, WiMax, satellite, cellular etc.) or wired network. Therefore, reference to 'the internet' herein are to be construed to include any network to which, with which, or within which Content can be provided and/or accessed by a user.

Figure 1P:
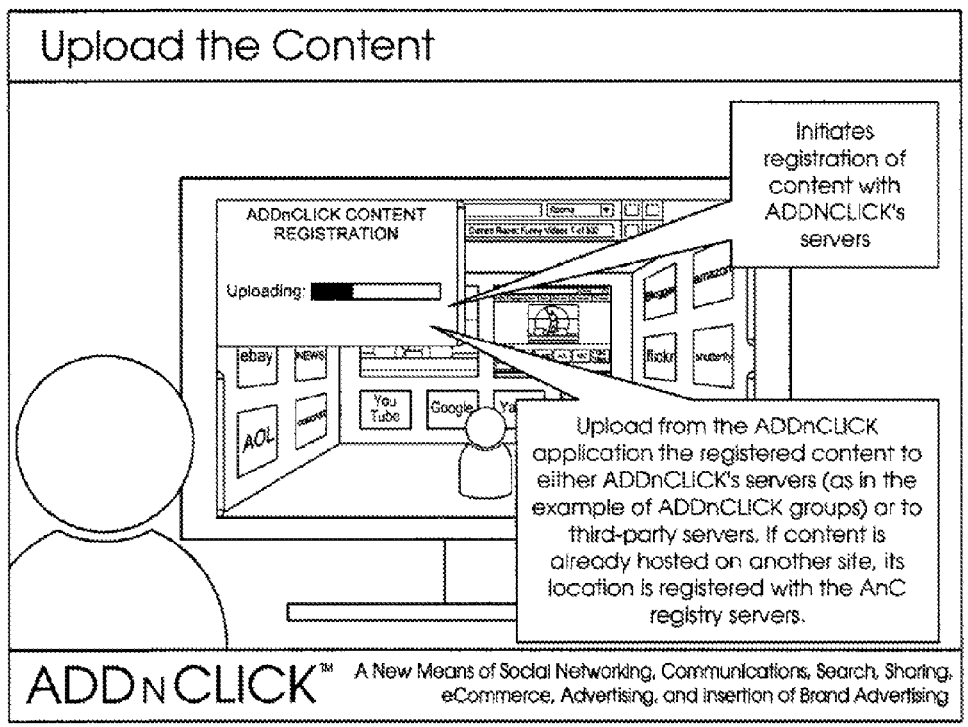
Figure 1R:
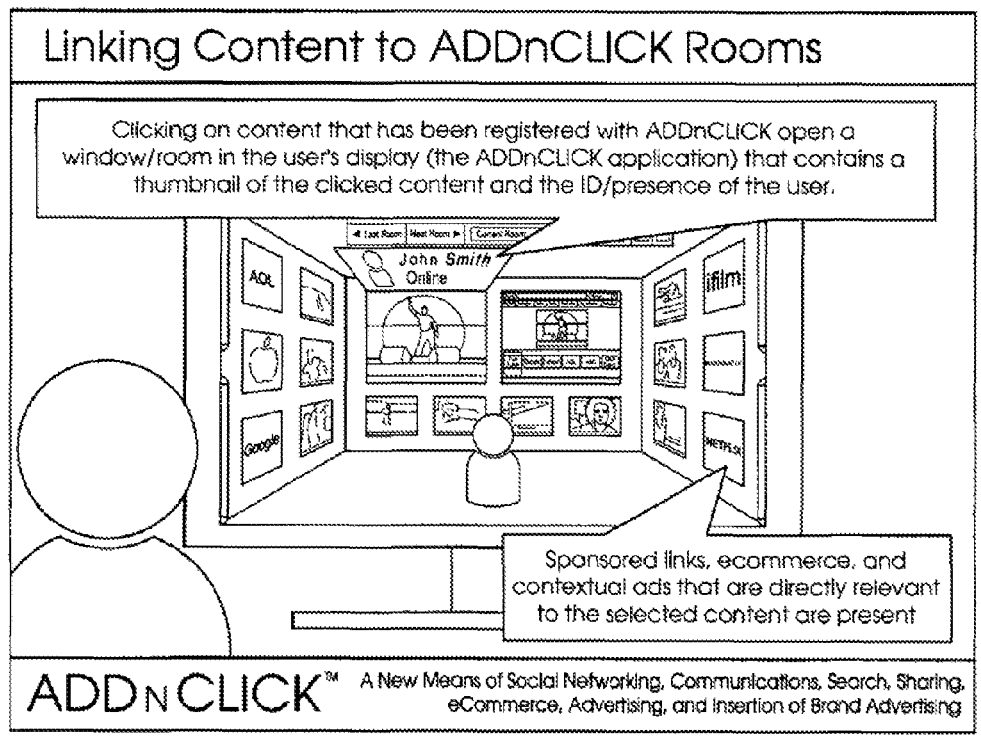
Figure 1S:
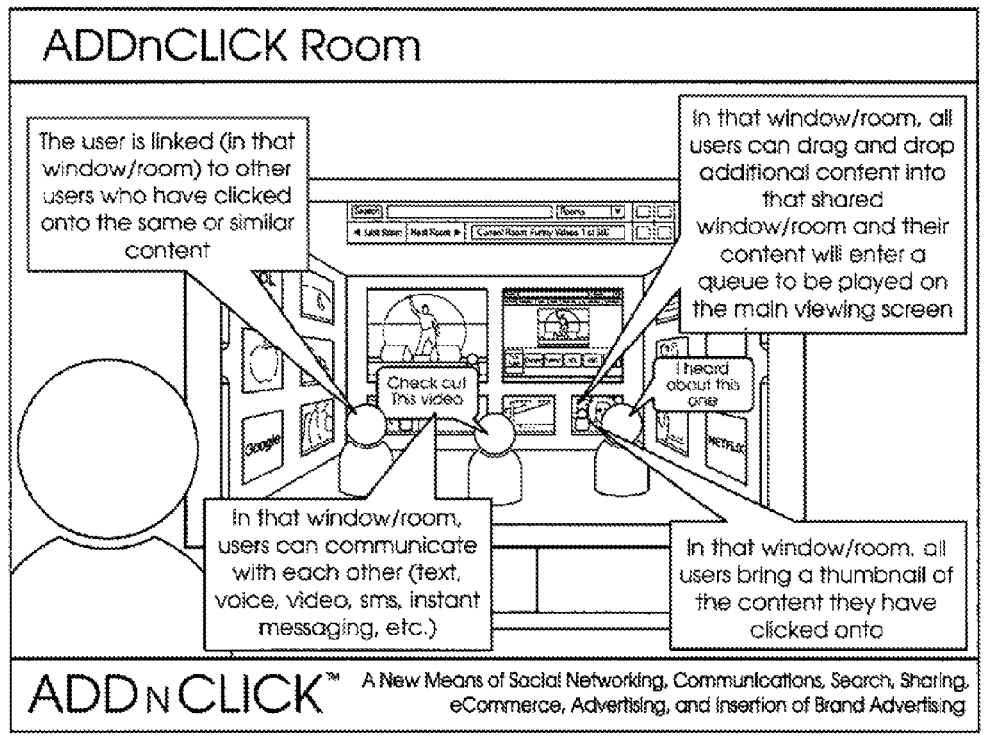
Figure 1T:
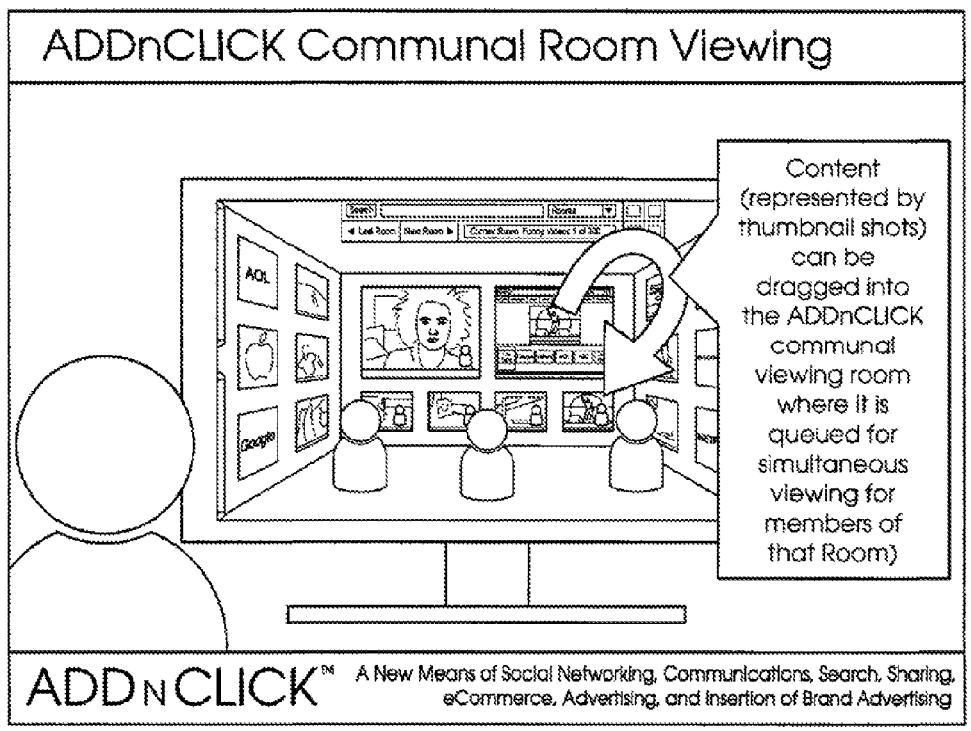
Figure 1U:
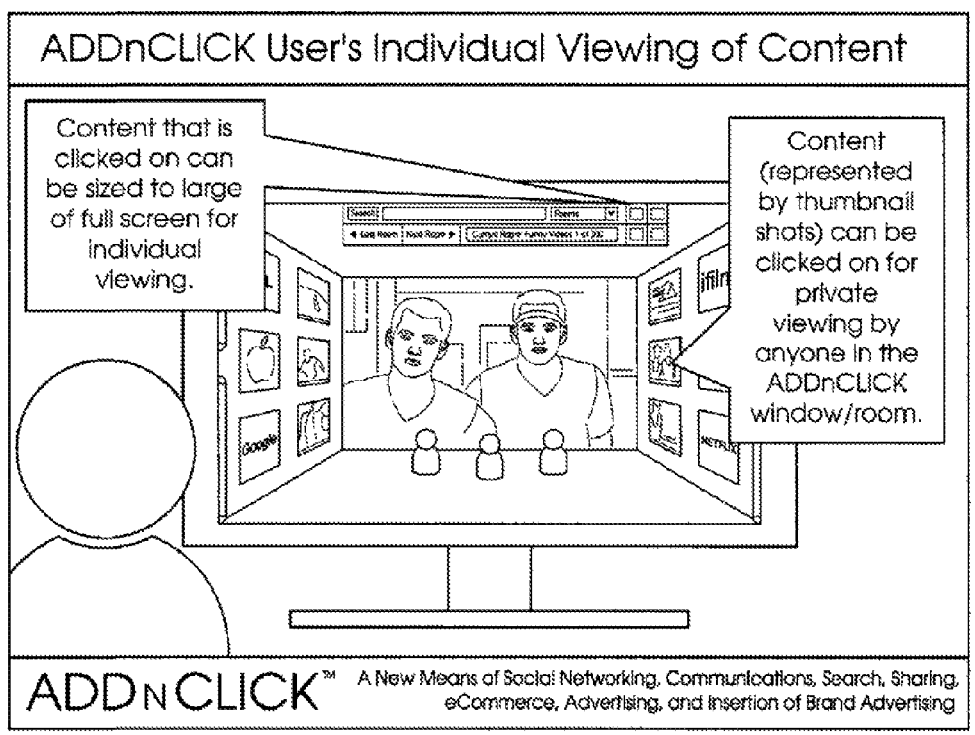
Figure 1V:
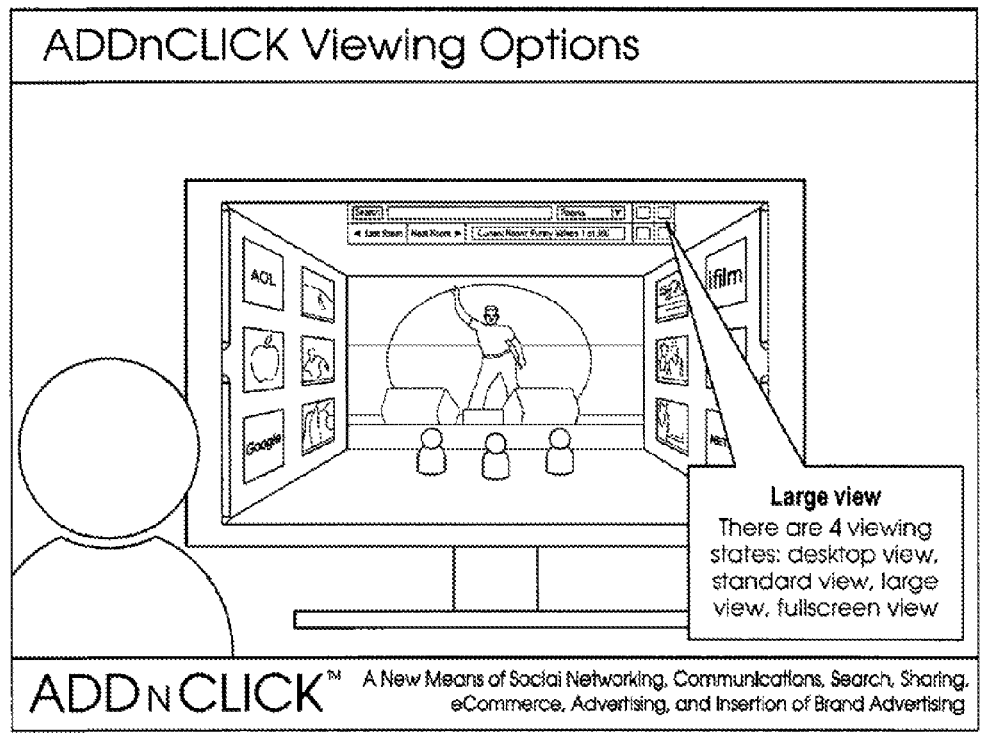
Figure 1W:
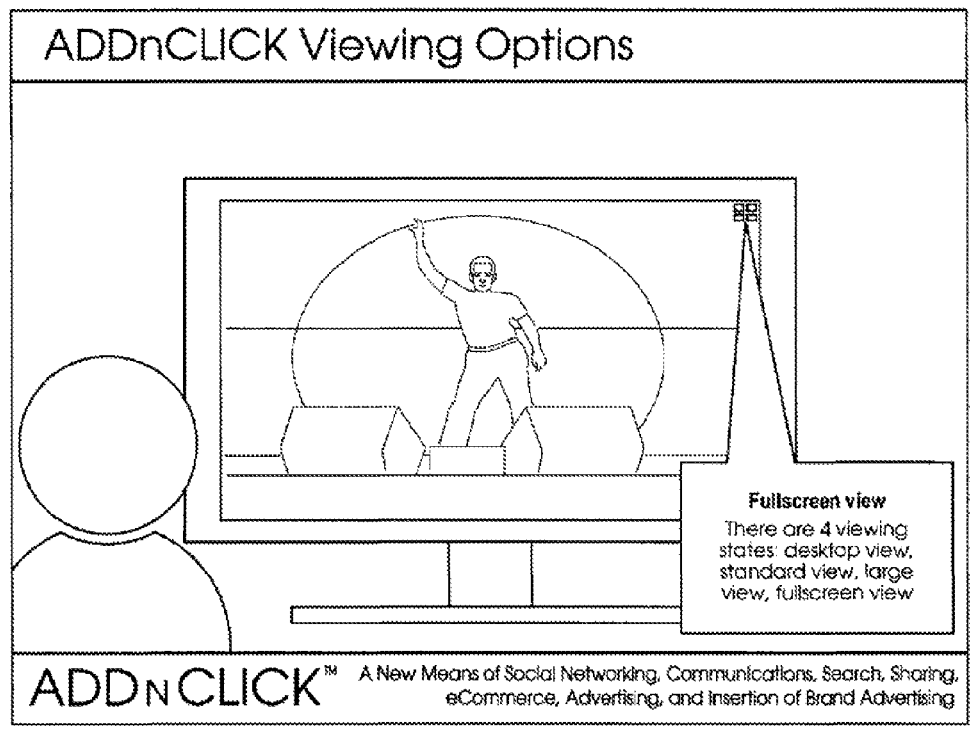
Figure 1X:
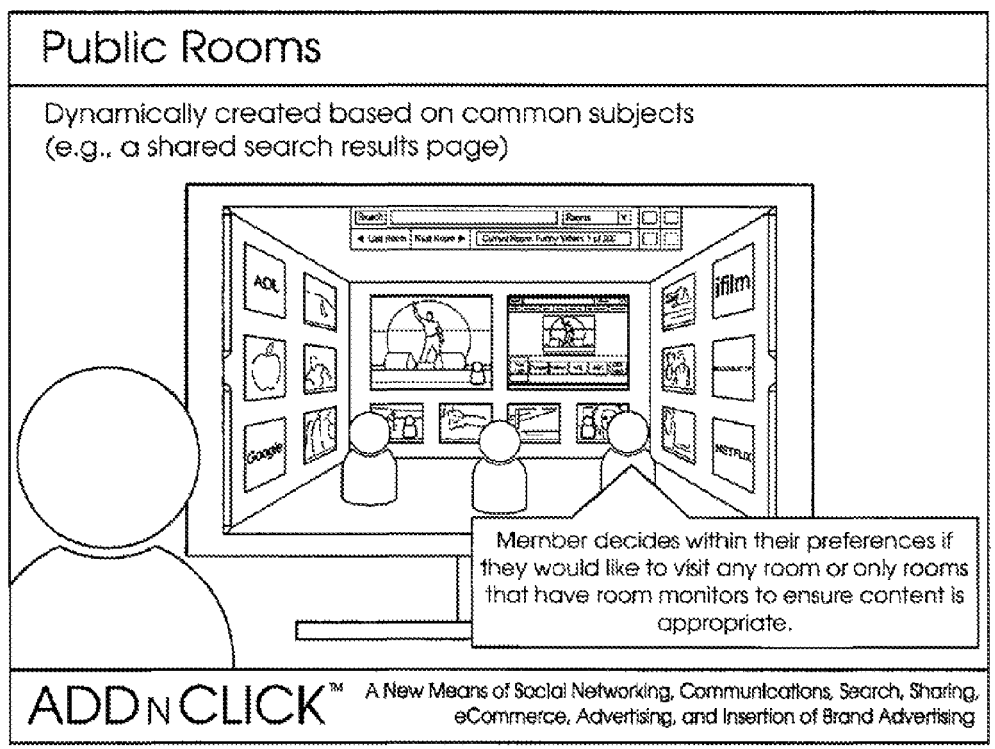
Figure 1Y:
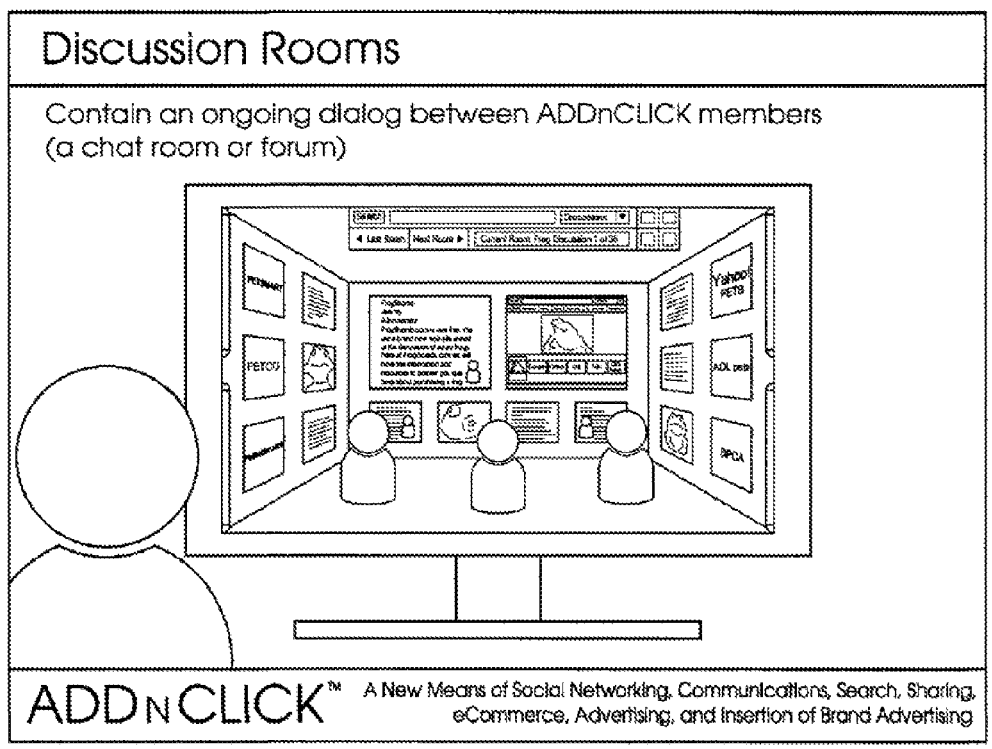
Figure 1Z:
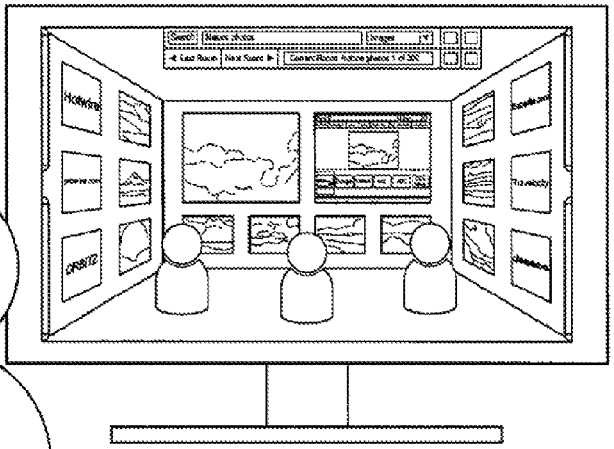
Figure 1A:
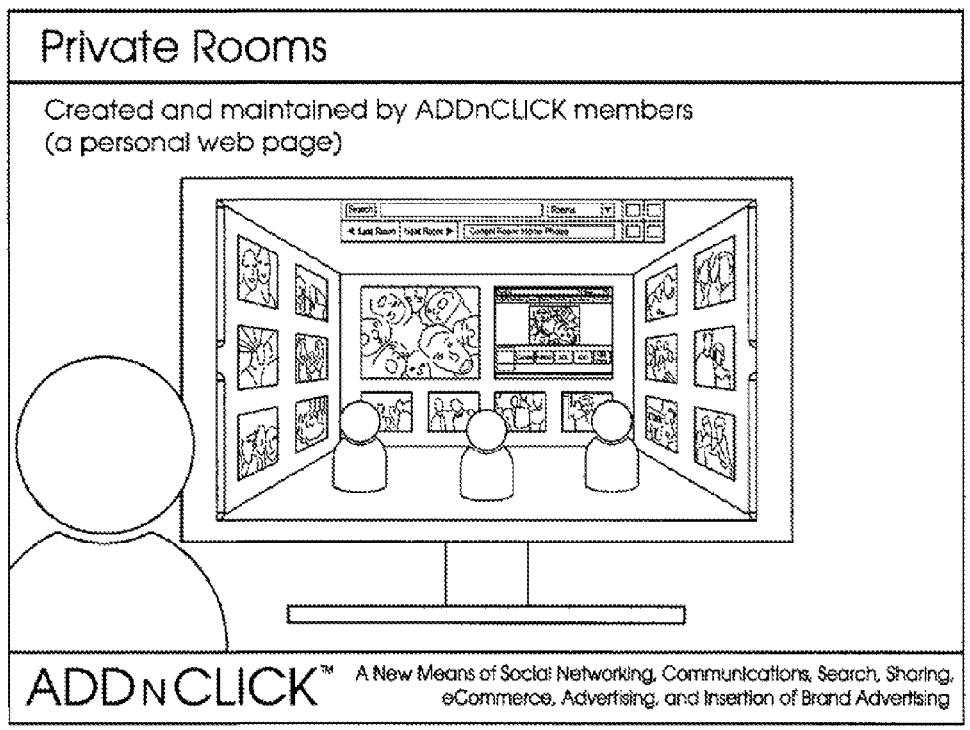
Figure 1B:
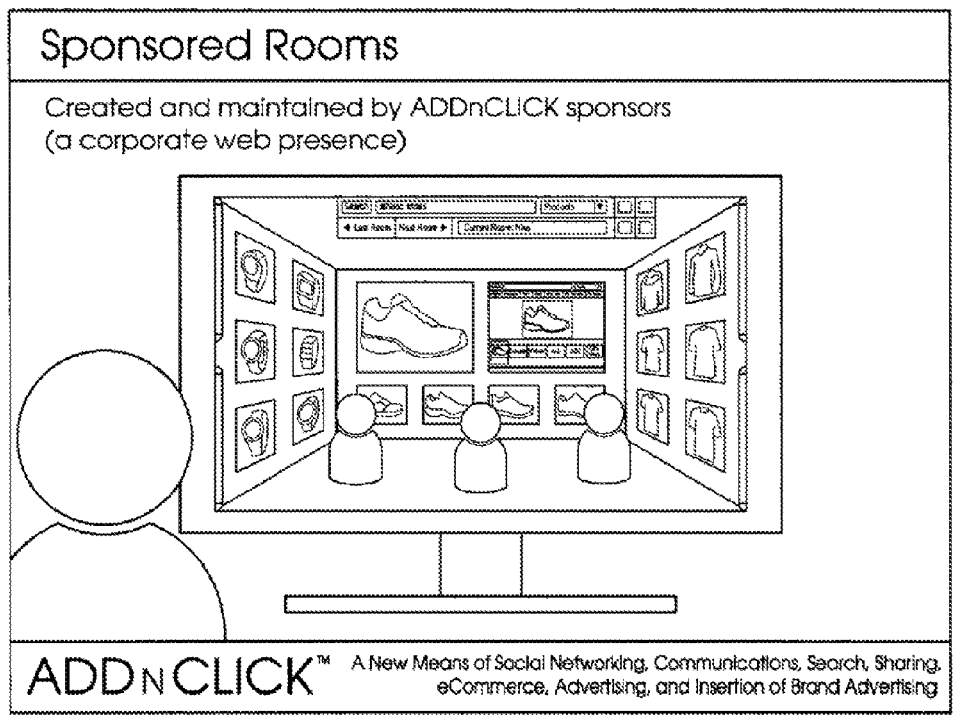
Figure 1D:
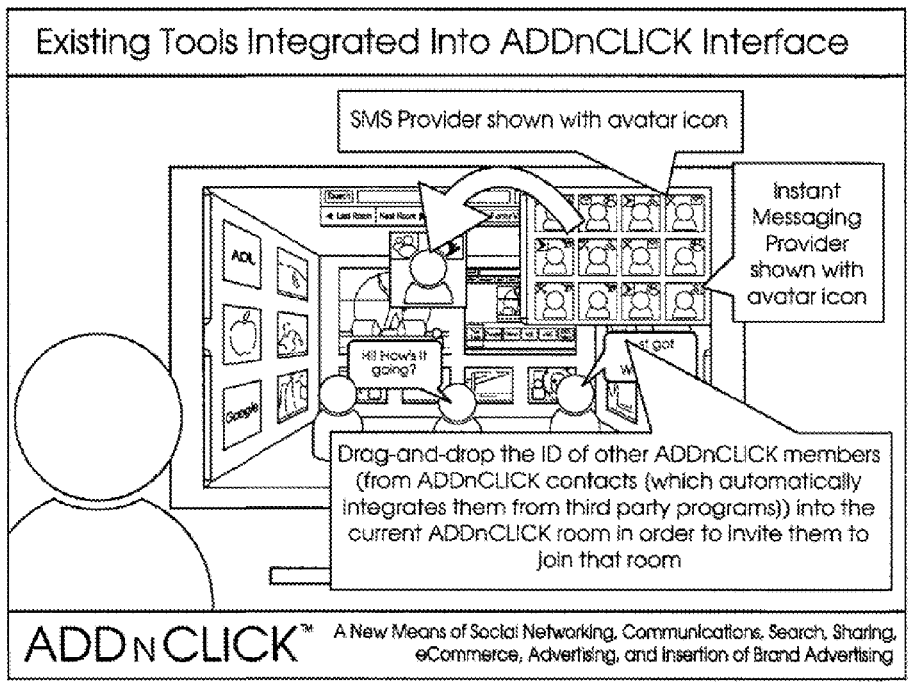
Figure 1E:
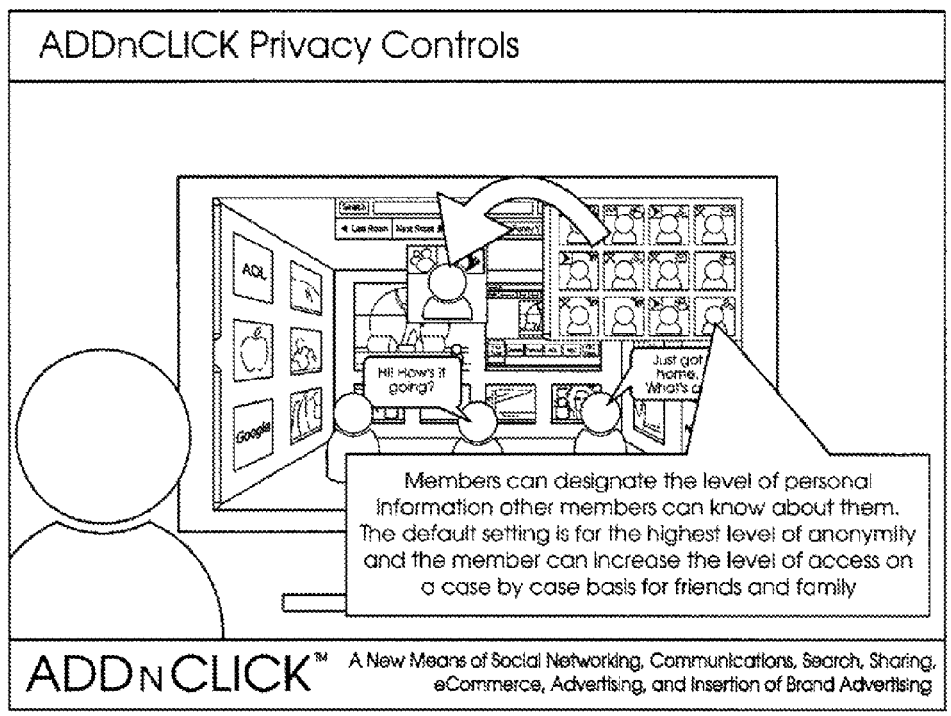
Figure 1L:
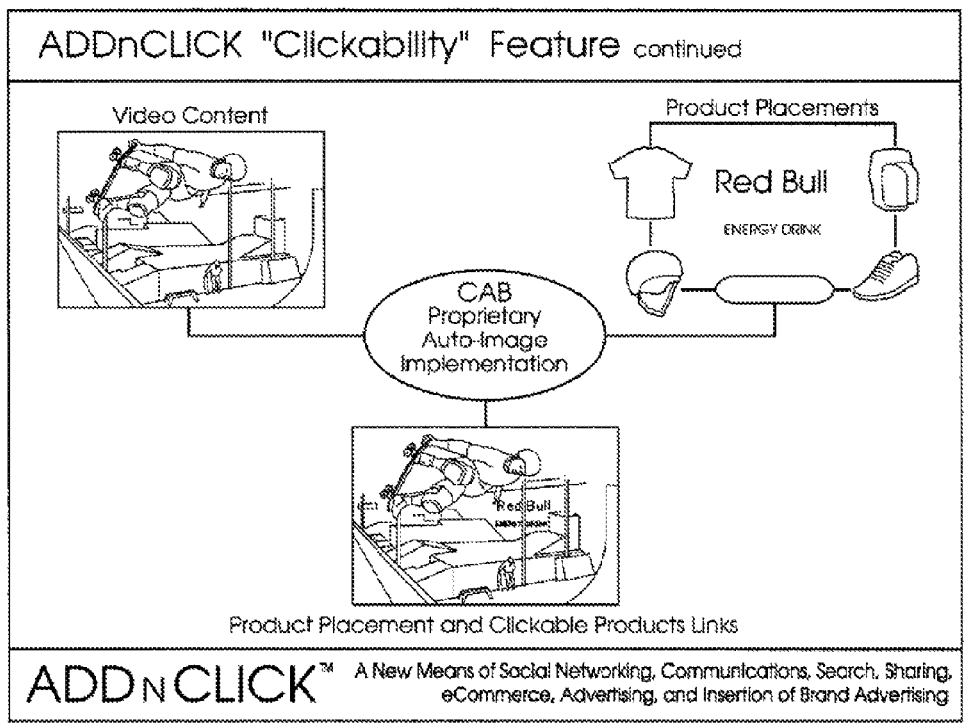
Figure 1M:
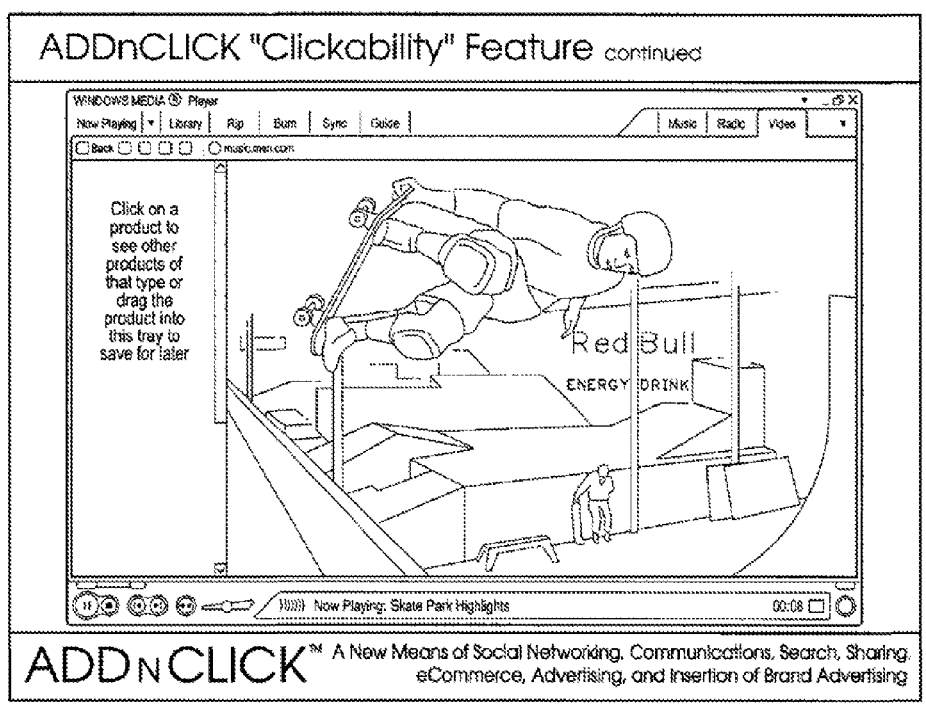
Figure 1N:
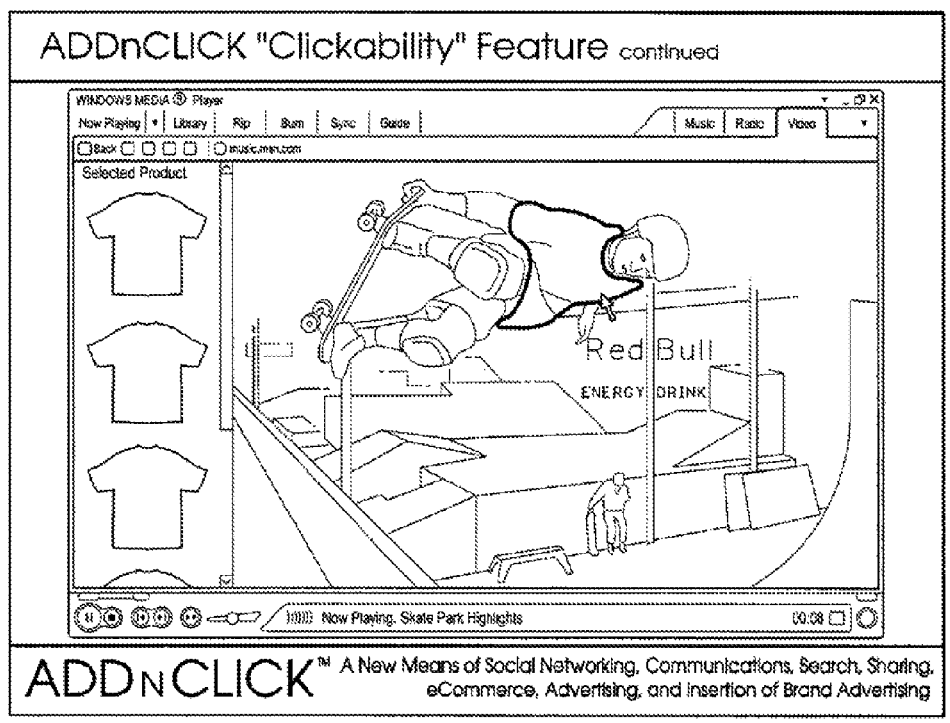
Figure 100:
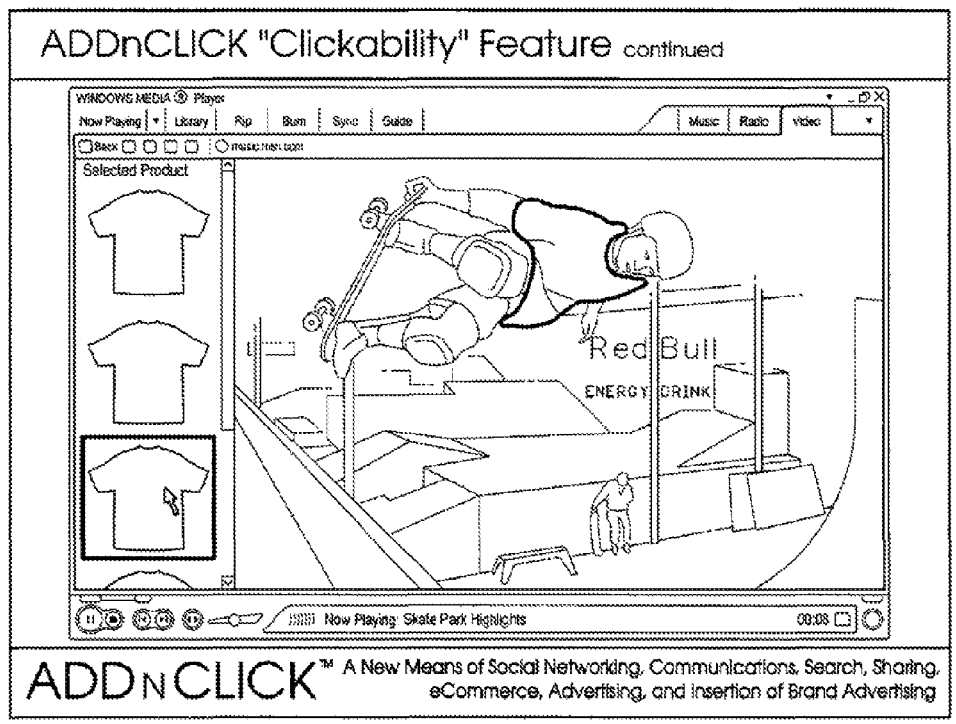
Figure 1P:
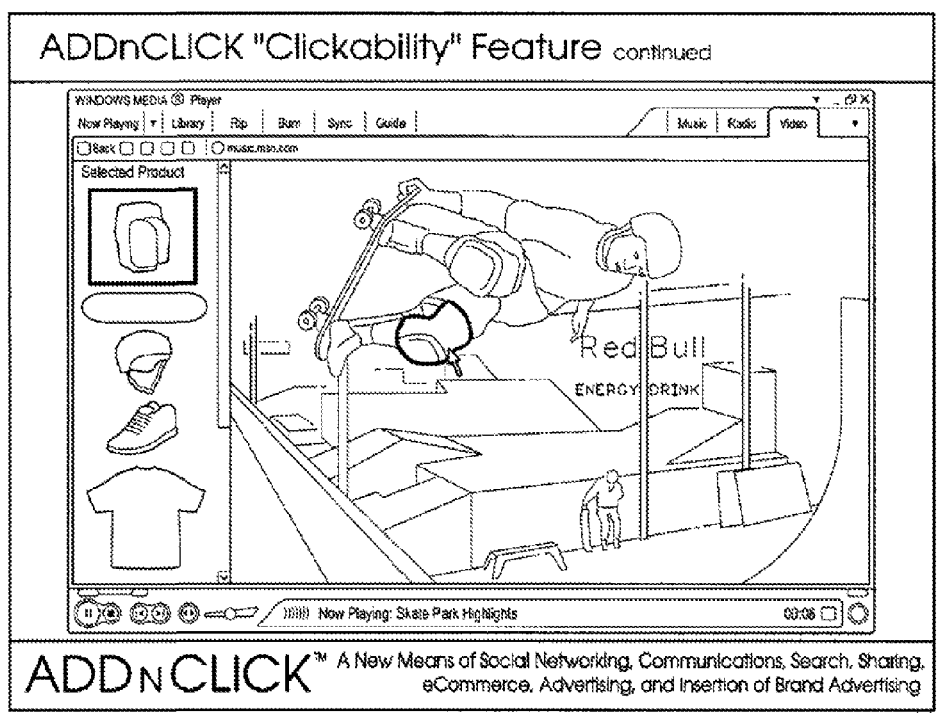
Figure 1Q:
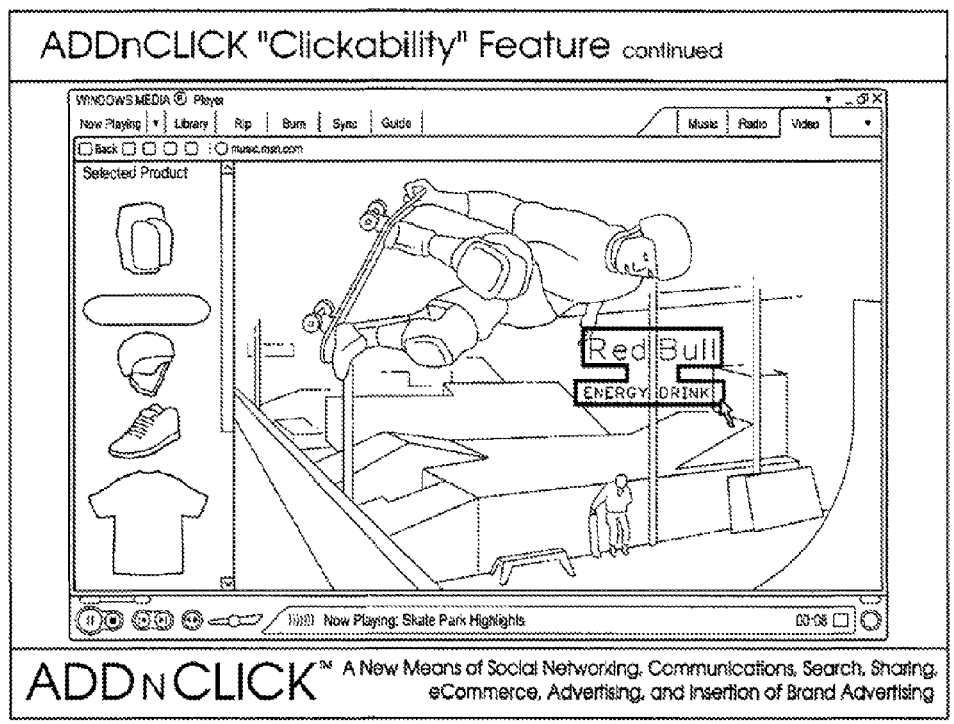
Figure 1R:
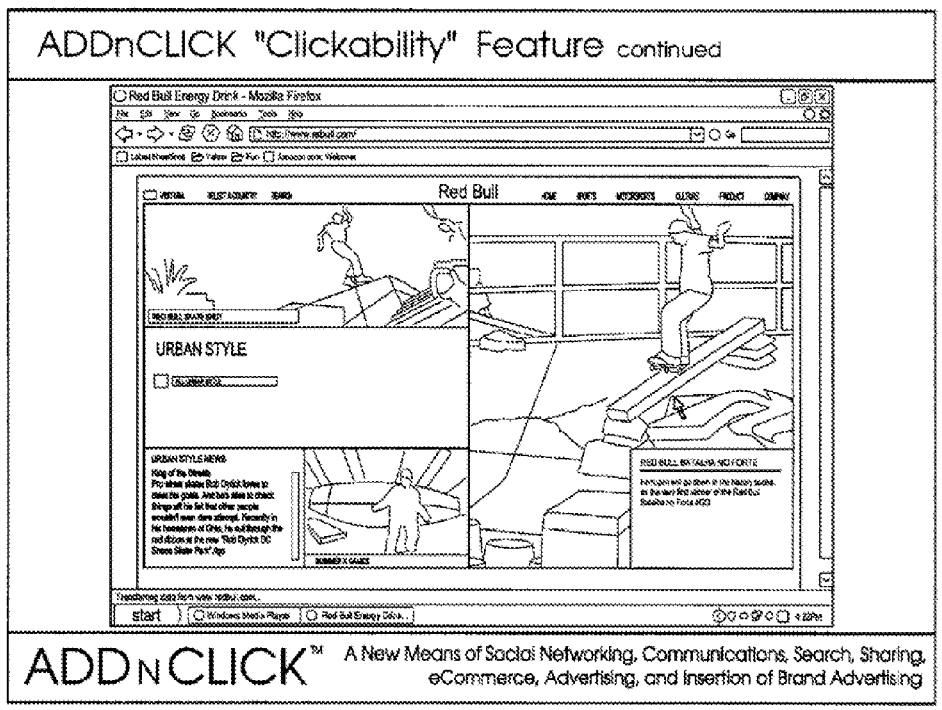
Figure 1Y:
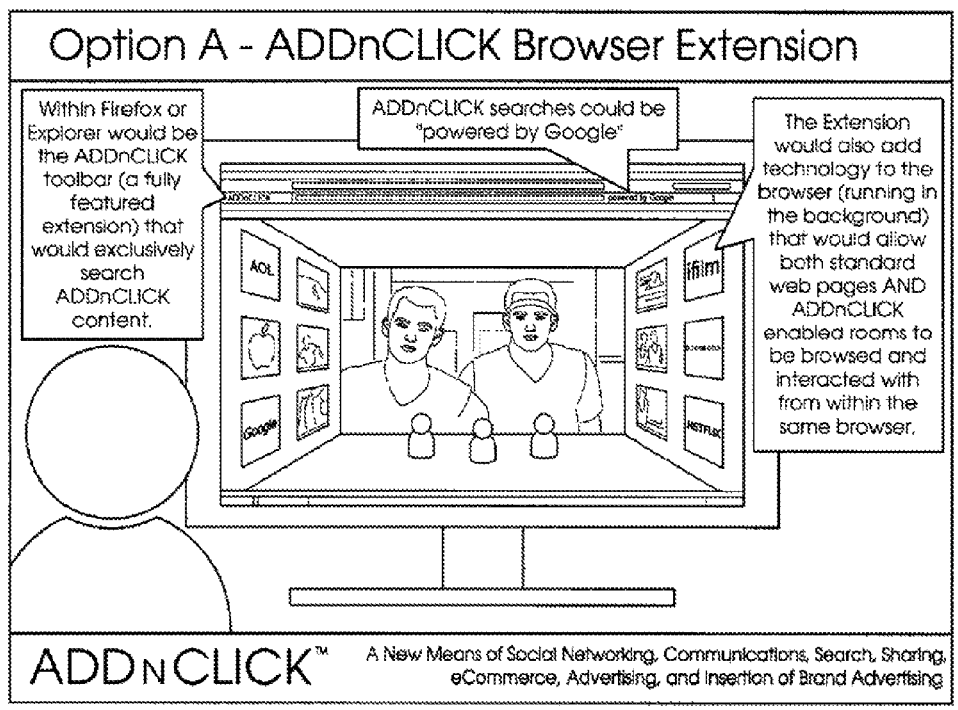
Figure 1Z:
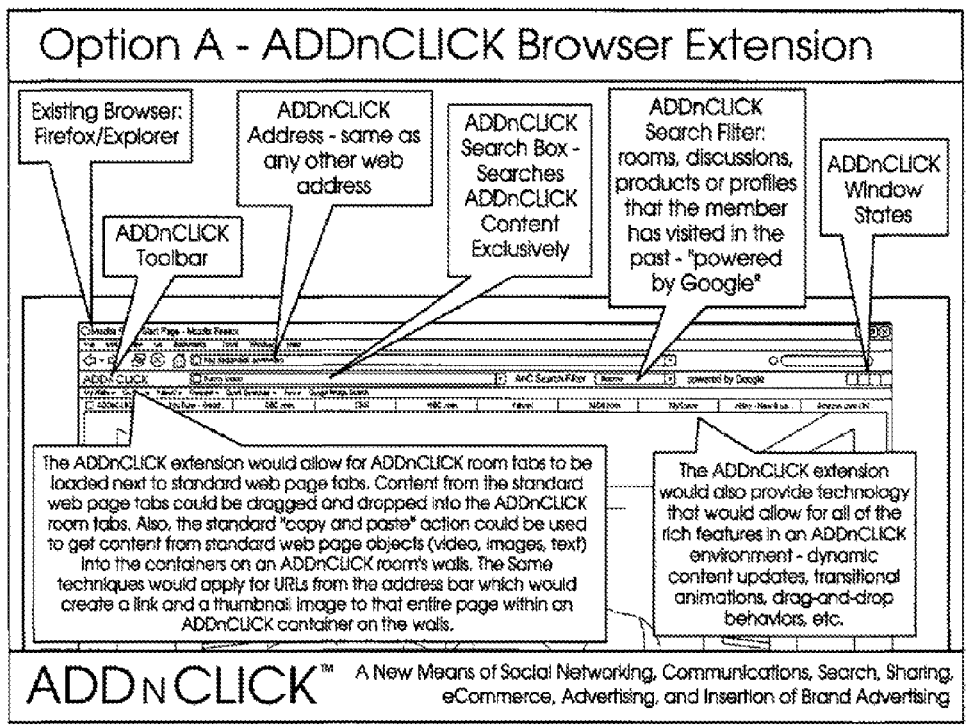

How the Invention Works:

A detailed summary of the invention and its processes is shown in the series of fifty-four slides represented by FIGS. 1A-1Z, 1AA-1ZZ, and 1AAA-1HHH. A person skilled in the art will know that there are many ways that the invention can be accomplished, of which several are described herein; however, the architecture and implementation of the invention are not limited to the few examples that are described herein. The invention claims any and all means of achieving the net result of concurrently linking users of the same and/or similar content on the internet to each other via a universal platform for social networking. It also enables richer experiences in communications, sharing, e-commerce, advertising, search, hosting and registry services, push and pull applications, anonymous communications, and rich presence in n-dimensional environments.

The ADDnCLICK application that is downloaded to the user's computer in an embodiment, will install a Persistent Client Window (PCW) that can always reside (as an opened window) on the desktop of the user's computer and/or on the display of the user's Device.

The PCW residing on the user's Device as an opened window in an n-dimensional environment (e.g., as a Window/Room) has browser-type qualities (search, messaging, etc.) that help the user to define and "push" information that is of importance to that user. For a website or web community (such as Google) that invites and sponsors the use of the ADDnCLICK application with their users, the PCW would "push" the specific videos, news, ecommerce, and other topics that their individual viewers are interested in receiving. The PCW is persistent—it is a substantially always-open and live window on the user's Device that the user can elect to minimize or view as full screen or, in some instances, to close. When the PCW is in its "always open" state, the PCW offers these websites/web communities the chance to be the first thing that their users see when they turn on their computers (along with whatever else the users have on their Devices).

Once the PCW has been installed on the user's Device, then when an internet user clicks onto content that has been registered with ADDnCLICK, a separate Window/Room will open on the user's device that contains a thumbnail-size representation of the Content they have clicked on as well as their user ID information. The ADDnCLICK application will concurrently link that user with other ADDnCLICK users (into that same Window/Room) who have clicked on the same or similar Content—bringing with them the thumbnails of the Content that they have clicked on and brought in. The ADDnCLICK process is a unique way to link any and/or all content with social networking. The ADDnCLICK users can communicate with others on the topic of the content they have clicked on, they can concurrently view the content together and communicate with each other, they can concurrently move from one Window/Room to another to explore other links related to their subject, etc. Users can drag and drop content into the ADDnCLICK Window/Room to communicate and share with others in the ADDnCLICK Window/Room. Users can create their private ADDnCLICK rooms for archiving content for their personal use or for bookmarking.

The ADDnCLICK application can exist as a huge underlayer connecting all content of the entire internet to push applications and to use the metadata of the content for social networking, ecommerce, ad revenue opportunities, etc.

Web communities (such as Google, YouTube, Veoh, LaLa.com, MySpace, CyWorld, Yahoo, MSN, etc.) or individual users will be motivated to register the location and metadata (descriptive language tags) of their Content with and in the ADDnCLICK registry to be compensated by revenue sharing or some other means of financial gain. These web communities and/or the individual users will contribute, monitor and maintain the Content that is registered in the ADDnCLICK registry servers that details the location and description of the Content.

In accordance with a novel anonymous subscriber process revealed in the above-referenced ANONYMOUS patent application, the ADDnCLICK application can also give users a means to conduct anonymous communications with others whether online or offline (e.g., through any communications means). In one application of the invention, the subscriber establishes an account with a server and establishes an associated token. The subscriber then publishes the token associated with information of interest, e.g. an advertisement for an item; an online auction item, a personal ad, or other information. The publication media may be any media, e.g. newspapers, magazines, flyers, radio, television, web page, e-mail, online auction, direct mail, public address announcement, or any other media. The subscriber then receives a call from a caller, the call being established by the server based on the token provided by the caller. Once the call is terminated, the subscriber may further initiate an anonymous callback to the caller, if the caller established callback information with the server. In one embodiment, the caller may establish a token with the server for callback purposes.

In accordance with the novel caller process described therein, the caller observes the interesting information and notes the associated contact information for the server together with the token. The caller then calls the server and provides the token. The caller also typically is given a brief explanation of the system and is offered an opportunity to provide callback information anonymously. If the subscriber is successfully contacted, the caller then is connected to the subscriber for a conversation. Once the conversation is completed, the caller may be offered further options, e.g. anonymous callback. If the subscriber cannot be contacted, the caller may be offered voice mail and may again be offered anonymous callback.

System Architecture:

Three types of "rooms" are described herein, including private, public and sponsored "rooms." Private "rooms" will be described later. Public and sponsored "rooms" are described immediately below. Sponsored "rooms" are described below as including branded "rooms." In this invention, "Windows" or "Rooms" can be one or more of the following: a scene, an environment, a landscape, a room, building, desktops, furnishings, software applications, accessories, decorations, transparencies (e.g. of web pages, documents, websites, etc.) against a more visual background, and the like (any or all of which are hereinafter referred to as the "virtual environment") that are created, edited, presented and viewed on the display of a computer, a Personal Digital Assistant (PDA), a cellular telephone, and/or any type of device that can be connected to the internet or any other type of network (hereinafter referred to as the "Device").

Figure 2:
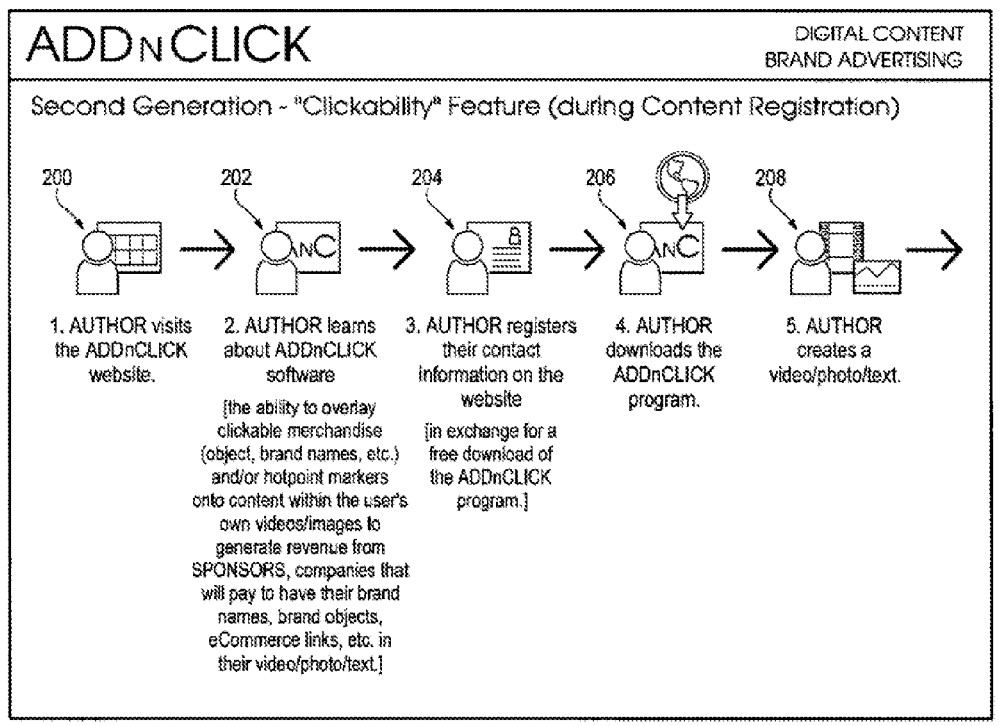
FIG. 2 is an iconic flowchart illustrating aspects of content authorship and registration in accordance with one embodiment of the invention.
Figure 2:
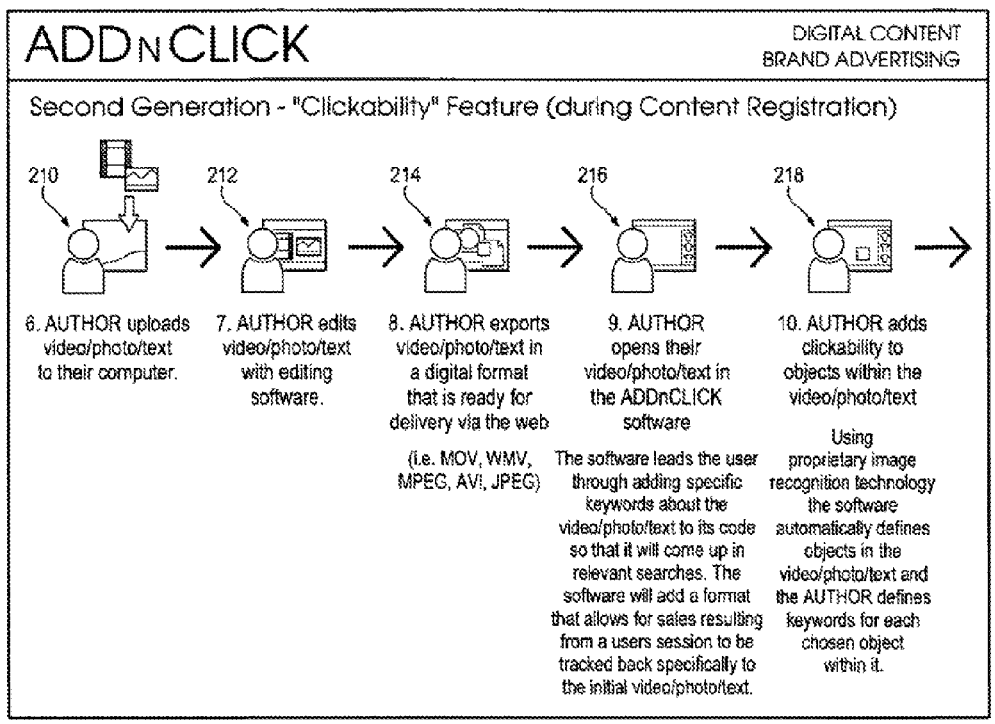
Figure 2:
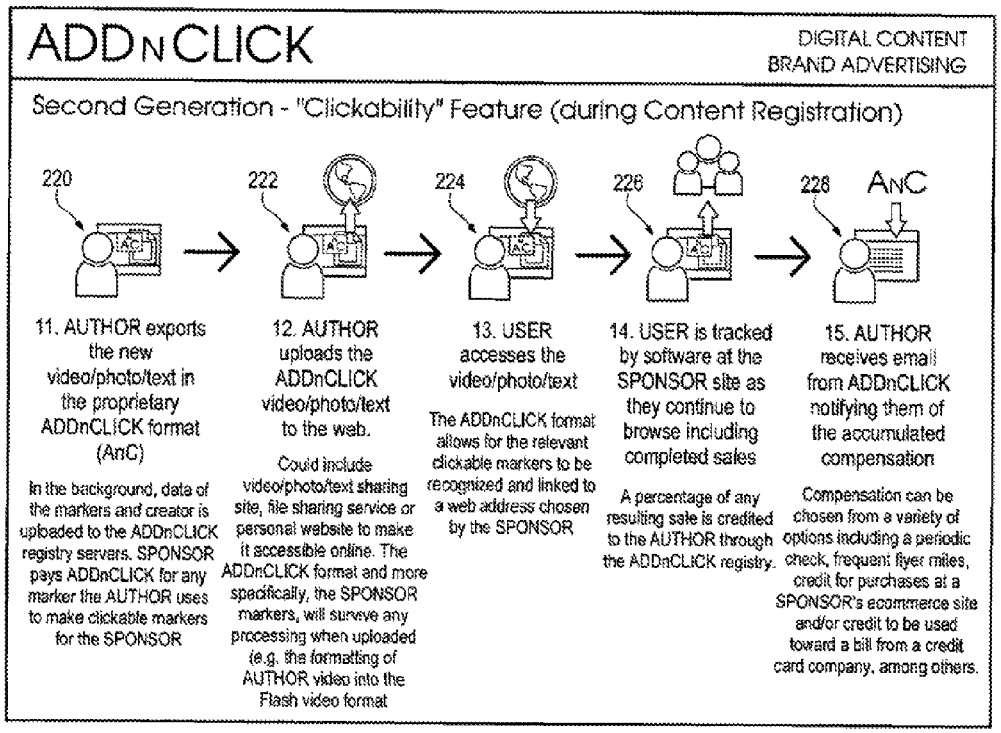

Content registration is illustrated in FIG. 2 by an iconic flowchart. At 200, a user, e.g. an author, visits the host website. At 202, the author learns about the invented system (i.e. the ability of the system to connect other viewers of the same or similar content to each other in a shared visual platform that optionally contains areas sponsored by advertisers that will generate ad revenue that may be shared with the content originator and/or user). At 204, the author registers his or her contact information on the host website, e.g. in exchange for a free download of the system software. Registration includes a description of the individual based upon parameters and criteria needed by advertisers to post user-specific ads of interest. At 206, the author downloads the system software. At 208, the author creates a video, a photo, text, music or other content. Content can include: web pages and/or websites (from any web community—such as from MySpace, YouTube, Google, Cyworld, PCHome, etc.); any material which is of interest to users; text, video, photos and other still images, oral content, symbols, graphic images, video games, any motion content (e.g. video conference calls, television or satellite video clips, live television or satellite video feeds, etc.), blogs, podcasts, vlogs, music, speech, sound; any other form of electronic/non-electronic media and/or content that is or can be visually displayed, spoken (e.g., oral content) and/or listened to and/or otherwise communicated (such as by handwriting, gestures, meaning, inference, etc.); any information that is available for retrieval by the user (including Web pages, images, music, audio, white papers, driver and software downloads as well as training, educational and reference materials), file downloads, software formats, software codes, advertisements; the code characters that occur between the start-tag and the end-tag in a document or element that can be interpreted as data, proper sub-elements, included sub-elements, other markups, or a mixture of them, and can include text as well as images, text in raster images, image map regions, animations (e.g., animated GIFs), applets and objects, ascii art, scripts, images used as list bullets, spacers, graphical buttons, sounds (played with or without user interaction), stand-alone audio files, audio tracks of video, and video (hereinafter collectively referred to as the "Content").

Alternatively or additionally to creating Content, at 210, the author uploads Content to his or her computer from one or more external sources such as a video library, favorite website, digital camera or the like. At 212, the author edits video/photo/text with editing software. At 214, the author exports Content in a digital format that is ready for delivery via the web (e.g. MOV, WMV, MPEG, AV1, MP3, and/or JPEG files). At 216, the author opens his or her Content under operation of the system software. The system software leads the user through a process of adding specific keywords that describe the Content to its code so that it will come up in relevant searches. This can be done, as is known, by tagging content with its metadata descriptors or any suitable alternative means. The system software adds a format that allows for sales resulting from a user session to be tracked specifically to the original Content.

At 218, the author can add clickability to objects or to hotspots within the Content.

At 220, the author exports the tagged or otherwise trackable Content in a proprietary or open system software format. In the background, the identification data of the content are uploaded to the system software registry servers, to be described in detail below. A sponsor pays the website provider, e.g. ADDnCLICK, Inc. (assignee of the present invention), for any use of the registered content that brings users into the ad sponsored or website provider-sponsored 'rooms.'

At 222, the author uploads the proprietary exported Content to the website provider. The upload is destined for Content sharing sites to make the content accessible online. The proprietary format and identification information will survive any processing when uploaded (e.g. the formatting of the author's video in the Flash video format). At 224, a user accesses the Content. The user sees the system software website provider's logo or some other unique identifier that, when clicked on, opens a system software program on the user's desktop (or in his or her browser). This allows the user to be in a window, a room or any other type of n-dimensional environment connected to other users who have similarly clicked on the same or similar content (the "Window/Room"). In this environment, the user can communicate by text and/or voice and/or voice-and-video to other internet users in the shared software system's public or sponsored Window/Room environment.

At 226, user interaction, e.g. interaction including completed sales, is tracked by software at a sponsored site as the user continues to browse. A percentage of any completed sale is credited to the author through the website provider's secure online registry. At 228, the author receives an e-mail from the website provider notifying him or her of the accumulated compensation. Compensation can be obtained in a variety of ways including a periodic check or other form of monetary compensation, "frequent flyer" miles, credit for purchases at a sponsor's e-commerce site and/or credits to be used toward a bill from a credit card company, among others.

Figure 3:
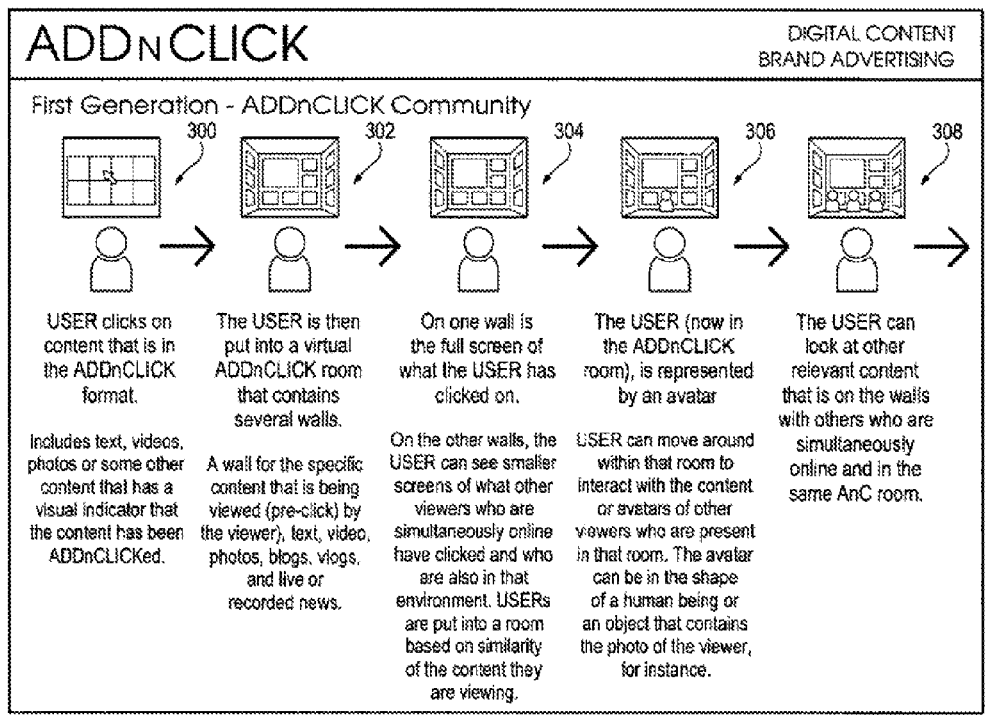
FIG. 3 is an iconic flowchart illustrating aspects of the author and user content access and interaction in accordance with one embodiment of the invention.
Figure 3:
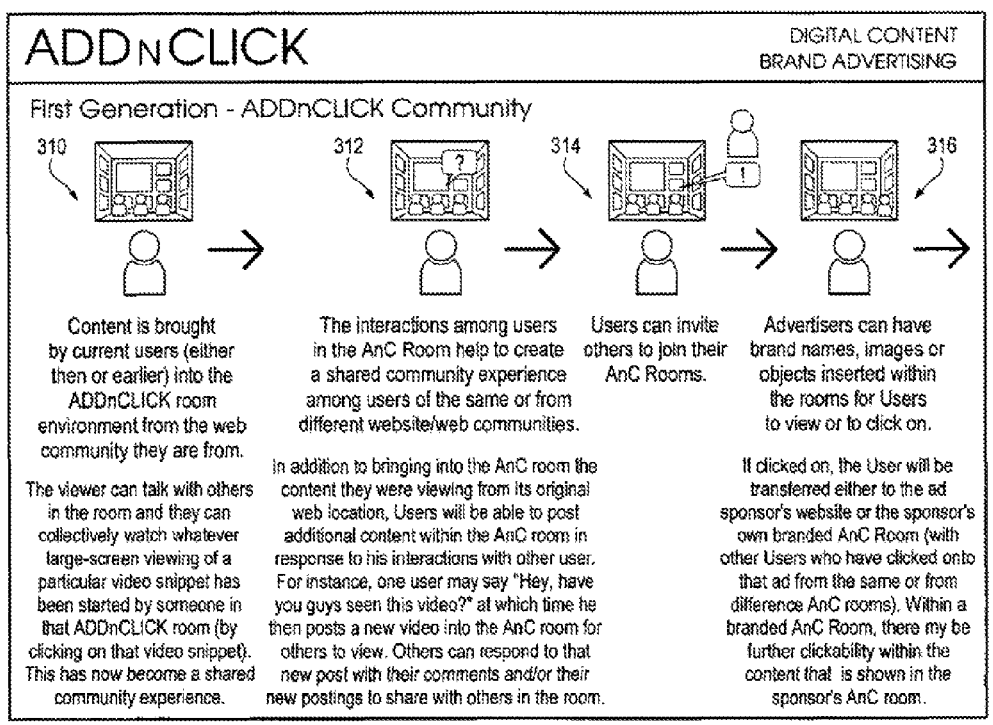
Figure 3:
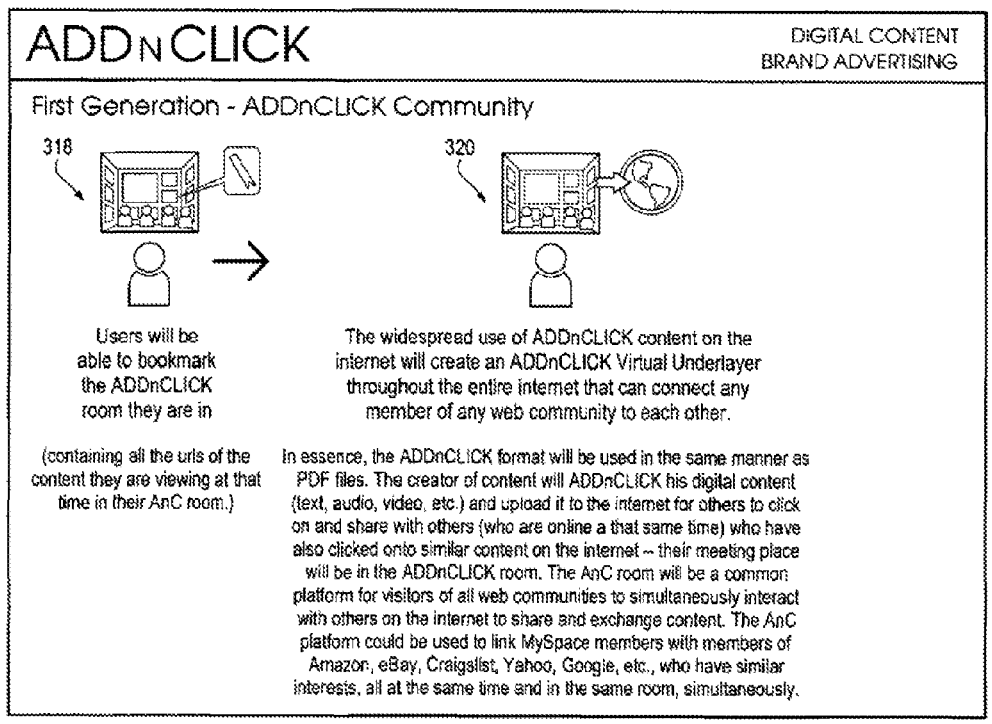

Content viewing and/or interaction is further illustrated in FIG. 3 by an iconic flowchart. At 300, a user clicks on Content that is in the ADDnCLICK format. The Content can include text, videos, photos, audio, music or other content that has been equipped for use with the ADDnCLICK format. At 302, the user is placed in a Window/Room that contains one or more "Walls" including a Wall for the specific content that is being viewed (pre-click) by the viewer and/or listener. As illustrated at 304, one Wall includes the full screen of what the user has clicked on. On the other Walls, the user can see smaller screens of what other viewers who are concurrently online have clicked and who are also in that environment. Users are placed into a Window/Room based on individually-articulated preferences or, simply and automatically, based on the same or the similarity of the content they are reading, viewing and/or to which they are listening and/or otherwise engaged and responding.

Those of skill in the art will appreciate that a Window/Room can be presented to a user on his or her Device using any suitable criteria. For example, in a Windows™ operating system environment, the Window/Room can be presented in and can be viewable in a window that is one of many that are opened (or minimized) on the computer's desktop, permitting the user to continue to multi-task while also social networking in accordance with the teachings herein. With Windows™, multiple windows can be open concurrently, so in that environment, a user can interact in one or more Windows/Rooms concurrently, interacting with two or more user groups at once. Alternatively, the Window/Room can be full-screen and the invented social networking and communication software can take over the entire display of the Device. Under other operating systems, it can take any suitable viewable and presentable form.

At 306, the user who is now in the Window/Room is represented by an avatar. The user can move around within that Window/Room to interact with the Content or avatars of other viewers who are present in that Window/Room. The avatar for example can be in the shape of a human being or an object that contains a photo of the user, and the avatar can be still or in motion. In general, an avatar can be any depiction (even symbolic or textual) representing a user, whether selected by the user or otherwise provided (e.g., automatically, randomly, or otherwise generated by software, designated by another user, etc.). Indeed, the avatar can be animated and can even adopt the physical characteristics and gestures of the user. As illustrated at 308, the user can look at other relevant Content that is on the one or more Walls with others who are concurrently online in the same sponsored Window/Room. At 310, Content is brought by current users into the sponsored Window/Room environment from their own favorite websites and/or web communities. The viewer can talk with others in the Window/Room and they can collectively watch whatever large-screen viewing of a particular piece of Content (e.g., a video snippet or feature film that has been started by someone in that same Window/Room) by clicking on the Content. This has now become a shared community experience for those users metaphysically and/or sensorily "present" in the Window/Room.

The Window/Room can of course be a depiction of a scene, a landscape, an outdoor location, shopping mall, shop, library, gallery, landmark, or any other suitable location or environment. It can be an entirely fictional location, a simulation of a real location, or actual images of a real location. It can be still or in motion, e.g. the Window/Room can be panned and/or zoomed as though a user were moving around inside it. It can be n-dimensional, where n equals 2, 2.5, 3, 4 (x, y, z, and time (t)), or more. For example, fast forward (FFW), slow motion (SM), or other video play and view options can be incorporated within the spirit and scope of the invention to realize the time-space dimensions. The Window/Room alternatively can be a voice/audio/music session and have no video aspect at all. Thus, within the spirit and scope of the invention, the Window/Room and its Walls can feature text, audio, still imagery, film, streaming feeds, video, alone or in combination, and/or any type of Content.

As illustrated at 312, the interactions among the users in the sponsored Window/Room help to create a shared community experience among users of the same or from different websites and/or web communities. In addition to bringing into the sponsored Window/Room the Content they were viewing from its original web location, users are able to post additional Content within the Window/Room in response to their interactions with other users. For example, one user may say "Hey, have you guys seen this video?", at which time he or she then posts a new video into the Window/Room for the others to view. Others can respond to that new post with their comments and/or new postings to share with others in the same Window/Room.

As illustrated at 314, users can invite others to visit or join their Window/Room. Such can be done via instant messaging, e-mail, phone, drag-and-drop or any other suitable means. For example, a buddy can be added to and/or retrieved from a list and invited by semi-automatic software means by clicking in an IM (instant messaging) sub-window on the buddy's name or icon, whereby an e-mail or text message is posted by the system software to the buddy inviting him or her to visit the 'room.'

Those of skill in the art will appreciate that ADDnCLICK users can create ADDnCLICK groups (like Yahoo Groups), wherein they can invite other users to join and participate in that group with live (ongoing) or stored sessions. This feature of the invention will be better understood by reference below to FIGS. 6A-6D.

At 316, advertisers can have brand names, images or objects inserted within sponsored rooms for users to view or to click on. If clicked on, the user will be transferred either to the ad sponsor's website or to the sponsor's own branded Window/Room with other users who have also clicked onto that ad from the same or from a different Window/Room. Within a branded Window/Room, there may be further clickability within the Content that is presented in the branded Window/Room.

At 318, users are able to bookmark the Window/Room they are visiting. The bookmark can provide access to all of the URLs of the content they are viewing at that time in their Window/Room. As illustrated at 320, the widespread use of the ADDnCLICK application on the internet can create a virtual 'underlayer' throughout the entire internet that can connect any member of any web community (such as Google, YouTube, MySpace, MSN, Yahoo, CyWorld, etc.) to others who are concurrently engaged in the same/similar content on the internet. The ADDnCLICK format may be proprietary and used in the same manner as ".pdf" files, or it can be an open-source format. The author or creator of Content adds and clicks his or her digital Content (text, audio, video, etc.) and uploads it to the internet for others to click on and share with yet others (who are online at the same time) who have also clicked onto the same or similar content. Their "meeting" place is the ADDnCLICK Window/Room. This Window/Room is a common platform for visitors of all web communities to concurrently interact with others live on the internet, to communicate with each other, and to share and possibly exchange Content. The ADDnCLICK live social networking platform can be used to link members of newer user groups (such as ADDnCLICK) with members of older user groups (such as Amazon, eBay, Craigslist, Yahoo, Google, etc.) who are concurrently engaged in the same and/or similar content and, in this manner, the ADDnCLICK application frees users from being limited to social networking that conventionally has been limited to any one particular social network.

Rich content will be understood to involve capturing and making available to the user much more information taken from a variety of different sources. Nevertheless, privacy and/or anonymity concerns are also addressed by the invention so that users feel free to conduct on-line searches without undue concern that confidential or personal information, e.g. search criteria, viewing habits, etc., might be seen by others without permission from the source of such information.

Figure 4:
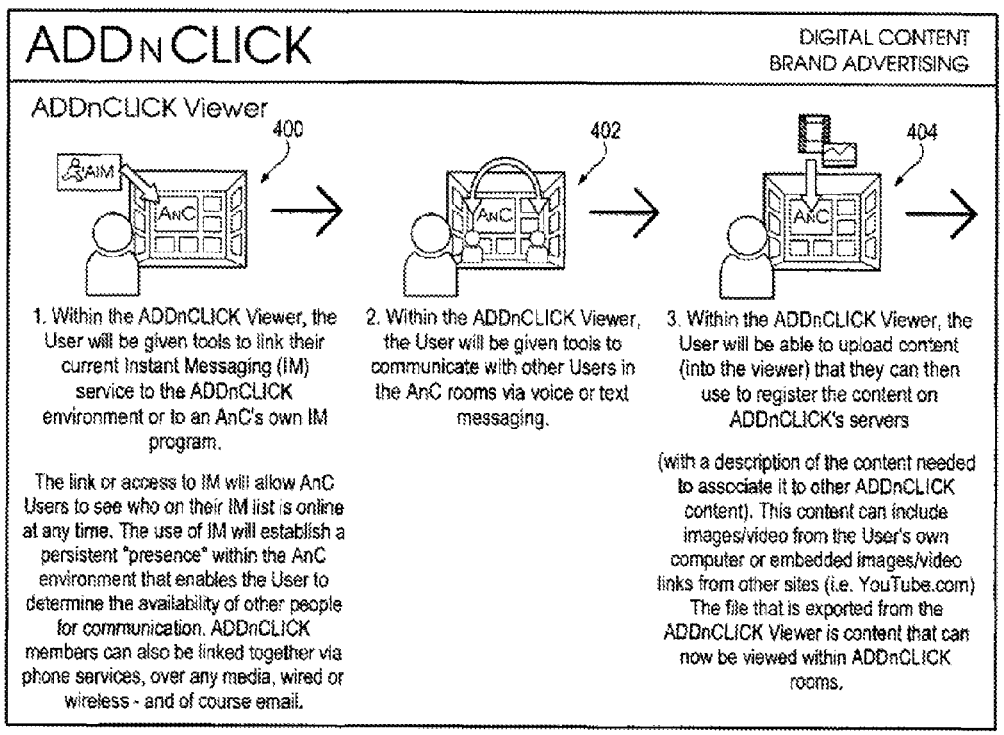
FIG. 4 is an iconic flowchart illustrating aspects of the viewer in accordance with a first embodiment.
Figure 4:
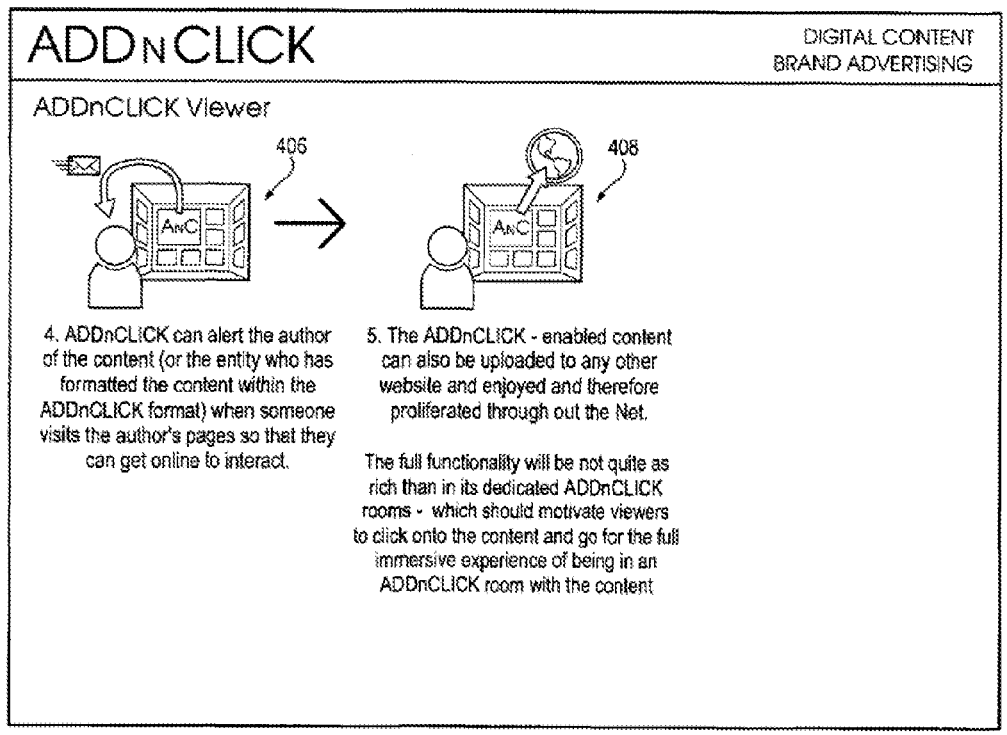

A Viewer that forms a part of the invention is further illustrated in FIG. 4 by an iconic flowchart. At 400, within the ADDnCLICK Viewer, the user is given tools to link their current instant messaging (IM) service to the ADDnCLICK environment or to ADDnCLICK's own IM program. The link or access to IM permits ADDnCLICK's users to see who on their IM list is online at any time. The use of IM in this manner establishes a persistent "rich presence" (as defined by internet industry standards for "rich presence"—see http://www.ietf.org/rfc/rfc4480.txt) within the ADDnCLICK environment that enables the user to determine the availability of other people for live communication and social networking. ADDnCLICK users can also be linked together via phone services, over any media, wired or wireless (including local area networks (LANs) and wide area networks (WANs), whether connected to the internet or not), and, of course, e-mail.

At 402, within the ADDnCLICK Viewer, the user is given tools to concurrently communicate with other users in the ADDnCLICK Window/Room via voice or text messaging. At 404, the user is able to upload Content (into the Viewer) that they can then use to register the Content on ADDnCLICK's servers. Preferably, this is done with a description of the content needed to associate it to other ADDnCLICK Content. This content can include Content from the user's own Device or embedded content links from other sites (e.g. YouTube.com). The file that is exported from the ADDnCLICK Viewer is Content (with a capital C) that can now be viewed within ADDnCLICK Windows/Rooms.

In the Viewer, the user can be asked to log onto ADDnCLICK's servers with his or her personal I.D. Once logged on, ADDnCLICK's servers will allow the user to access his private ADDnCLICK™ homepage remotely from any computer and to gain access to all the content, bookmarks, communications links, IM contacts, etc., that are stored on his or her homepage on his or her remote computer (if that computer is turned on and is live on the internet) or stored on a remote server. In this way, the user will be able to access all the functionality of his ADDnCLICK™ personal homepage from one computer to the other, or through his or her cell phone, his PDA, or any other internet-enabled device that will allow the user to log in and remotely access his or her ADDnCLICK™ homepage, wherever it is.

At 406, ADDnCLICK software can alert the author of the Content (or the entity who has formatted the Content within the ADDnCLICK format) when someone visits the author's pages so that they can go online and interact with one another. At 408, The ADDnCLICK-enabled Content can also be uploaded to any other website and enjoyed and therefore proliferated throughout the internet. The full functionality will be not quite as rich as in its dedicated ADDnCLICK Window/Room. This motivates viewers to click onto the Content and experience the full immersive experience of being in an ADDnCLICK Window/Room and be linked live to others who are concurrently engaged in the same/similar Content.

Summary of User Registration and Viewing Under the Invented ADDnCLICK System:

To obtain a free ADDnCLICK Viewer, the User will go to ADDnCLICK.com (or to the website of one of ADDnCLICK's licensees) to register his or her identity.

Registration will include a description of the individual based on parameters/criteria needed by advertisers to post User-specific ads of interest to the User. Upon registration, the ADDnCLICK Viewer will be downloaded to the User. Within the ADDnCLICK Viewer, the User will be given tools to link their current Instant Messaging (IM) service to the ADDnCLICK environment or to an ADDnCLICK's own IM program. The link or access to IM will allow ADDnCLICK Users to see who on their IM list is online at any time. The use of IM will establish a persistent "presence" within the ADDnCLICK environment that enables the User to determine the availability of other people for communication. ADDnCLICK members can also be linked together via phone services, over any media, wired or wireless—and, of course, email. As will be seen, privacy and/or anonymity nevertheless are protected.

Within the ADDnCLICK Viewer, the User will be given tools to communicate with other Users in the ADDnCLICK Windows/Rooms via voice, video, text, or any other means of messaging.

Within the ADDnCLICK Viewer, the User will be able to upload Content (into the Viewer) that they can then use to register the content on ADDnCLICK's servers (with a description of the Content needed to associate it to other ADDnCLICK content). The file that is exported from the ADDnCLICK Viewer is Content that can now be viewed within an ADDnCLICK Window/Room.

ADDnCLICK software can alert the author (or the entity who has formatted the content within the ADDnCLICK format) of the content when someone visits the author's pages so that they can get online to interact.

Summary of Window/Room Types Used in the Context of the Invented System:

1) Public Window/Room: When the User clicks onto an ADDnCLICK'd source of Content (i.e., Content that has been registered with ADDnCLICK's servers), he or she will be transferred into a Public ADDnCLICK Window/Room where he or she can interact concurrently with others who have clicked on the same or other similar ADDnCLICK'd Content.

(a) Users will be able to invite other Users into any of the ADDnCLICK Windows/Rooms (Public, Private, Sponsored) through email, IM, or some other means of notification for live, concurrent social networking.

(b) Users will have their own ADDnCLICK IM section/window that will be in each ADDnCLICK Window/Room they enter. In this way, Users are able to add other ADDnCLICK members in the Window/Room to their IM buddy list (by "dragging and dropping" the other User's name into the IM window, or by some other means).

(c) Users will be able to add Content they want to share with others in the Public ADDnCLICK Window/Room or delete it from the ADDnCLICK Window/Room.

(d) Users will be able to "bookmark" the URL address of any Content they see in the Window/Room for later viewing.

(e) Users will be able to "drag and drop" Content from one ADDnCLICK Window/Room to the other (whether the Window/Room is Public, Private, Group, or Sponsored).

(f) There can be a toolbar in every ADDnCLICK Window/Room for "Search" where a User can enter what they want to search for and then be transported into an ADDnCLICK Window/Room that contains the ADDnCLICK'd Content for which the User is looking. The search results could be "live" (i.e., clicked on by another User who is online at that time) or chosen from the entire pool of all Content that has been ADDnCLICK'd. Once the search result is clicked on, the User will have the option of being in an existing ADDnCLICK Window/Room to review the information with other Present Users (including the similar Content they are viewing) or the User can view the content alone in his or her own personal ADDnCLICK Window/Room.

(g) In the Public or Private ADDnCLICK Windows/Rooms, Users can store Content into the Window/Room that will be played concurrently to each other and in the sequential order of the broadcast. For instance, Users can upload videos into the Window/Room into a display area that that will be played on a screen sequentially so viewers can watch this video as they would watch TV (i.e., they can just passively watch one video after the other play sequentially). Users can do the same thing with photos, newsfeeds, etc.

2) Private Window/Room: A User can have his or her own Private ADDnCLICK Window/Room on his or her Device or browser.

(a) The User can drag-and-drop Content from the Public Window/Room into the User's Private Window/Room.

(b) Bookmarked content is stored in the User's own Private Window/Room.

(c) While in a Public or Sponsored Window/Room, the User can invite another User(s) to his or her Private Window/Room to communicate and share information with a limited audience.

(d) Users will be able to create multiple Private ADDnCLICK Windows/Rooms on their Device just as they can create multiple "folders" on their computer desktop.

(e) Ads will be posted in the Private ADDnCLICK Windows/Rooms that are directed to the particulars of the User and/or to the User's searches within the ADDnCLICK Windows/Rooms.

Figure 5:
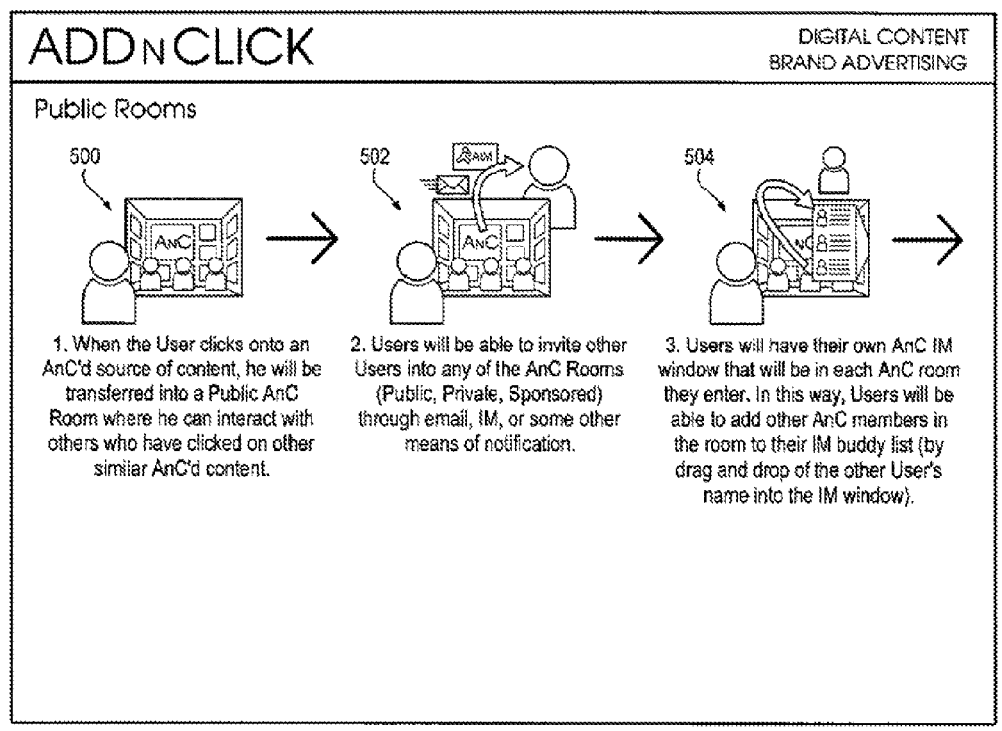
FIG. 5 is an iconic flowchart illustrating aspects of public "rooms" in accordance with a first embodiment of the invention.
Figure 5:
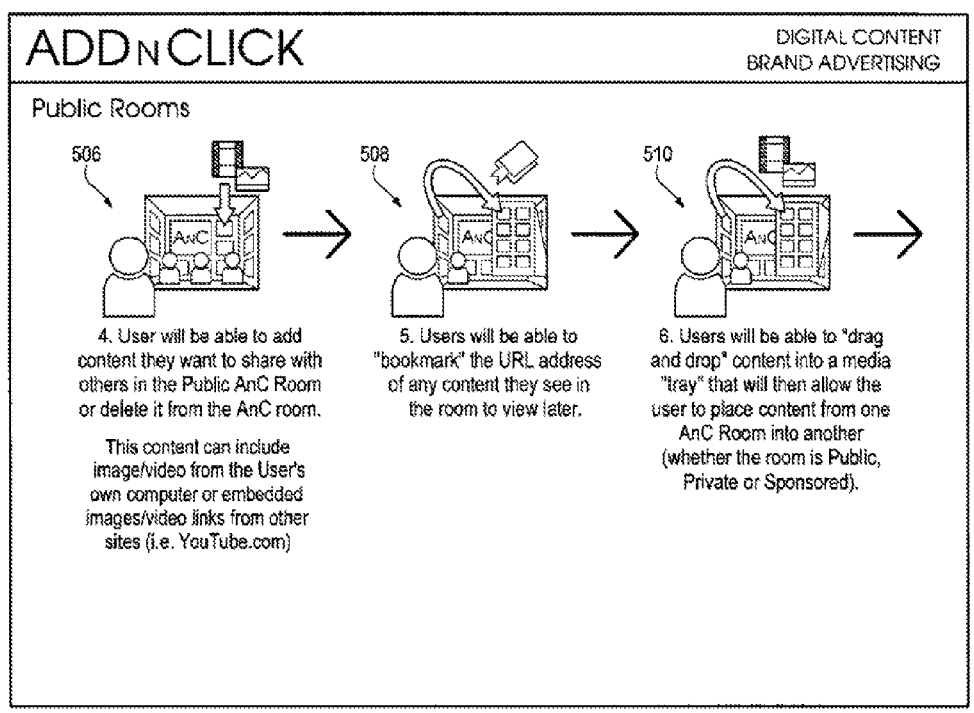
Figure 5:
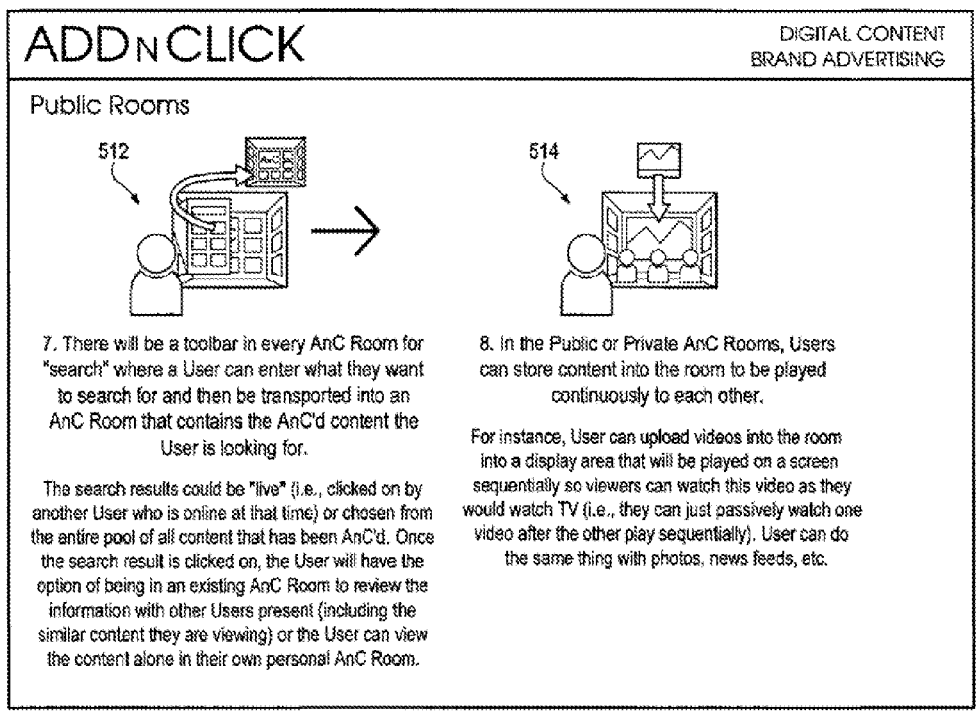

The use of Public Windows/Rooms is further illustrated in FIG. 5 by an iconic flowchart. At 500, when a user clicks onto an ADDnCLICK'd source of Content, he or she is placed in a Public Window/Room where he or she can interact with others who have clicked on other similar ADDnCLICK Content. At 502, users are able to invite other users into any of the ADDnCLICK Window/Rooms (whether Public, Private, Group or Sponsored) via e-mail, IM, or another suitable means of communication or notification. As illustrated at 504, users have their own ADDnCLICK IM window in each room they enter. In this way, users are able to add other ADDnCLICK members in the room to their IM buddy list (by drag-and-drop of the other user's name into the IM window). This is further described below by reference to FIGS. 5A-6D.

At 506, users are able to add Content they want to share with others in the Public ADDnCLICK Window/Room or delete it from the ADDnCLICK Window/Room. This Content can include images/video from the user's own computer or other Device or embedded images/video links from other sites (e.g. YouTube.com). At 508, users are able to bookmark the URL address of any Content they see in the Window/Room and might want to view later. As illustrated at 510, users are able to drag-and-drop Content into a media "tray" that will then allow the user to place Content from one ADDnCLICK Window/Room into another (whether the Window/Room is Public, Private, Group, or Sponsored.)

As illustrated at 512, there is provided in each ADDnCLICK Window/Room a search toolbar that facilitates searching and transporting the user into an ADDnCLICK Window/Room that contains the ADDnCLICK'd content for which the user is searching. The search results can be "live" (i.e. clicked on by another user who is online at that time) or can be chosen from the entire pool of all Content that has been ADDnCLICK'd. Once the search result is clicked on, the user has the option of being in an existing ADDnCLICK Window/Room to review the information with other users present therein (including the similar Content they are viewing). Alternatively, the user can view the Content alone in his or her own Personal ADDnCLICK Window/Room.

When doing a search, e.g. on Google, the search results can alert users if there are other people online who have clicked onto the same/similar topic and are in an ADDnCLICK Window/Room or that have indicated that they want to be in an ADDnCLICK Window/Room to be linked live to other users who are concurrently engaged in the same/similar content. Furthermore, users can receive a desktop, IM, e-mail, video, voice (by telephone, cell phone, VoIP, etc.), audio, or text message, or the like, that alerts them to the fact that someone is in an ADDnCLICK Window/Room on a topic in which they are known to have an interest and/or is engaged in the same/similar content as the user. This known interest can be gleaned by the invented software system.

Finally, as illustrated at 514, in Public or Private ADDnCLICK Windows/Rooms, users can store Content into the Window/Room to be displayed concurrently and continuously to each other. For instance, users can upload videos into the Window/Room into a display area that will be played on a screen sequentially so viewers can watch this video as they would watch TV. In other words, users can passively watch one video after another. Users can do the same thing with photos, news feeds, music, audio, any other type of content, etc.

3) Sponsored ADDnCLICK Window/Room:

(a) Ads posted on the walls or in areas of the ADDnCLICK Window/Room by sponsors, when clicked on, will lead the User to either the sponsor's website or to the sponsor's own ADDnCLICK Window/Room which could connect the user to others who are engaged in the ads. The sponsor can take advantage of existing high-end tools to add clickability to items/objects within their Sponsored ADDnCLICK Window/Room.

4) Group ADDnCLICK Window/Room:

(a) In a Group ADDnCLICK Window/Room, users from various groups can interactively and concurrently view Content brought to the room from other websites and other groups. Thus, group participation is possible, by virtue of the present invention, across the entire internet community of users and Content wherein interne users are linked together in a live interaction by being engaged in the same/similar content as each other.

Thus, ADDnCLICK Windows/Rooms: (1) can be in n-dimensional, flat or having depth; (2) can comprise either a single "Area/Wall" or many Areas/Walls any two or more of which might or might not be connected together (i.e. there might be a space separating two or more Areas/Walls); (3) can be a series of Areas/Walls sequenced one after the other or in any array; (4) can be viewed on a display or in a virtual environment; and (5) can be a virtual environment, a scene, an environment, a landscape, a room, building, desktops, furnishings, software applications, accessories, decorations, transparencies (e.g. of web pages, documents, websites, etc.) against a more visual background, and the like that are created, edited, presented and viewed on the display of a computer, a Personal Digital Assistant (PDA), a cellular telephone, and/or any type of device that can be connected to the interne or any other type of network. All these, singly and in combination, as well as other suitable Window/Room depictions and characteristics (including transparent images against a background that is more visually detailed), are contemplated and are within the spirit and scope of the invention.

Briefly summarizing, once Content has been put into the ADDnCLICK format:

1) Someone reads, listens, views or is otherwise engaged in Content and clicks on either the Content or a logo that indicates that the Content has been ADDnCLICK'd (i.e., registered on ADDnCLICK, Inc.'s servers).

2) The viewer is then put into an ADDnCLICK Window/Room on the display of their Device that contains several Areas/Walls for each of the following: an Area/Wall for the specific Content that is being read, viewed or listened to (pre-click) by the user, including text, video, music, audio, photos, blogs, vlogs (video blogs), and live or recorded news.

3) On one Area/Wall of the display area of the Device is the full/partial screen of what the viewer has clicked on. On the other Areas/Walls, the viewer can see size-adjustable (i.e. scalable) screens of what other viewers who are simultaneously online and who have clicked and are now in that ADDnCLICK environment. At that point, users are simultaneously linked together into a Window/Room based on being engaged in the same/similar Content. Such sameness/similarity of content can be metadata or tag-based, or more or less sophisticatedly determined, e.g. it may be literal or nuanced based on less or more sophisticated correlation, e.g. artificial intelligence (AI) engines.

4) The viewer (now in the ADDnCLICK Window/room) is represented by an avatar and can move around within that room to interact with the Content or avatars of other viewers who are present in that Window/Room. The avatar can, for example, be in the shape of a human being or an object or region that contains the photo of the viewer.

5) If the user wants to read, view, or listen to Content that pertains to the subject he or she is viewing or listening to, then he or she can go to an Area/Wall that contains multiple snippets of Content from the same or from different websites that other users have concurrently or earlier brought into the ADDnCLICK room environment from the web community whence they came. This process of the ADDnCLICK invention (linking users into a live social network with others who are simultaneously engaged in the same/similar content) enables the connection of users from one web community to users of other web communities. The viewer can talk with others in the Window/Room and they can, for instance, collectively watch whatever large-screen viewing of a particular video snippet has been started by someone in that ADDnCLICK Window/Room (by clicking on that video snippet). This has now become a shared community experience.

6) As described in FIGS. 1CCC-1HHH, in the ADDnCLICK window/room multiple users can browse, discuss and interact with the same/similar web pages and/or Content at the same time. All a user needs is to be online and running the ADDnCLICK Shared Web Browser. The shared browsing experience will allow members of different web communities (such as YouTube, MySpace, Cyworld, Flickr, etc.) to simultaneously share their web pages and content with each other in one central environment (the ADDnCLICK room). Users will be able to drag and drop or upload content from one web community/web page to the other through the ADDnCLICK platform. This feature gives users the ability to have a richer and unlimited social experience among users of all web communities that: (i) is not limited to members of just one web community; (ii) is interactive; (iii) is in real time; and (iv) is in one unifying, central platform.

7) The user can ask others in the ADDnCLICK Window/Room for advice, for help in searches, to participate in social and/or collective buying on e-commerce sites; to co-browse throughout the interne from one website to the other; to share and to exchange interne content; etc. Communications are accomplished in accordance with the invention by VoIP, IM, SMS, text messaging, cell phone, land line, or the like, or any combination thereof or by any other suitable communication means.

8) Brand advertising can be posted on one or more Areas/Walls in the ADDnCLICK environment, and can be specific to the interests of the individual viewers. (In other words, the ADDnCLICK Window/room will have areas containing a picture frame (or other graphical region) for insertion of ads from ad-delivery companies.) The characteristic qualification criteria of the ad-insertion companies are used to profile the users upon their registration with ADDnCLICK. Those ads can be clickable or non-clickable.

9) Viewers may earn points for referring other viewers to ADDnCLICK and for any sales or other revenue that is generated from the presence of those viewers in the ADDnCLICK environment.

Figure 6A:
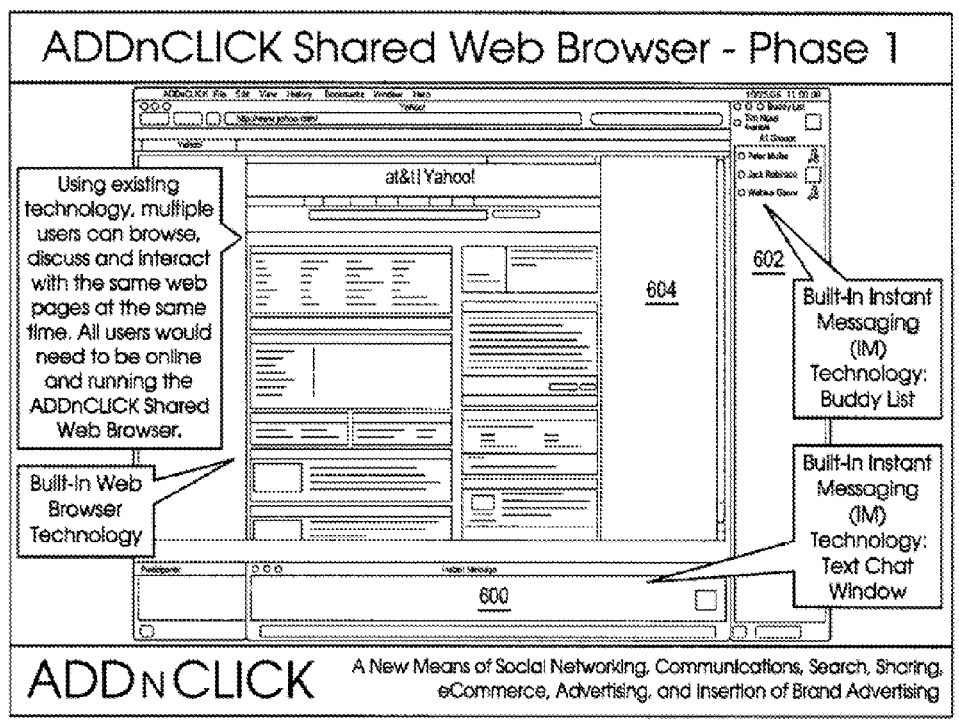
FIGS. 6A-6D are a series of screen-grab depictions of features of the invention.
Figure 6B:
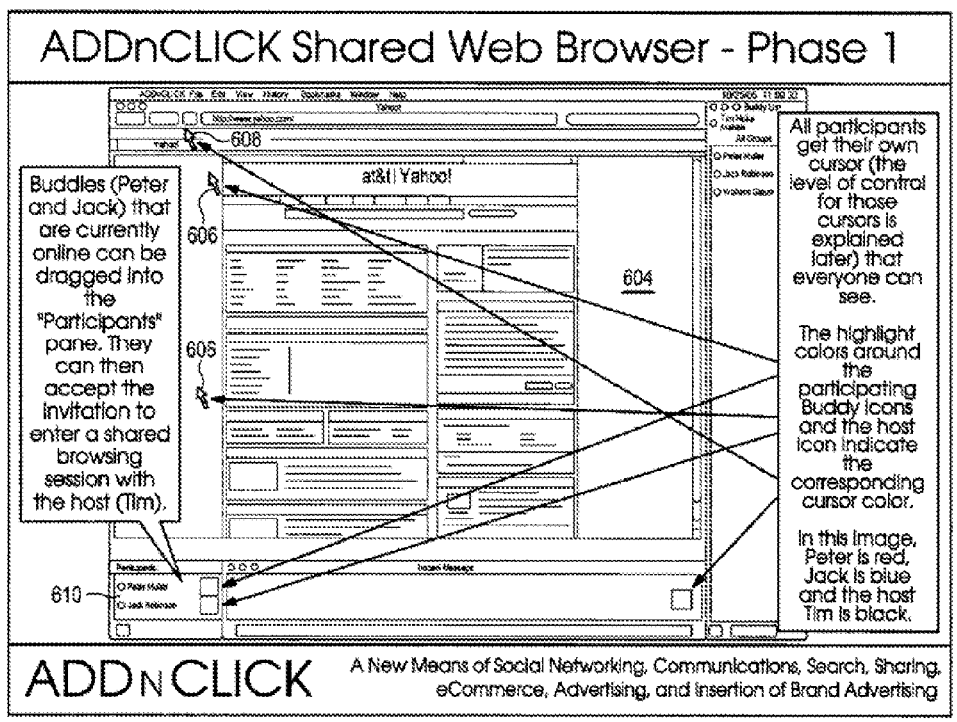

FIGS. 6A-6D collectively illustrate some of the design elements, graphic user interface (GUI), and characteristics of the invention in accordance with one embodiment. Specifically, FIG. 6A illustrates an ADDnCLICK window featuring built-in IM and browser technology including a chat sub-window 600, a buddy list sub-window 602 and a browser sub-window 604. FIG. 6B illustrates an ADDnCLICK window featuring guest cursors 606 that are visible by all participant and are used as pointers when discussing Content in browser sub-window 604. The host can permit any guest to have privileges passively to view or even to click and enter text in the environment. FIG. 6B also illustrates that a host cursor 608 is fully active and visible. Finally, FIG. 6B illustrates in a sub-window 610 the active buddies ("Participants") invited into the shared web browsing experience. All Participants can see the same thing in their browser and can see each other's cursors.

Figure 6C:
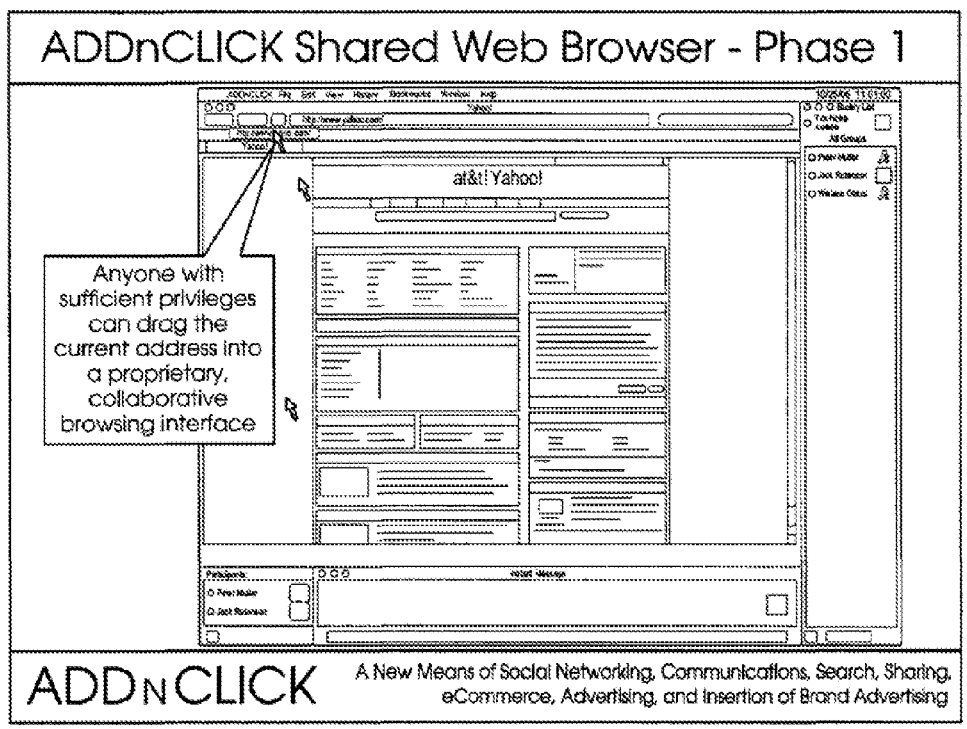
Figure 6D:
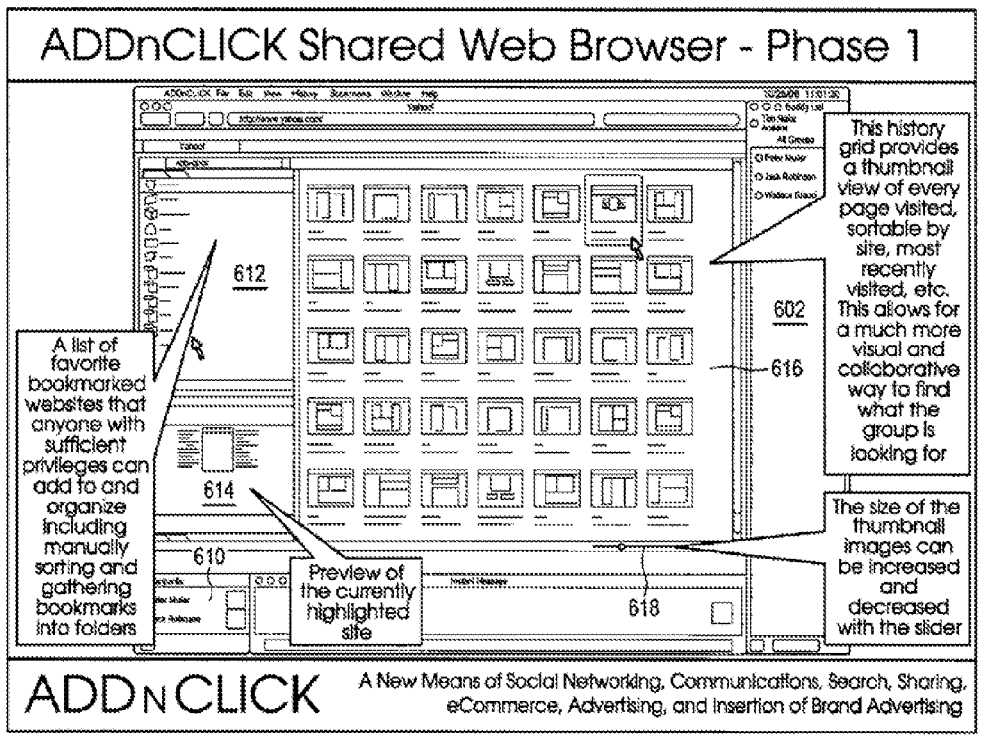

FIG. 6C illustrates that the host can pull any currently loaded page into a new type of shared web browsing interface. FIG. 6D illustrates a list 612 of favorite websites to which the host and any participant can add. Folders can be added to identify and contain sites of related subjects. A preview of the currently highlighted page is provided at 614. A history grid 616 provides a thumbnail view of every page visited, sortable by site, most recent visits, or other defined criteria. This enables a much more visual and collaborative way to find what the group is looking for. In accordance with one embodiment of the invention, the size of the thumbnails is scalable, i.e. they can be increased or decreased, by the use of a slider 618.

Those of skill in the art will appreciate that any suitable input devices can be used to point at and click on and otherwise use the invented system. For example, a keyboard (standard, chordic or Braille) and mouse combination can be used. Alternatively, a touch-sensitive display screen, a microphone coupled with voice-recognition software, a webcam or other eyegaze- or gesture- or image-responsive control, a sip-and-puff control or other suitable pointing devices, a simple switch for clicking, handwriting on a tablet with recognition software, special-purpose keypads or key clusters, gestural or positional response virtual grids such as those used in some gaming controllers, and optical character recognition (OCR) including math script recognition can be used. Such alternative input and/or cursor control devices can include software, firmware or hardware and any suitable, e.g. infrared (IR), radio frequency (RF), or other wireless or wired (e.g. cable), conveyance.

Thought control can be used to input data and control and click a cursor or the like to access an ADDnCLICK room. Such futuristic devices and systems include thought analysis and/or conscious or unconscious thought control and/or analysis, as by reading the context or specific idea of the user's thoughts, or by direct conscious mental expression without benefit of external speech or physically expressive gesture. See, for example,
http://www.usabilitynews.com/news/article3292.asp;
http://www.metafilter.com/mefi/36266;
http://www.nap.edu/readingroom/books/screen/2.html;
http://blog.coenitivelabs.com/2006/03/mental-typewriter-and-game-controller.html; and
http://www.ufoevidence.org/documents/doc551.htm.

Real-time language translation is contemplated as being included in the invented system. In this way, global communities can visit and chat within an ADDnCLICK Window/Room without language barriers. Thus, the search for ADDnCLICK-able content, the ADDnCLICK windows, "rooms" and "walls", and the visitor's voices therein can be translated into other languages and the search can proceed in the other languages and the results translated as they are returned. In an ADDnCLICK Window/Room, Area/Wall, there could be the ability to offer translation between ADDnCLICK users (text, voice and any communication format including those designed for disabled persons). A chat with a French person who does not speak English is now possible, in real time and without perceptible delay. Such is within the spirit and scope of the invention, by utilizing existing e.g. Babel, or future language translation software.

FIGS. 6B-6D illustrate in sub-window 610 of the window a novel concept that will be referred to herein as persistent "presence." Persistent Presence of one or more users in connection with the invention is realized by combining an existing Instant Messaging (IM) service with the Window/Room and Area/Wall structures of the invented social networking and communication part of the system software to produce a useful soft tool. The GUI permits a persistent sub-window to be viewed in an open window, for example, the sub-window listing the IM users or so-called buddies that are online at any given time, thus making their Presence in the room Persistent and readily known to the user having the invented tool. Thus, the user's buddies Jack Robinson (currently idle) and Peter Muller and Wallace Glausi (currently participative) are all Present in the Window/Room with the user because these buddies from the user's IM buddy's list sub-window 602 accepted the user's invitation to join the user in the ADDnCLICK Window/Room.

The concept of a virtual shopping outing with friends and/or family members is contemplated as being within the spirit and scope of the invention. The friends and/or family members can be anywhere in the world, of course, as can be the shop or mall. Thus, one can effectively take another who also likes to shop (or, for that matter, another who does not like to shop because of crowds or travel or other concerns) on a virtual shopping trip. The virtual shoppers might start to look for a cool blouse, and find themselves in a virtual shopping environment that offers themes in the form of videos and/or stills (perhaps rendered in 3D), the videos/stills having clickable Content. The content may be rich, in accordance with the invention, and can include virtual stores staffed with virtual salespersons and other shoppers. These salespersons or shoppers might have bought items of clothing viewed by one of the virtual shoppers and might share their experience and show the virtual shoppers where they bought the clothing items. These salespersons or shoppers can be part of the rich content itself or can be other visitors to a Window/Room representing the visited shop, as described and illustrated in detail above.

Thus, on a virtual shopping trip, one can try clothes on, check things out, test drive cars, etc. and communicate with others who might have valued opinions about the virtual shopper's preferences.

This new virtual community can be the basis for integrating technologies such as the virtual self (a mannequin with one's own size and weight and real face and hair style) so that the shopper can see how he or she would look in a new outfit, with a new accessory, a new hair style, touring a new house, driving a new car or yacht, meeting a new date, etc. It is contemplated as being within the spirit and scope of the invention that various communities develop ranging from shopping clubs to book clubs to education sites to travel clubs, etc., in which people create their own community experience. A key point is that one no longer is alone (unless solitude is desired) and is no longer invisible (unless anonymity is desired), and no one is limited to interactions with members of only a single web community (the present invention links users to members of all web communities on the internet). One can be seen and heard (e.g. using Voice over internet Protocol (VoIP) technology), and one can be engaged in a rich virtual world that is limited only by one's imagination.

With the ADDnCLICK invention, users will have the option of being able to share their desktop and/or the display area of their Device with others on their desktops/Devices, and experience and view concurrently their shared Content with each other. Each participant has the ability to bring in Content that will be automatically present on each participant's Device for joint exploration. Participants will be able to point with their cursors (or graphical means) objects/subjects of interest on their desktop/Device which will simultaneously be visible on all participating desktops/Devices. Any pointing (with a cursor or by some other means) by any participant will be visible to all participants on their desktop/Device.

As described in FIGS. 1CCC-1HHH, in the ADDnCLICK window/room multiple users can browse, discuss and interact with the same web pages and/or Content at the same time. All users need is to be online and running the ADDnCLICK Shared Web Browser. The shared browsing experience allows members of different web communities (such as YouTube, MySpace, Flickr, etc.) to concurrently share their web pages and content with each other in one central environment (the ADDnCLICK room). Users are able to drag and drop or upload content from one web community/web page to the other through the ADDnCLICK platform. This feature gives users the ability to have a richer and unlimited social experience among users of all web communities that: (i) is not limited to members of just one web community; (ii) is interactive; (iii) is in real time; and (iv) is in one unifying, central platform.

Imagery such as branding can be inserted real-time into a "live" virtual experience. For example, a viewer could click on a brand insertion and see virtual product rooms, virtual meeting rooms, virtual social networks, and the like, while still in the video. If the McDonalds' brand insertion were clicked on, the viewer could be placed in a social networking room that is completely branded everywhere by McDonalds™, giving advertisers more exposure to viewers' attention. For clothing brand insertions, the viewer could click on the brand, be placed in a virtual walk-through of a store, and interact with other viewers. Interaction could include seeing and talking with, e.g. via voice-recognition software, VoIP, cell phone or land line, other viewers to create a social network in that virtual room, to try on virtual clothes, to get recommendations from others to links to other virtual clothing stores, to talk to company sales representatives, to meet new friends, to talk about and transport into other brand insertions, to view other videos with the people in the same Window/Room, etc. All the while, there can be virtually continuous exposure to branding within an advertiser's environment.

When doing a search (e.g. Google), the search results and its contents can ALERT users if there are other people online (who have clicked onto the same or a similar topic of the user's search) and are in an ADDnCLICK Window/Room. The user can also be alerted to ADDnCLICK groups containing contents, comments, etc. to which either they or other users have formed and contributed information. This can include historic information like what is found in Yahoo Groups.

Users can receive a desktop, IM, e-mail, voice message, text message, or call (e.g. via telephone, cell-phone, VoIP, etc.) that ALERTS them to when someone is in an ADDnCLICK Window/Room on a topic in which it is determined they have an interest. Such determination can be based upon prior searches on prior usage areas of ADDnCLICK Windows/Rooms they have visited, or upon any other suitable criterion or criteria. A persistent query can be made into the ADDnCLICK database, to anywhere online, or to any database, to search for live or earlier Content or ADDnCLICK Windows/Rooms that contain that Content in which the user has indicated (directly or indirectly) an interest.

A search crawler (or some other program or means) can: (1) scan Content on the internet, interpret text or read metadata to determine the semantic and/or contextual description of the Content; (2) automatically register that Content on ADDnCLICK's servers (or on the ADDnCLICK system) in order to register the location of that Content and the metadata for that Content; (3) automatically insert the codes needed to make that Content ADDnCLICK-able so that when a user is reading, viewing or listening to that Content he or she can click on it (or open it by voice or some other audio, mental, or physical means) and be placed in an ADDnCLICK Window/Room to be linked to others users who are concurrently engaged in the same/similar content. For example, a web crawler can cull Content and determine that the Content is about Mexican food. The web crawler can flag that Content (with the appropriate descriptive tag) and insert an ADDnCLICK marker in that Content. The marker would allow a user to read, view or listen to that Content and then to click on the marker and be transported into an ADDnCLICK Window/Room related to that Content to be linked in a live social network with others who are concurrently engaged in the same/similar content.

A search engine can look for specific Content that has been rendered ADDnCLICK-able. Alternatively or additionally, a search engine can display search results that are ADDnCLICK-able. See description below of FIG. 7. A voice-to-text conversion engine or a voice recognition engine or an audio recognition engine could be used to analyze audio or voice Content, associate text or audio (or some other data format) metadata description tags to it, and then insert the ADDnCLICK clicking tool into that Content that would allow the viewer/listener of that Content to click and then be brought into an ADDnCLICK Window/Room. A voice recognition program could be used to listen to a speaker or a group of speakers and to recognize the context of what is being spoken and then that information could be used to recommend to the participants ADDnCLICK Windows/Rooms (e.g., ADDnCLICK Group Windows/Rooms) that may be of interest (i.e. Windows/Rooms that relate to the context of what is being discussed by the participant(s)). Likewise, an image/pattern recognition engine, can be used to analyze static and/or motion (e.g., video) images of viewable content, recognize characteristics of the viewable content, and attach metadata descriptive tags to the content.

Other Embodiments of the invention: It will become apparent to those skilled in the art that the invention can be achieved by various means, and that the invention includes any and all means by which its objectives can be accomplished, including the following:

(1) If a user did a search (e.g., a search with the Google search engine), the search results could include a button/bar or some other icon or graphic that the user could click on that would give the user links to others for social networking.

(2) In another instance, a software program could monitor what is being viewed or listened to, search for metadata of that Content and brings back to the user's attention links to others who are also viewing and/or listening to the same/similar content.

(3) A website or a software program could monitor the metadata of content that is being bookmarked by a user and then link or offer a connection to users who have bookmarked the same or similar content.

(4) A software program or an application can monitor Content that is "pushed/pulled" to the user (through the Persistent Client Window (PCW) or some other means (such as by email, IM, etc.)) and then link or offer to connect the user to others who are also reading, viewing or listening to the same and/or similar Content.

(5) A software program or other recognition means could reside on the user's Device, browser, website, etc., that could:

(a) automatically analyze the metadata (text, characters, or symbols that describe what the Content is) already embedded within the content; or (b) analyze the metadata that is manually (or orally) expressed by a user in describing that Content that is being viewed or listened to, and that would then search for and link that user to other users who are concurrently viewing/listening to the same or similar Content.

(6) The user can have an application that resides either on the user's Device, browser, website, etc., that would allow the user to insert search terms and that would then search a database for others who are watching or listening to or who have previously indicated an interest in the same/similar Content and/or search terms being requested, and that would then link that user to those other users who are live on the interne now and engaged in content having the same/similar metadata on which the user is performing a search.

(7) In the case of a wireless network application, the user's Device could wirelessly (via cellular, WiFi, WiMax, BlueTooth, etc.) connect to the user to other users and/or other users to each other who are engaged in the same/similar content to establish and/or join a live social network concurrently with each other.

(8) Software "extensions" could be downloaded and installed to run within the browser that would allow a user to opt into a live social networking system with almost any function of the browser being submitted to a third-party server to allow for displaying data and linking users who are engaged in the same/similar content. In this manner, the invention could be built on an already established client and a receptive user base to create a live social network based on matching people who are engaged in the same/similar the Content being viewed and/or listened to and/or being searched. Examples are given below in which Users' anonymity and/or privacy are preserved, if desired:

Bookmarked Sites:

Within a browser or an online bookmarking site: Users could opt to send data anonymously to a third-party server and see results of what the most popular bookmarks are, how many others have the same bookmarks, etc. They could see links to those people with the same bookmarks that are currently online (and who have opted to be seen by others).

Search History:

Users could opt to send data anonymously to a third-party server and see results of what the most popular searches are, how many others have the same searches, etc. They could see links to those people with the same searches that are currently online (and who have opted to be seen by others).

Visited Sites:

Users could opt to send data anonymously to a third-party server and see results of what the most popular visited sites are, how many others have the same visited sites, etc. They could see links to those people with the same visited sites that are currently online (and who have opted to be seen by others).

Viewed Videos:

Users could opt to send data anonymously to a third-party server and see results of what the most popular viewed videos are, how many others have the same viewed videos, etc. They could see links to those people with the same viewed videos that are currently online (and who have opted to be seen by others).

Viewed Slideshows:

Users could opt to send data anonymously to a third-party server and see results of what the most popular viewed slideshows are, how many others have the same viewed slideshows, etc. They could see links to those people with the same viewed slideshows that are currently online (and who have opted to be seen by others).

Personal Homepages:

Users could opt to send data anonymously to a third-party server and see results of what the most popular modules are, how many others have the same modules, etc. They could see links to those people with the same modules that are currently online (and who have opted to be seen by others).

Purchases:

Users could opt to send data anonymously to a third-party server and see results of what the most popular purchases are, how many others have the made the same purchases, etc. They could see links to those people with the same purchases that are currently online (and who have opted to be seen by others).

Users could opt to send data anonymously to a third-party server and see results of what the most popular purchases are, how many others have the made the same purchases, and they could see links to those people with the same purchases that are currently online (and who have opted to be seen by others).

Those of skill in the art will appreciate that alternative approaches to providing privacy and/or anonymity are contemplated as being within the spirit and scope of the invention.

Further Developments:

Instead of clicking on an ADDnCLICK-able Content, the user could use a voice recognition interface to direct the opening of an ADDnCLICK window for that Content. Encrypted codes on any Content file format could be used to identify that Content as ADDnCLICK'able. The code could contain an identification (ID) number that is placed on the Content during its registration with ADDnCLICK (see FIGS. 2 and 3). ADDnCLICK's servers keep track of the Content ID, its metadata description tags, and where the Content is located.

Within an ADDnCLICK live session or group, contextual ads can be placed either concurrently upon each user's ADDnCLICK Window/Room or on an individual's ADDnCLICK Window/Room tailored to that particular user's interests.

Within an ADDnCLICK live session or group, additional contextual ADDnCLICK Windows/Rooms (live or historic group) or some other link can be displayed to the user(s) either concurrently in each user's display or on a particular user's display that is tailored to the interests being discussed (by voice, text, video, music, audio or some other means) by that particular user. For example, a user in a live ADDnCLICK Window/Room may be conversing with other users in that Window/Room about music from the Rolling Stones rock-and-roll band, and a separate ADDnCLICK Window/Room or some other link can be presented on the display of that particular user that could contain a link to a commerce site for the Rolling Stones (which could be a Sponsored ADDnCLICK Window/Room, a link to eBay or some other auction site for Rolling Stones music or paraphernalia, a local Rolling Stones fan group, the Rolling Stones website, etc.). Alternatively an additional AnC Window/Room will be created that links those users to others who are concurrently engaged on the same/similar content topic being discussed.

The ADDnCLICK Windows/Rooms can be used to create or to be included in or to become a part of "user-generated" videogames/internet games.

The ADDnCLICK Windows/Rooms can be part of a "user-generated" and/or "sponsor generated" and or "game developer" videogame/internet game.

The Persistent Client Window (PCW) can be in any n-dimensional environment (flat and/or with depth).

ADDnCLICK Windows/Rooms may or may not be directionally navigable in certain directions.

In accordance with the ADDnCLICK invention, the PCW can be on an n-dimensional display of any type of Device, browser, website or other internet or networked application.

Within an ADDnCLICK Window/Room, the facility (ability and tools) to insert objects to decorate the space within that ADDnCLICK Window/Room is provided in accordance with one embodiment of the invention. Thus, a Window/Room can be decorated to one's personal tastes before others are invited to visit. Users may acquire items from ADDnCLICK, Inc. or any of its licensees, or from other users or other parties under license to ADDnCLICK, Inc., to decorate their Windows/Rooms or acquire additional Content, e.g. objects, floor covering, wallpaper, paint, texture, lights, dimmer switches, accessories, furnishings, etc. to enhance the functionality and aesthetics of their ADDnCLICK Windows/Rooms. In accordance with one business model, users can purchase these objects to decorate the space within their ADDnCLICK Window/Room.

Within an ADDnCLICK Window/Room, the facility to place objects or areas that bear branding or other advertisements within that ADDnCLICK Window/Room or within any Content that is registered and/or viewed within an ADDnCLICK Window/Room are provided in accordance with one embodiment of the invention. Thus, branding by advertisers is accommodated by the invention. In accordance with one business model, sponsors will pay to have branding or other advertisements placed within an ADDnCLICK Window/Room.

Within an ADDnCLICK Window/Room, there can be a means and a method to overlay/insert interactive or non-interactive Content (e.g. brand names, objects, audio-video messages, e-commerce links) into video, video games, film, photographs, still images, graphic images, and any Content can be viewed, listened to, exchanged or registered within an ADDnCLICK Window/Room, in accordance with one embodiment of the invention, as described and illustrated herein.

To avoid the disruption of being taken away from a particular context when Content within that context is clicked on, the following solutions are provided in accordance with one embodiment of the invention. While a user is watching a video or other Content, he or she can (by the stated means or by some other suitable means):

1) Single-click on the object/subject of interest and the ADDnCLICK software automatically creates and stores a list of clicked-on items for later review.

2) Double-click the object/subject of interest and be taken out of the context of the video by going to the new object/subject of interest.

3) Single-click on the object/subject of interest and the content appears full screen while the original video content drops into a small window (wherein it might automatically be paused and/or muted).

4) Information that is set aside automatically or selectively can be shared with others in real-time or at a later time.

In accordance with one embodiment of the invention, users can view more than one piece of Content at a time. Everyone in the Window/Room sees the Content viewed in the central shared content "pane" (synchronized or not), but any individual user can click a thumb-nailed and queued item and view that Content simultaneously. In other words, everyone sees the "What's Playing?" (or communally watched) Content, but can preview, or fully view, other Content in the queue on the side (this could entail running two or more videos at the same time). A Window/Room setting could permit content in the queue to be 'pre-queued' and approved by the moderator before the thumb-nails appear in the shared Content queue. This mechanism facilitates parental controls, if desired. The displayed content queue could be 'pre-queued' for a moderator to vet Content before it is made "public" in the Window/Room.

Figure 7:
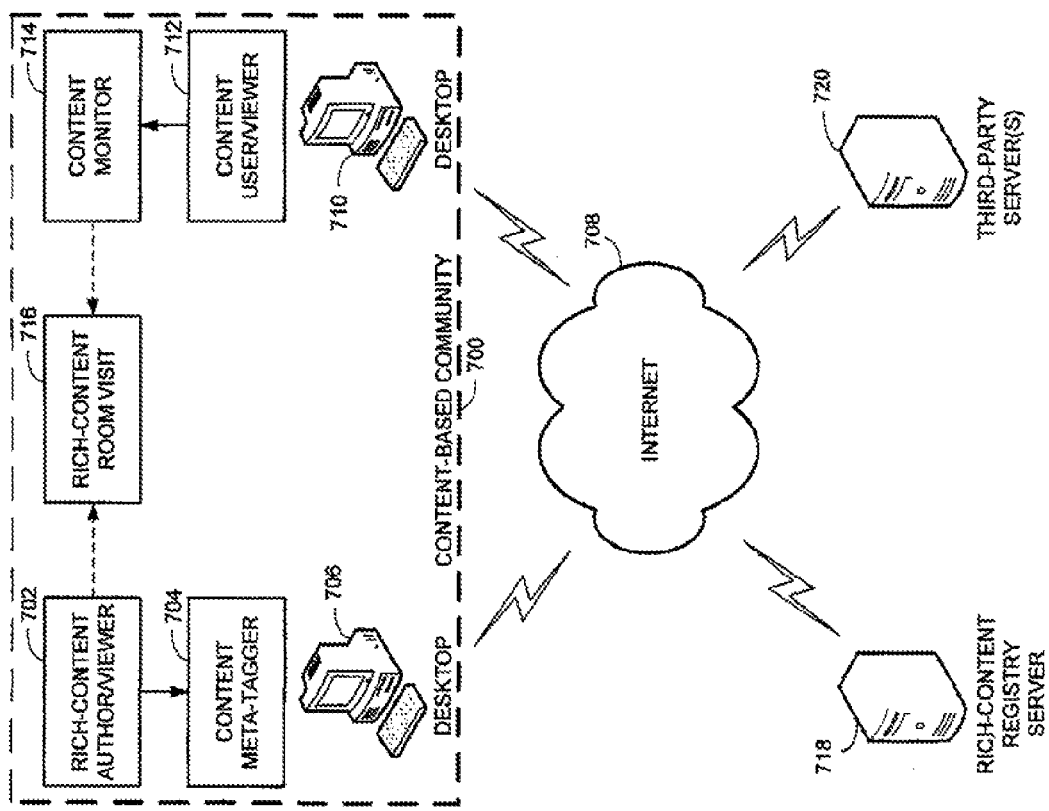
FIG. 7 is a system block diagram of the invention in accordance with one embodiment thereof.

Video conferencing is possible in accordance with the invention. Individuals with webcams can use a peer-to-peer or client-server model to video conference with one or more others in a Window/Room of their choice. FIG. 7 is a system block diagram of the invention in accordance with one embodiment thereof. A Content-based community represented by block 700 can be defined by use of the invention, as described and illustrated above. Community, when formed, includes a rich-content author/viewer 702 which can be thought of as a user equipped with the invented ADDnCLICK software, a Content metadata-tagger 704 that operates to tag (insert descriptive words or symbols to) such Content (e.g. during registration) as described above, so that key words, phrases and/or concepts can be computer recorded on the Device, e.g. a desktop or other computer, 706. Device 706 has access to the internet 708 and its nearly infinite resources. Author/viewer 702 can create Content, edit Content, review Content, view others' Content (whether rich or not); and can interact with others over the internet, e.g. via VoIP, text messaging, etc. on his or her Device 706 (e.g. desktop or laptop computer, cell phone, land line, etc.).

A Device, e.g. a desktop or other computer, 710 at a typically remote site is connected to the internet 708 and a Content user/viewer block 712 defines what a second user might be searching, viewing, creating, querying, or otherwise reading. A Content monitor 714 monitors the second user's content and determines whether it favorably relates to the content being authored or viewed at block 702. If there is a determinedly high correlation in Content, it might be that there is a proportionately high community of interest between the user of Device 706 and the user of Device 710, and in accordance with the invention, a rich-content room visit 716 can be established. The two users who form Content-based community 700 enter the room, view their own and each others Windows/Walls containing Content therein, and interact with one another on line and/or via cell phone or land line, as described and illustrated herein.

A secure online registry, e.g. a rich-content registry server, 718 is provided in accordance with the invention, the server facilitating rich-content registration by author/viewer 702 and by Content user/viewer 712, as described above, as well as tracking and compensating sales of product. Those of skill in the art will appreciate that the user of Device 710 would be required to subscribe to ADDnCLICK in order to fully enjoy (e.g. listen to and/or view) the richness of the shared Content. It will also be appreciated that more than two users typically might become part of the Content-based community. Finally, it will be appreciated that a mechanism can be provided to protect the privacy of the user of Device 710's search algorithms, keywords or phrases, concepts, or URL's. As such, the user of Device 710 would have to authorize content monitoring by content monitor 714.

On the other hand, it is contemplated by the invention that one or more other servers, e.g. one or more third-party ("3P") servers such as 3P server 720 can: (a) source 3P content for use by authors or other users; (b) provide for anonymous communications; (c) continuously or periodically monitor interne traffic with Device 710; (d) monitor the Content, and/or, thereafter; (e) obtain authorization from the user of desktop 710 to give confidential use or Content or user information to the user of desktop 706. Also alternatively, the user of Device 706 could be simply alerted to the presence of the user of Device 710 but without giving more than an e-mail address or phone number. In such case, it would be only by consensus that the two users would end up together in a rich-content Window/Room visit 716. Thus, privacy and anonymity of one or the other of the user's information and identity is contemplated as being within the spirit and scope of the invention, in accordance with the teachings of the above-referenced co-pending patent application and the teachings herein.

Those of skill in the art will appreciate that ADDnCLICK software is downloadable to Device 706 and/or Device 710. For that reason, in FIG. 6, software blocks 602, 604, 612 and 614 are shown as being part of the community separate from the internet. Alternative system configurations, of course, are possible and are contemplated as being within the spirit and scope of the invention. For example, these blocks can actually reside and operate on a server that is internet-based, whereby the users have no resident ADDnCLICK software on their desktops or other Devices, but nevertheless are capable of engaging one another as a community of two or more to enjoy the rich Content created by themselves and/or third parties.

Figure 8:
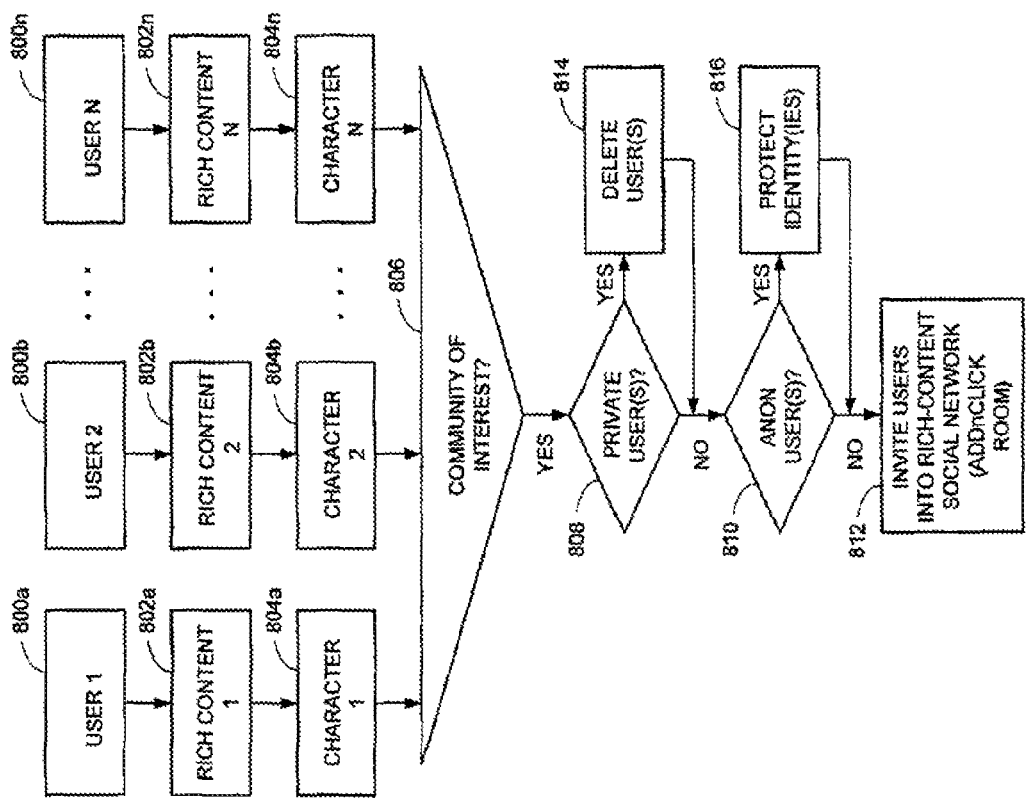
FIG. 8 is a block/flow diagram that schematically illustrates another way of looking at the invention in terms of the way it can filter content and create communities of shared interest.

FIG. 8 is a block/flow diagram that schematically illustrates another way of looking at the invention in terms of the way it can filter Content and create communities. Users 800a, 800b, . . . 800n create rich Content 802a, 802b, . . . 802n of character (e.g. keyword, phrase or concept) 804a, 804b, . . . 804n, respectively. At filter or reduction block 806, it is determined by comparison, e.g. correlation, logic (that pair-wise or n-wise analyzes contents and/or their characters) whether there is a sufficient community of interest between two or more of the users 800a, 800b, . . . 800n. If so, then at block 808 it is determined whether one or more of the users has requested that he or she be treated as a private user whose contents and creation or viewing habits are confidential. If not, then at block 810 it is determined whether one or more of the users has requested that he or she be treated as an anonymous (ANON) user whose identity is confidential. If not, then at block 812, non-private and anonymous users are invited, based upon their common interests, into a rich-content social network. Those of skill will appreciate that such a rich-content social network, in accordance with the invention, can take the form of an ADDnCLICK Window/Room, as described and illustrated herein.

If one or more private users is detected, then at block 814, the one or more private users are deleted from the community to be formed at block 812. (Those of skill will appreciate that there must remain at least two users to create a community or social network, although one of the users may be virtual, e.g. fictional) If one or more anonymous users is detected, then at block 816, the one or more anonymous user's identities are protected, as by giving them a non-identifying number or pseudonym, and the one or more unidentified anonymous users nevertheless are invited to join the social network. Such one or more anonymous users can be brought into the community in accordance with the teachings of the above-referenced, co-pending ANONYMOUS patent application referenced above. In this manner or any suitable alternative manner, social networks are created in which rich-content authors and viewers are brought together to interact in accordance with the invention.

FIGS. 9A-9M illustrate the vertical marketing opportunities rendered possible by the invented system. All present a 2.5 D "room", but can be any n-dimensional space, containing some cursor controls and other information in a tool bar along the top of the display screen.

Figure 9A:
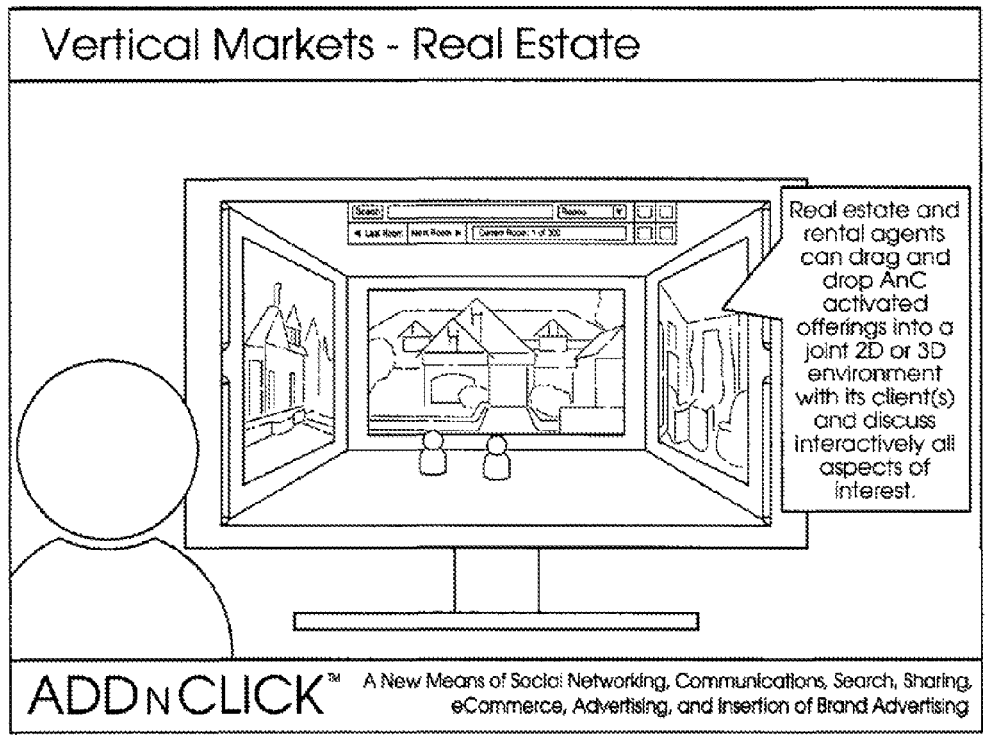
Figure 9B:
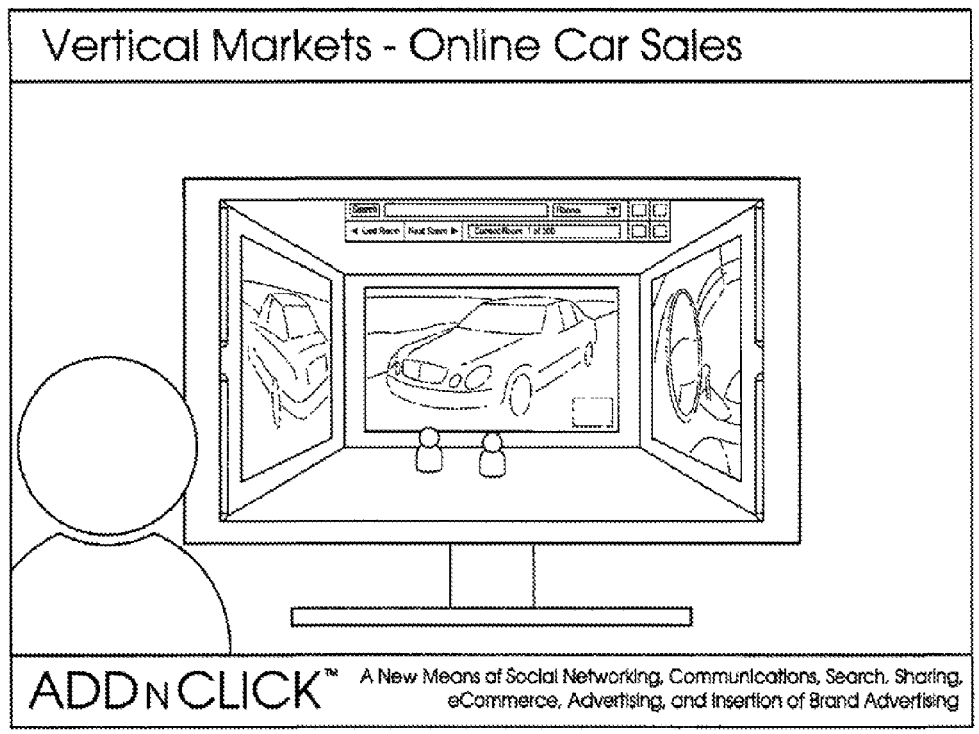
Figure 9C:
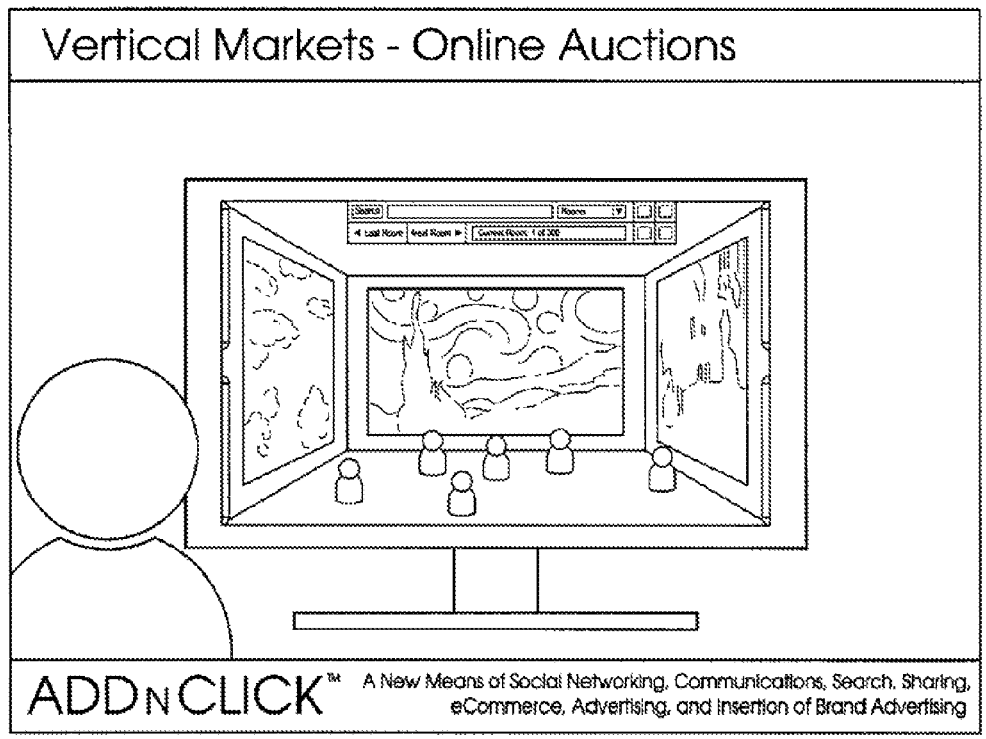
Figure 9D:
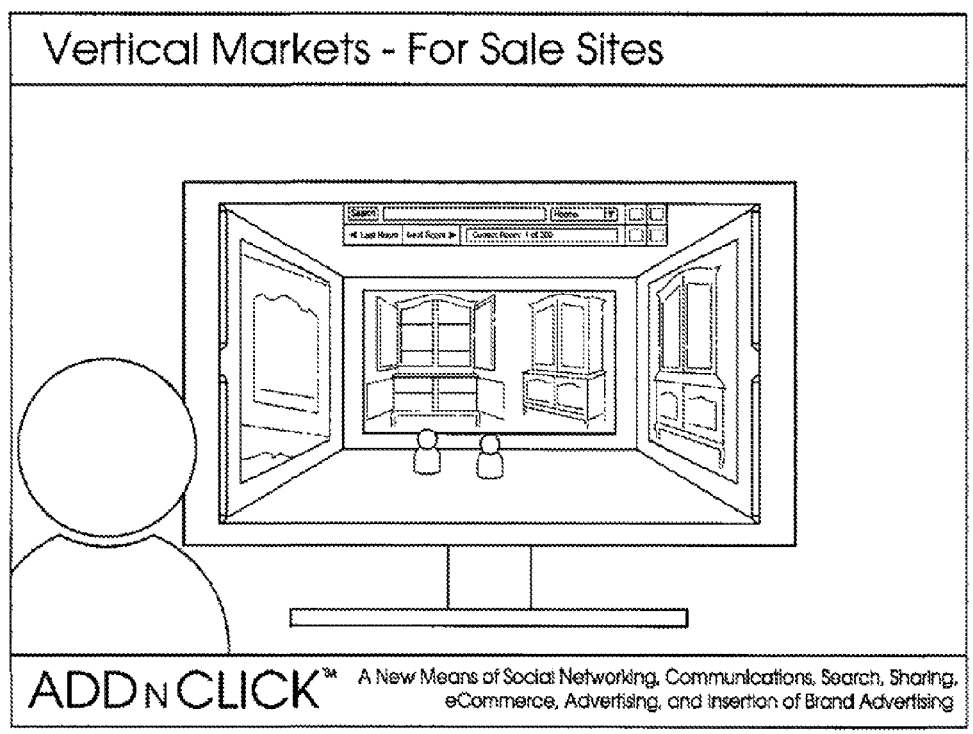
Figure 9E:
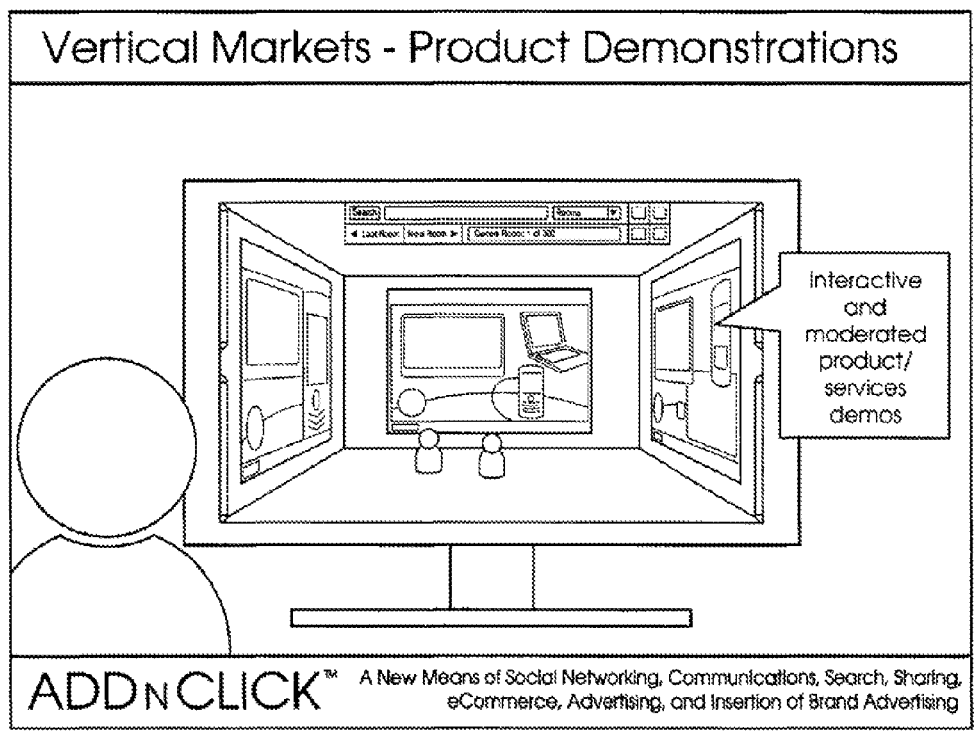

FIG. 9A illustrates a real estate application in which a house's exterior and interior are presented to an avatar-icon viewer within a "room." Real estate and rental agents can drag ADDnCLICK-activated offerings into a joint n-dimensional (e.g., 2D or 3D) environment with its client(s) and can discuss interactively all aspects of interest. FIG. 9B illustrates an online car sales application in which an automobile's exterior and interior are presented to an avatar-icon viewer within a "room." FIG. 9C illustrates an online auction application in which one or more paintings can be viewed and/or auctioned among avatar-icon viewers within a "room." FIG. 9D illustrates a for-sale site in which furnishings or other items are offered for sale (e.g. on EBay) to avatar-icon viewers within a "room." FIG. 9E illustrates a product demonstration in which interactive and moderated product/service demos are offered to avatar-icon viewers within a "room."

Figure 9F:
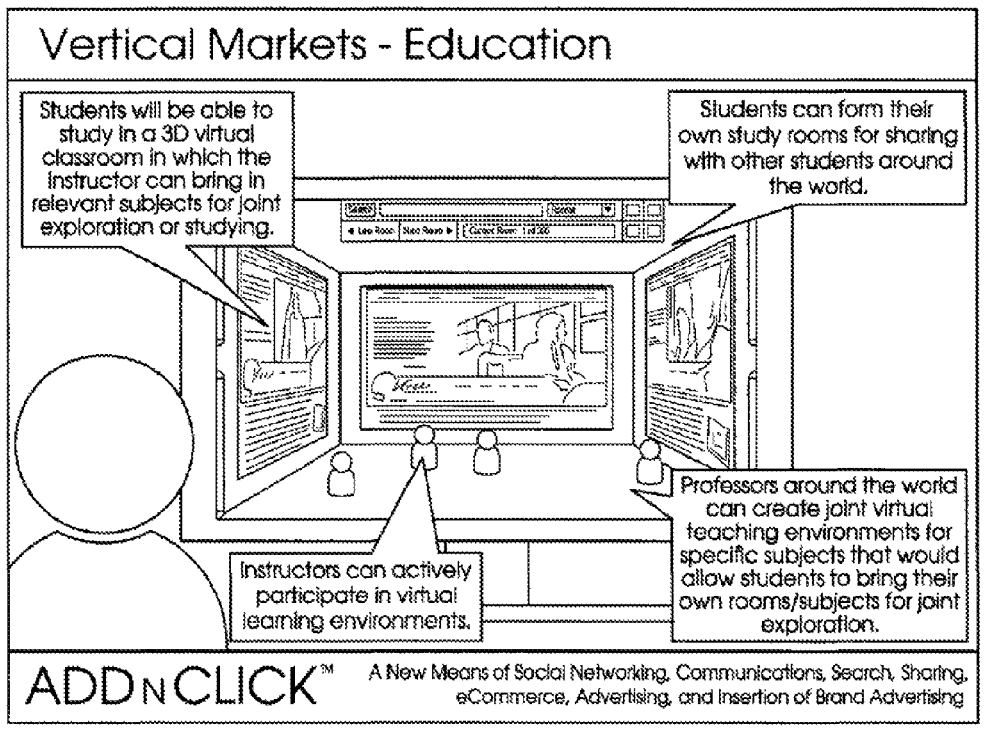

FIG. 9F illustrates an education application in which students, instructors, and professors can interact as avatar-icon viewers within a Window/Room. Students can study in a 3D virtual classroom in which the instructor can bring in relevant subjects for joint exploration or studying. Students can form their own study Windows/Rooms for sharing with other students around the world. Instructors can actively participate in virtual/online learning environments. Professors around the world can create joint virtual/online teaching environments for specific subjects that would allow students to bring their own rooms/subjects for joint exploration.

Figure 9G:
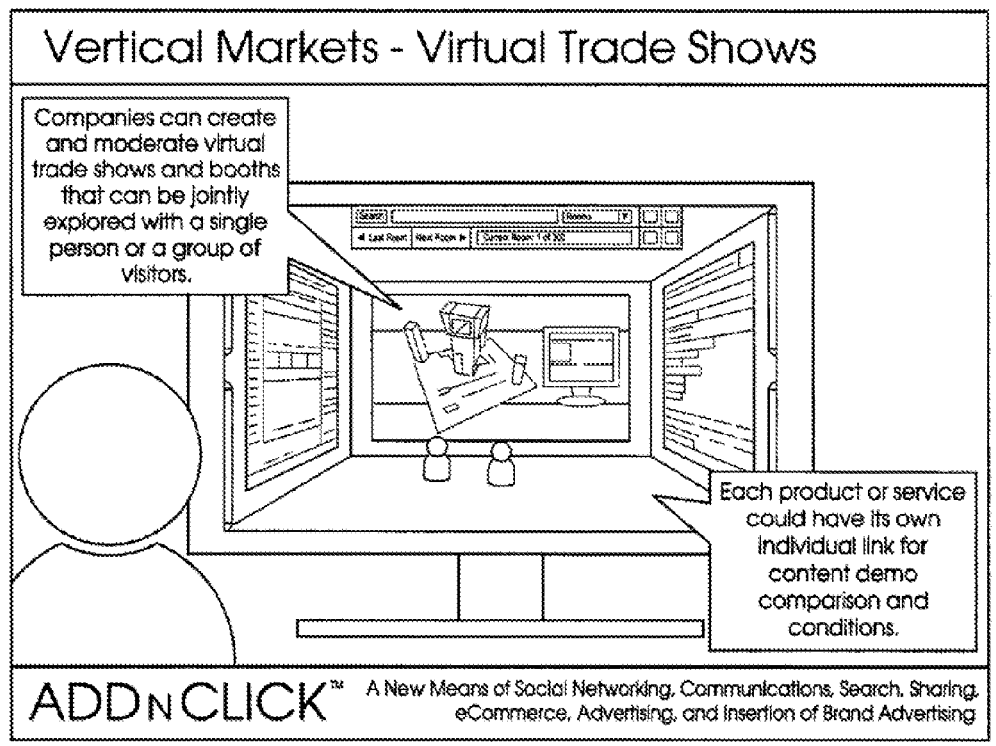

FIG. 9G illustrates a virtual/online trade show application in which avatar-icon viewers can attend and tour trade shows online. Companies can create and moderate virtual/online trade shows and booths that can be jointly explored with a single person or a group of visitors. Each product or service could have its own individual link for content demonstration, comparison and conditions.

Figure 9H:
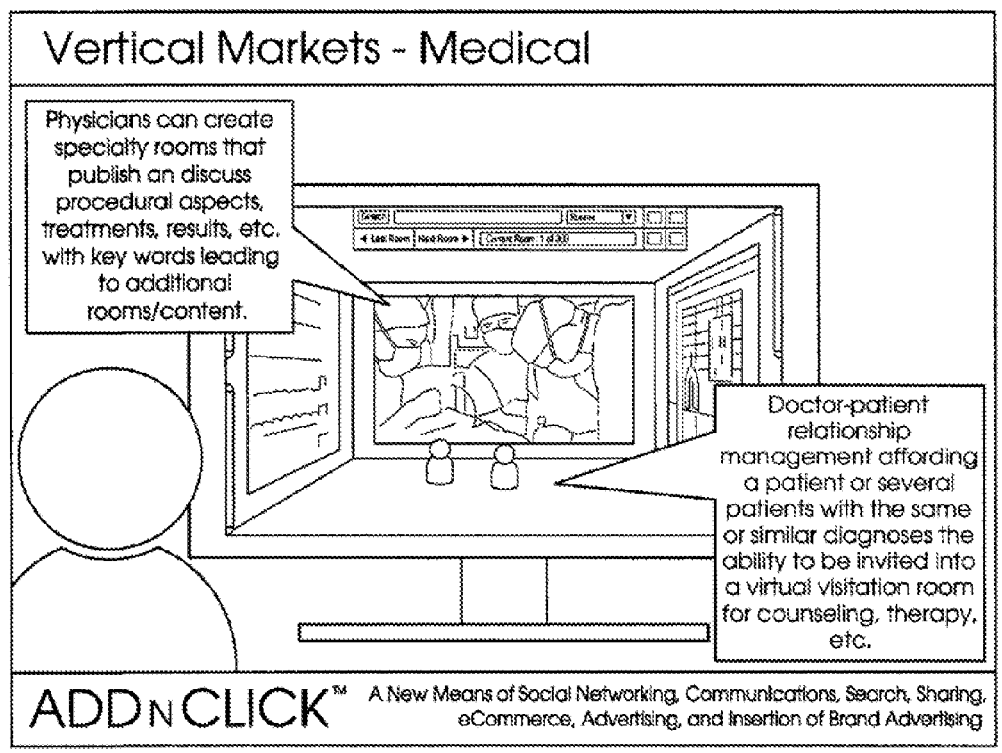
Figure 9L:
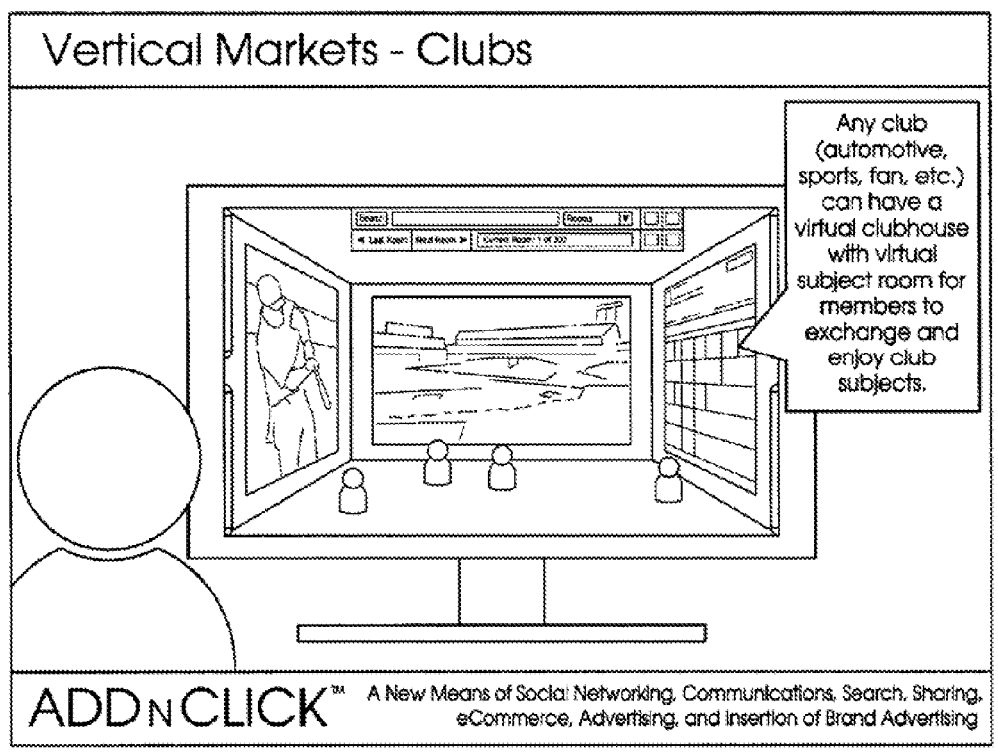

FIG. 9H illustrates a medical application in which avatar-icon viewers can learn about procedures in which they are interested or involved. Physicians can create specialty Windows/Rooms that publish and discuss procedural aspects, treatments, results, etc. with key words leading to additional Windows/Rooms/Content. Doctor-patient relationship management affording a patient or several patients with the same or similar diagnoses the ability to be invited into a virtual/online visitation Window/Room for counseling, therapy, etc.

FIG. 9I illustrates a club application in which avatar-icon viewers can be virtual members. Any club, (automotive, sports, fan, etc.) can have a virtual clubhouse with virtual subject Window/Room for members to exchange and enjoy club subjects.

Figure 9J:
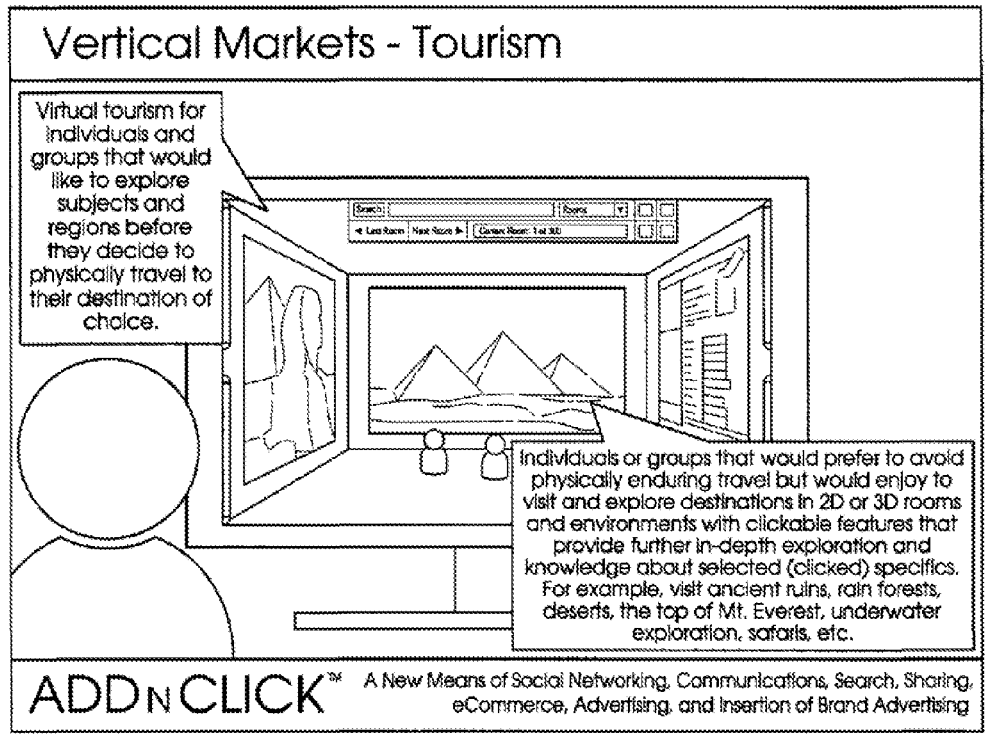
Figure 9K:
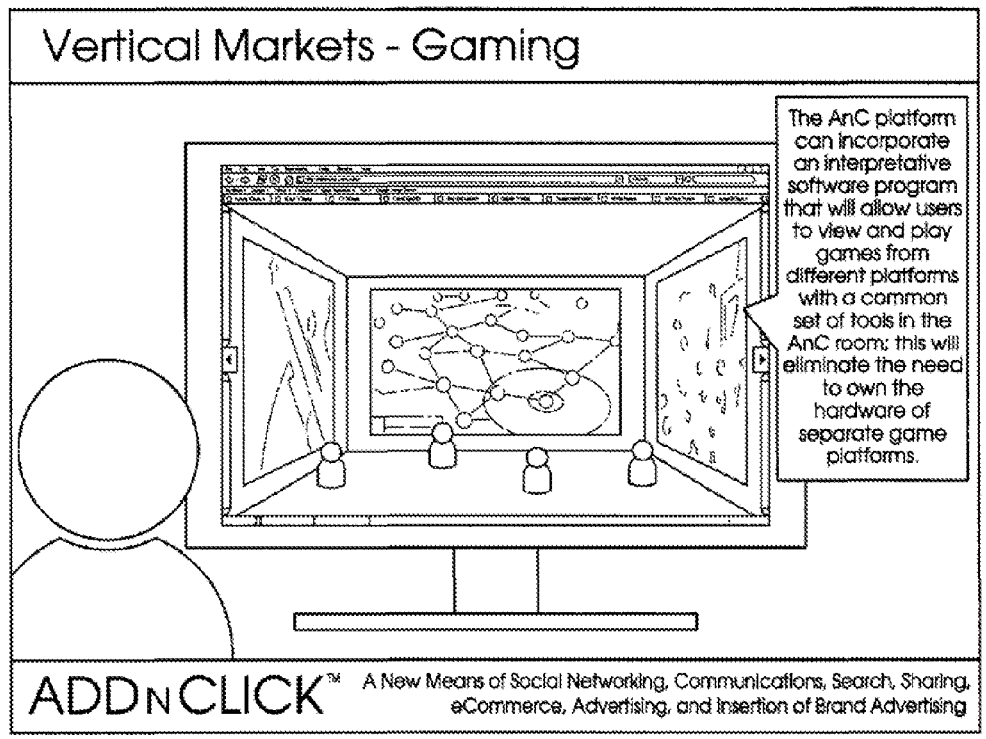
Figure 9L:
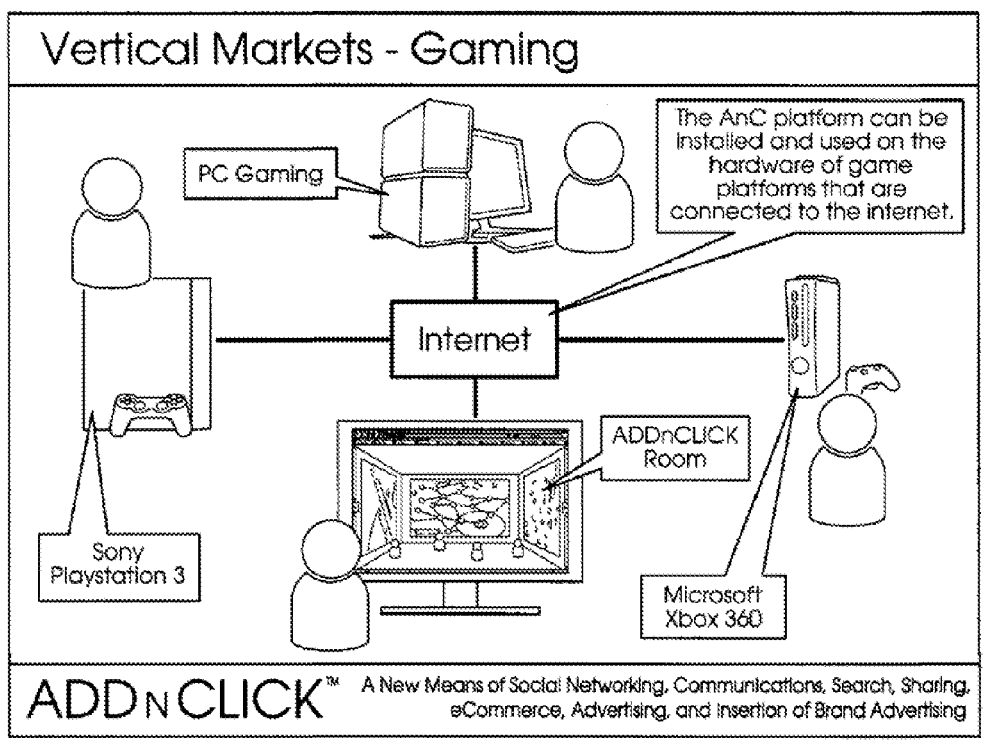
Figure 9M:
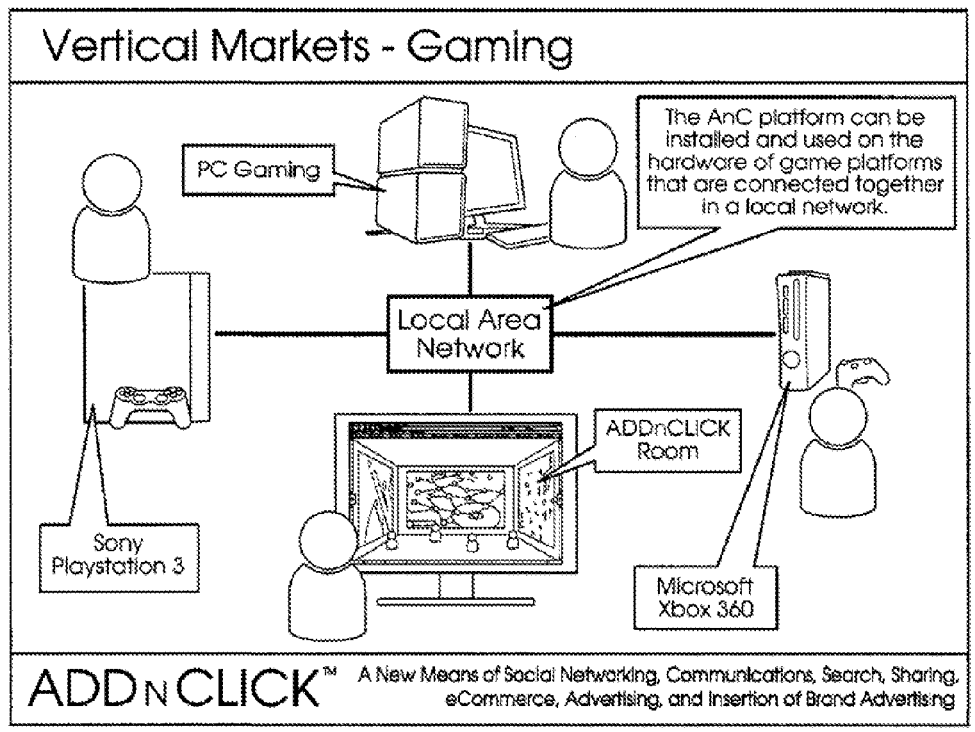
Figure 10:
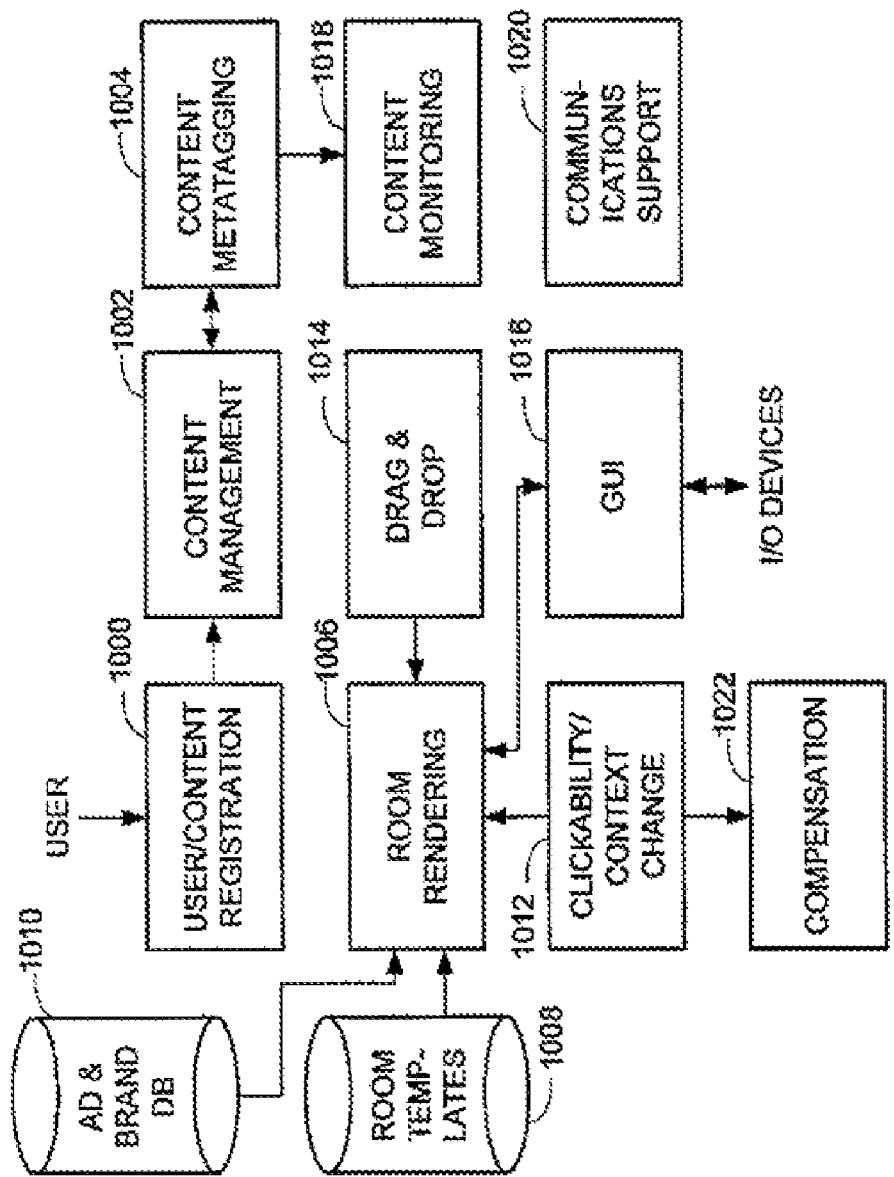
Figure 11E:
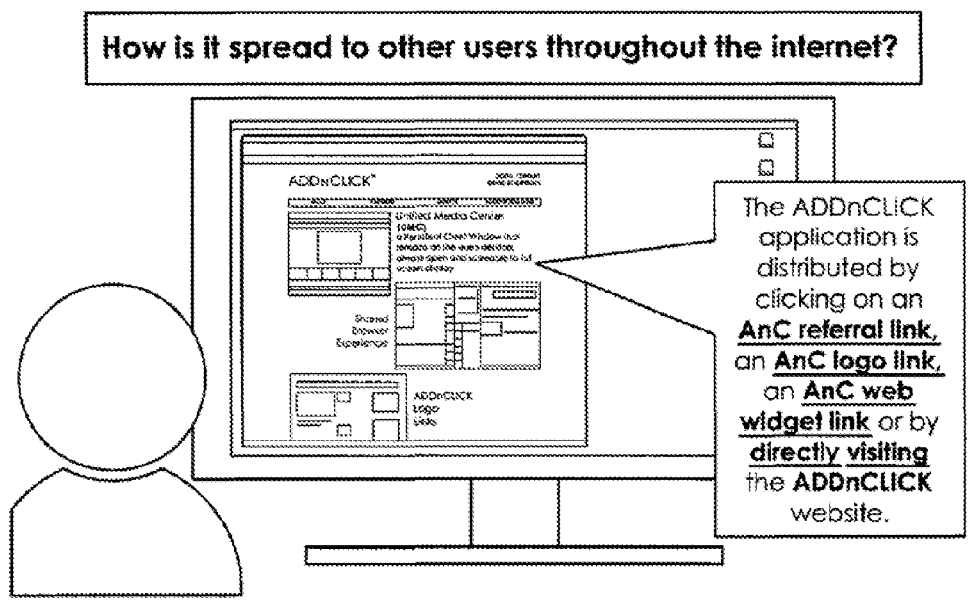
Figure 11F:
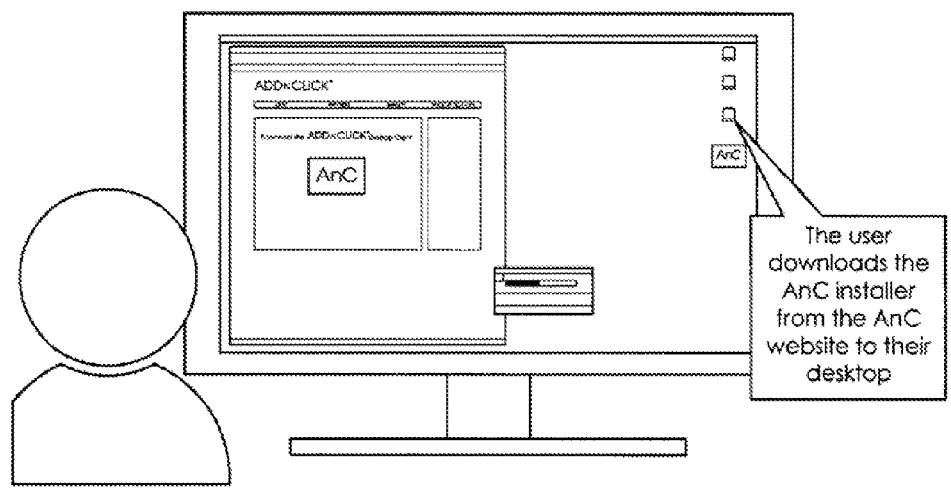
Figure 11G:
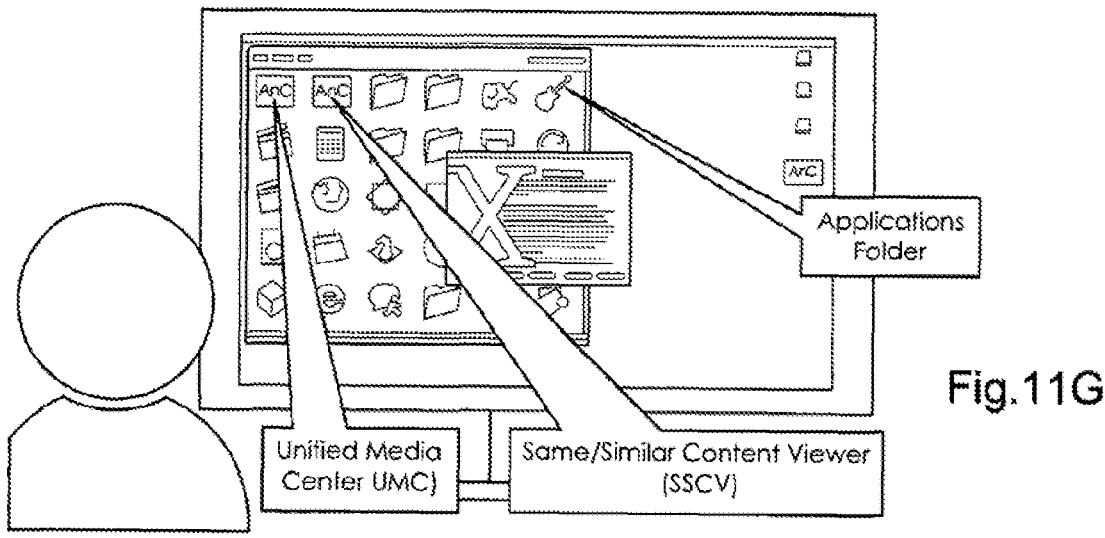
Figure 11H:
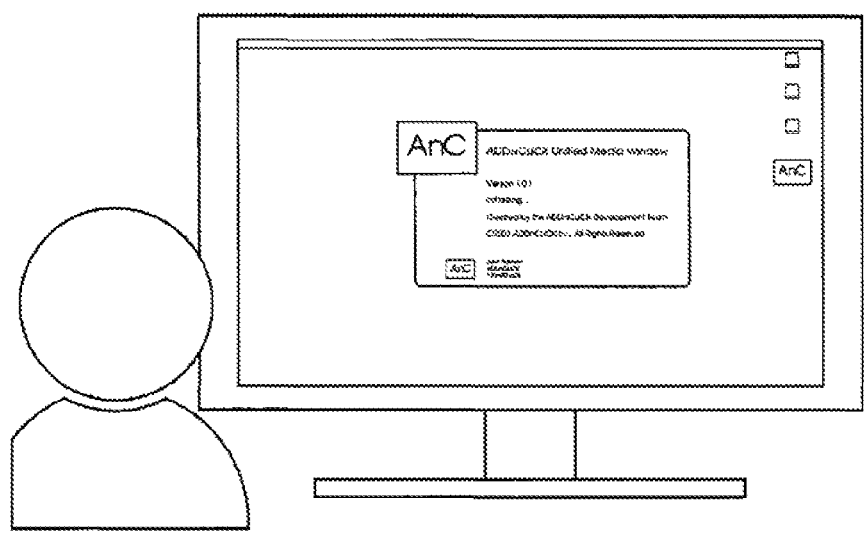
Figure 11I:
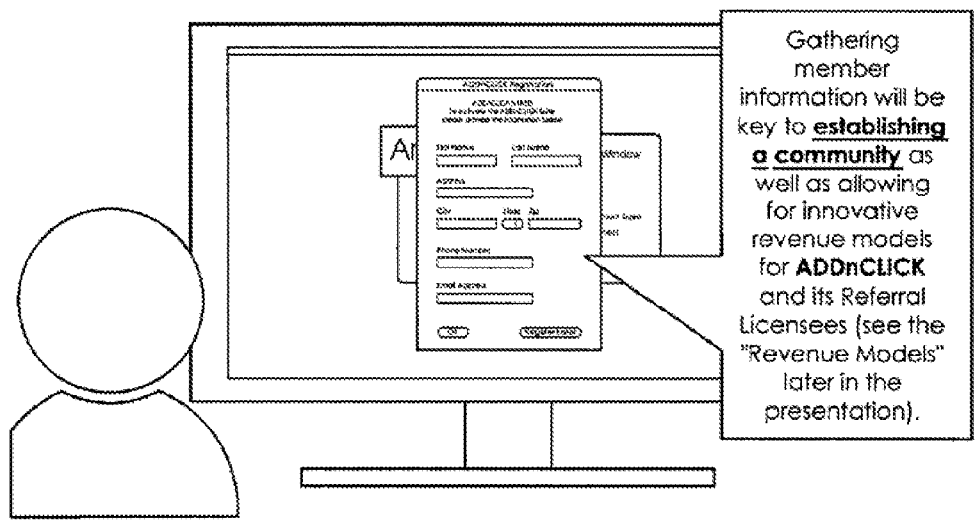

FIG. 9J illustrates a tourism application in which avatar-icon viewers can learn about places and historic landmarks and natural wonders. This is virtual tourism for individuals and groups that would like to explore subjects and regions before they decide to physically travel to their destination of choice. This is for individuals or groups that would prefer to avoid physically enduring travel but would enjoy visiting and exploring destinations in n-dimensional (e.g., 2D, 2.5D, 3D, or 4D) Windows/Rooms and environments with clickable features that provide further in-depth exploration and knowledge about selected (clicked) specifics. For example, visit ancient ruins, rain forests, deserts, the top of Mr. Everest, underwater exploration, safaris, etc.

FIGS. 19K-19M illustrate a gaming application in which users having different gaming platforms such as Sony's PlayStation 3 (PS3) and Microsoft's Xbox 360 can nevertheless play together using a common set of tools in an ADDnCLICK Window/Room, whether over a local area network (LAN) or over the internet. This eliminates the need for each user to own gaming hardware from more than one manufacturer.

Figure 10:
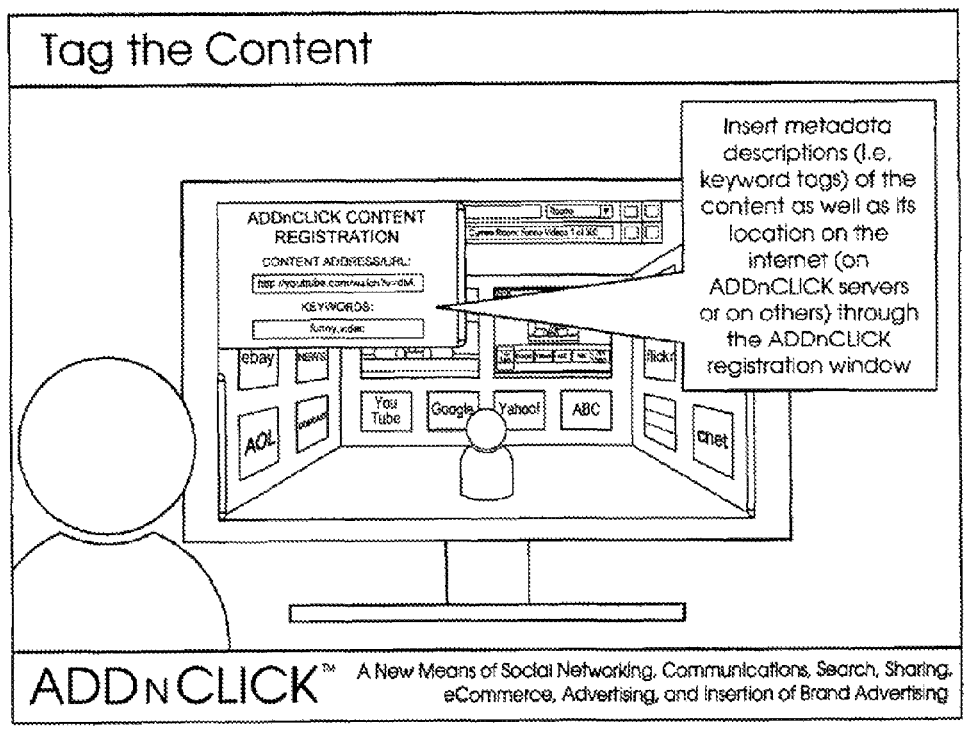
FIG. 10 is a system block diagram illustrating the architecture of the rich-content social networking software in accordance with one embodiment of the invention.

FIG. 10 illustrates the software architecture of the invented system in accordance with one embodiment thereof. A user inputs to block 1000 where user and/or content are registered. At block 1002, content is managed and at block 1004 the Content is metatagged. At block 1006, the Window/Room is rendered, e.g. rendered in nD or another suitably rich manner, using branding text and graphics from an advertising and branding database (AD & BRAND DB) 1010. Alternatively or additionally, various "room" templates from a database can be used to render the "rooms." At block 1012; the clickability of "room" features is handled, and resultant context changes are made that affect the look and feel of the "room." Objects and subjects, e.g. text, video, graphics, stills or audio can also be dragged and dropped into the Window/Room rendering, as indicated at block 1014. A graphic user interface (GUI) is provided at block 1016 that reads and writes I/O devices such as cursor, mouse, voice or other input commands and displays, etc., respectively.

Content is monitored at block 1018, as described herein, regardless of which user is viewing, assuming authorization is given. Communications support is provided, as described herein are text messaging, IM, SMS, e-mail, phone, etc., at block 1020. Finally, compensation when due is paid based upon object/subject clickability, as described above. Those of skill in the art will appreciate that the functional blocks illustrated in FIG. 10 are intended to be illustrative, and not limiting, of the organization of functions into a functional software architecture. For example, functions can be divided or combined, or parts thereof can be distributed or organized differently. Similarly, data flow can be differently directed in an alternatively suitable manner. All such alternatives are contemplated as being within the spirit and scope of the invention.

In accordance with one embodiment of the invention, a cross platform application utilizes open source components wherever possible. Thus, the preferred development languages are C/C++ with data exchange elements in XML. The client application also is cross platform. Again, the preferred development language is C/C++, and the preferred data exchange language is XML. Those of skill in the art will appreciate that the main reason for this choice is the "cross-platform" requirement and the goal of re-using open-source projects/codes to the extent possible. For browser plug-ins, C/#/C++ is used for FE, C/C++ is used for Safari, and XUL/ Javascript is used for Firefox.

Webpage development preferably can be done using Ruby on Rails. This is because of its simplicity and adaptability. ASP.NET and J2EE are alternative tools for webpage development. Any database management system (DBMS) and database development can use open source technologies, e.g. MySQL, Postgres, or alternatively can use proprietary technologies such as MS SQL Server or Oracle. All are known and proven products, with MySQL being preferred because it is known to scale well on server farms.

Server-side development will be understood to depend on the choice of DBMS. If MS SQL Server is used, then C#/ASP.NET would be the preferred server-side development tool. Those of skill in the art will appreciate that Java is a suitable alternative.

ADDnCLICK Embedded in External Hardware Device:

The ADDnCLICK application can be used to link users together who are engaged in the same/similar content, including to users who are engaged in content that is embedded in an external hardware device such as a memory card, and external hard drive etc.

An external hardware device could be an ADDnCLICK server. It could allow an ADDnCLICK Window/Room and its Content to be mirrored among the group, allow it to be Accessed remotely by the user (which is one embodiment of the U.S. patent application Ser. No. 09/749,091, entitled 3-D VISUAL INTERFACE FOR REMOTE CONTROL DEVICES and filed 26 Dec. 2000 that is referred to in the "RELATED APPLICATIONS" section, above), make all of the Content that now resides on everyone's computers (and/or Devices) reside instead on this box and be shared with all other computers and/or Devices to link users together who are engaged in the same/similar content. These processes can work not only on a Local Area Network (LAN), but on the internet as well.

In this manner, all of one's home videos, photos, and other Content could be stored on this external device, and the contents used to link together users who are engaged in the same/similar content. This external device can be backed up by or synchronized with another external device in the same location or elsewhere, or by an ADDnCLICK server. The Content could be private or available to one or more ADDnCLICK groups for linking users together who are engaged in the same/similar content.

One of the partitions on this hardware device could be for web cache-ing, another perhaps video and other media cache-ing or recording, and one partition is for logs that are sent to ADDnCLICK and are used to determine what kinds of Content to cache for the user (as well as what kinds of ads to provide to the user).

This approach (embedding ADDnCLICK into hardware) could provide the ADDnCLICK software package embedded as a hardware solution. The invented hardware is cheap and connects almost universally to increasingly ubiquitous portable audio players (e.g., .mp3), TV's, phones, computers, etc.

In another application, Content creators could move their Content from their camera, camcorder, mobile phone, etc., to this device, and this device could FTP it securely to larger Content servers and serve as a source to link users together based on the same/similar content they are engaged in. The device also could keep backup copies of everything, or the Content could be served directly from this device.

Having the functions of ADDnCLICK installed in a hardware device and providing the ability to access that device remotely (especially through an ADDnCLICK Window/ Room or from an ADDnCLICK service) would give complete control over the Device, and it could run indefinitely and continuously, independent of any problems with the local PC's on the network. There is also much to be said for making it easier to keep data consistently available without loading it onto remote servers, Information that could be gathered and sold from these devices, as well as the ability to sell media through the devices, to sell advertising through them, would be compensation sufficient that under one contemplated business model the devices might be given away for free.

This concept solves a lot of problems for the provider owning 100% control of the operating system and environment. It would only be a matter of determining which packages to include on the device, integrating them and making it simple to set up and use. Also, if the provider is funded by advertisers and media entities who benefit from the adoption of the device, the device can be given away, and adoption would be immediate even without viral marketing.

In the future, these devices (with a few more hardware plug-ins) could be made to automatically and/or remotely control just about anything in the home or office and be able to extend the AnC method of linking users together who are engaged in the same/similar content throughout that environment. See the above-referenced REMOTE CONTROL patent application subject to common ownership herewith (U.S. patent application Ser. No. 09/749,091, entitled 3-D VISUAL INTERFACE FOR REMOTE CONTROL DEVICES and filed 26 Dec. 2000 that is referred to in the "RELATED APPLICATIONS" section, above).

Using this approach (embedding the ADDnCLICK application into external hardware) is just one possible way of delivering it. Alternative means and methods for delivering the application to users are contemplated as being within the spirit and scope of the invention.

Additional Approaches for Linking Users Together Based on Content:

While the foregoing descriptions include examples to illustrate various features, the scope of the conceived invention encompasses far more applications and embodiments than are presented to this point. Therefore, further embodiments are presented below to more expansively illustrate the broad scope of the invention.

Users can insert data and comments into "hotspots" in content (e.g., videos, text, music) that can be analyzed and used to link people to each other in real time using the ADDnCLICK application, for example, Users who click on embedded hotspots will be linked to others who are engaged in the "hotspots" content or who are engaged in the content containing the hotspots. Users can also insert data in "objects" that are placed in content, that can be retrieved and used to define the content of the inserted data, and that can then be used to link users together who are engaged in the same/similar content.

A Collaborative Innovation Network" ("COIN") visual navigation tool can be used to visually show users who are engaged in the same/similar content. (See: MIT's http://www.ickn.org/index.html) These COIN navigation tools can be used to visually depict relationships between a user and others that are based substantially upon, for example, a degree of relatedness between content being viewed or interacted with by the user and others. A user could select others in this 'relationship tree' and be able to obtain information about the content and/or another user, or actually view the content and/or be linked with the other user. The user can then use that content information to click and be connected to one or more other users in the COIN whose content is closely associated with the content of the user. COIN visual navigation tools can show those users who are closest to each other who are engaged in the same/similar content, and, when an avatar representing a user or their content is clicked on, a social network can be established with that user individually or to others nearby within the depicted navigation tool who, as seen in the COIN visual navigation tool, are engaged in the same/similar content.

An embodiment of the invention can be used to link otherwise unrelated users sharing a common physical environment that is otherwise not conducive to interaction, such as on an airplane. Users can be linked to each other based on the content in which they are engaged while on the airplane, such as via audio headsets and/or visual displays, providing a rich, interactive, content-based experience based on similarities in content and/or content metadata.

Users can be linked together based on being engaged in the same/similar content that is in: related voice-based or text-based conversations, virtual worlds (environments), sub-worlds within virtual worlds, content in virtual worlds, or advertisements within virtual worlds. In generally, users can be linked to each other based on being engaged in nearly any type of content that is deemed being the same/similar, providing the users are connected and/or connectable with each other via a local or extended network, or by a link between networks. Such content can include any visibly presented to a user by a device display, whether live, recently uploaded or downloaded, newly created, or recovered from data stored at an integrated or removable data storage means (e.g., media, device, etc.). 'Mash-ups', wherein content from two or more sources are combined together and presented to a viewer as composite content, can also serve as a basis to link users together who are engaged in the same/similar content. The metadata from all or some portion of the content within the composite mash-up content can be analyzed; and a mash-up user can be linked to other users based on some, all, or any particular selected content within the mash-up (e.g., a mash-up social network, or 'mash network').

In an embodiment, a user need only to click on (or otherwise select) content, or even simply scroll their mouse cursor (or other indicating device or icon) over content (such as photographs, objects, text, a depiction of music, etc.), and be connected into a live social network with other users who are engaged somehow with the same/similar content (e.g., viewing the same photo, listening to the same music, reading the same text, interacting with the same object, etc.). A shared social window experience (SSWE) could be opened to link these users together, but this is not necessary in all embodiments. An illustrative analogy can be drawn to "party line" telephony, wherein users simply pick up their phone and are linked to others in the same party line network. Users who are linked together may also have available an icon or other representation (e.g., a visual navigation tool) allowing them to enter a SSWE with each other, or to navigate among discussion rooms and/or SSWE's with each other. Users linked together by this process of being engaged in the same content can participate in a discussion room anonymously, but this is optional and they can just as easily choose to be identified by name, by a pseudonym, or simply by a photograph or avatar. Among users who are linked together, a discussion room can also be dragged or inserted into a SSWE and be represented therein via a thumbnail view or in some other form. Therefore, other users in the SSWE can select the discussion room to listen, read, participate, or simply view others who perhaps are not in the SSWE but are engaged in the discussion room.

This processes could be used to create a social community within a "discussion room" on the same specific content that all users in that "discussion room" have scrolled over or clicked on. For example, if a user is viewing an eBay auction listing and there is a photo of a piano that the user wants to bid on, that user could click on or scroll over the photo of that piano, and then be able to listen or watch and/or establish a dialog with other people who are at that same time scrolling over or clicking on that same photo on that eBay site. This type of communication does not require a SSWE. It would be like being in a "party line" on that content where many people are concurrently in a live group discussion.

However, an ADDnCLICK SSWE button can be located within each "discussion room" and users can click onto the SSWE button to then be linked in a SSWE with others who are engaged in the same/similar content.

The number of people who are in a "discussion room" feed can be limited to a certain number of participants and there can be countless "discussion rooms" on that same specific content that all users have scrolled over or clicked on and are engaged in.

A "Visual Navigation" tool such as a COIN can be used to help these "discussion room" users navigate from one "discussion room" to another to have conversations with other users in other "discussion rooms".

Participation in a "discussion room" can also be anonymous so that the user is passively engaged in the "discussion room" and/or the person's identity can be anonymous even though the person is actively engaged in the "discussion room".

A live feed of a "discussion room" can be inserted into a SSWE. Those others in the SSWE can scroll over and/or click on that live content "discussion room" feed (represented as a thumbnail or some other distinct means within the SSWE) to listen to or read or view (i.e., to be linked to) others who are not in the SSWE, but who instead are engaged in a "discussion room" outside of the SSWE.

Live links can be established between users who are concurrently engaged in the same/similar content that contains the same/similar metadata, form, nature or context, including downloads of podcasts (audio), vodcasts (video), music, text, scenes, or any type of content from the internet, or from some other means of networking, onto a mobile device (such as an Apple iPod, a PDA, a cellular telephone, etc.).

In an embodiment, a live social network may be initiated (e.g., established, connected, etc.) not when the user is first made aware of other users engaged in same/similar content, but at some later time. For example, in this embodiment, the user can become aware of other users, and can then establish live social network links with one or more of the users, either immediately or after some delay, sequentially or collectively, and with respect to all or some subset of the other users. Likewise, a user engaged in content can be informed of another user, for example by some indications placed in or relative to the content, wherein the one or more other user desires to establish a live social network link relative to the content. The user can then elect to establish a link to the one or more users who left such indication. Therefore, a live social network link does not imply or require that the request to establish the link, and the establishment of the link itself, must be concurrent. Rather, the request or other indication can be separated in time from the actual establishment of the live social network link.

A wide variety of digital content (from photos, audio, text and computer data to music and moving images), can all be stored on a memory stick, CD, DVD or any other external recording or media device. Such storage media and/or device can then be used to link users to each other (on the internet or on any network) when such users are engaged in the same/similar content. For instance, an ADDnCLICK social networking application can be embedded into a memory stick, CD, DVD, etc. When connected to a computer (or other means of connecting to the internet/network), the embedded ADDnCLICK application logs the user into the ADDnCLICK social network, communicates to the ADDnCLICK network what the user's content is (e.g., its metadata) on his storage device, and then initiates links to other ADDnCLICK users who are engaged in the same/similar content. Once the ADDnCLICK application is embedded on a computer or other network device, it will have the ability to scan the user's hardware to determine whether there is any content on any device that is connected to it (e.g., a memory stick) so that it can ascertain what the user is engaged in and then be able to link its user with other users of the same/similar content on the interne. A user can have all of his ADDnCLICK log-on and personal information stored in an external memory device (such as a memory stick) so that the user can insert it into any computer and be able to connect into the ADDnCLICK network with all of their personal settings.

On internet/network-connected devices (e.g., cameras, a music device, a camera on a cell phone, etc.) that can capture the digital content a user is engaged in, the users of those devices can be linked to each other or to others within a ADDnCLICK social network (whether through such devices or not) based on their engagement in the same/similar content. For example, if a user is taking a photo of Niagara Falls, an image recognition program or a voice recognition program could be used to determine that the photo is of Niagara Falls, and that metadata can be sent to the ADDnCLICK social network to link the photographers to others who are concurrently engaged in the same/similar content (re Niagara Falls). One photographer in the lower basin of Yosemite Falls could be taking a cell phone photo of the falls and be linked to other photographers at a higher geographic point who have their cameras aimed at the same falls, and/or be connected to anyone on the internet who is engaged in the same metadata as the falls. For example, a student in Sri Lanka who is researching Yosemite Falls can be linked to people who are actually at Yosemite Falls and be able to connect to those tourists and communicate with them through an ADDnCLICK-enabled network.

Users can be connected live into an ADDnCLICK social network based upon content that is being streamed to the user. Such connection would be to other users who are engaged in the same content or content that is of a similar form, the nature or the context of the content being streamed. For example, while a user is downloading content from the interne/network and is waiting for the streaming to end, the ADDnCLICK application can start linking the user with other users based on the content that is being streamed.

An ADDnCLICK SSWE can be a desktop application, a network application, a virtualized desktop application, or a web-based application/service. If web-based, the ADDnCLICK SSWE can be accessed anywhere a user can find a web browser. Also, upgrades and new features can be added automatically to an internet/web-based ADDnCLICK application.

Users can be linked together who are engaged in the same/similar content of SMS ("Short Message Service") text messages (see http://en.wikipedia.org/wiki/Short_message_service, and also see http://www.twitter.com). A user who sends other users content (the text of the SMS, video, music, etc.) within a SMS or some other means of limited messaging (text, voice, audio, photo, video), will be able to be linked to others who are engaged in the same/similar content as that in which user is concurrently engaged.

Live social networks can be created from emails that a user is reading, viewing and/or listening to, or to the contents of any attachments to the email that the user is engaged in. Users can be linked together into a live social network with each other that is based on the email and/or attachments thereto in which the user is engaged.

Users can be linked together who are engaged in the same/similar content that is created from computer programs that offer "word prediction/recommendations". Google search results, for instance, offer "word prediction/recommendations" when it thinks that a word has been misspelled. When a user types in metadata of the content they are interested in, the ADDnCLICK application can use a "word prediction/recommendation" capability to help the user correctly define what he is looking for Also, as Amazon does in its "Customers who have bought this book have also purchased or shown an interest in the following . . . ", the ADDnCLICK application may contain recommendations of content that other users have made or that the ADDnCLICK application has observed based on content that these other users have been engaged in. When the user engages in any "recommended" content, that user will be connected to other users who are concurrently engaged in the same/similar content.

Using the ADDnCLICK social network to enable live social auctions. A social network according to an embodiment can be used to connect users together who are engaged in the same live auction: (1) via the SSWE; (2) via any widget within a SSWE; (3) via communications between one SSWE and another SSWE of (different metadata); and/or (4) via communications with the pages of a SSWE. For instance, a particular SSWE may have too many links for one page of the SSWE (e.g., if there are 100 link results for a specific SSWE). Therefore, a page containing the first 15 links can be shown and a user can click on a button such as "See next users" to go to the next "page" of links within the SSWE.

Using the ADDnCLICK Social Network to Enable Social Education.

A social network according to an embodiment can be used to connect users together who are engaged in the same live learning experience: (1) via a SSWE; (2) via any widget within a SSWE; (3) via communications between one SSWE to another SSWE of (of different metadata); and/or (4) via communications with the pages of a SSWE, as discussed above regarding live social auctions.

Users can be linked together into a social network based on the same/similar content derived from "usage learning" programs that can offer recommendations for content areas of possible interest to the User.

A user can be linked together into a social network with other users who are engaged in the same/similar content within online "eBooks". An eBook reader can be linked to other eBook readers through the content being read, or through anything that is clicked within the eBook.

Users can be linked together into a social network with others who are engaged in the same/similar content as that derived from the use of "concept descriptions" that infer broad content areas that may of interest to the user and that the user is engaged in.

Social networking in an embodiment can be launched by a user clicking onto any content that is on or within a desktop of a device that has an internet/network connection. For instance, a user can click onto a picture, scene, or video that is the background of a desktop, and be linked to others who are engaged in the same/similar content as this background content. Also, AnC social networks can be created by clicking onto any piece of content, object, clothing (or virtually anything) that is within a picture-in-picture window on a display of an internet-connected device or on a web application.

Social networks can be created in an embodiment by the "applications and transactions" a user is engaged in on the internet/network to link that user to others who are engaged in the same/similar content.

Social Presence

AnC social networks can be created by the "social presence" of its users in each SSWE. "Social Presence" refers to being and communicating with someone and can be defined by the ability of its users to project themselves socially and effectively through: (1) Affective responses that contain personal expressions of emotion, feelings, beliefs, and values; (2) Cohesive responses that are communication behaviors that build and sustain a sense of group commitment, e.g. greetings and salutations and group or personal reference, and/or (3) Interactive responses that are behaviors that provide evidence that others are attending, e.g. agreement/disagreement, approval and referencing previous messages.

Users can be linked together based on their social presence within a SSWE, as determined through an analysis of the metadata of the content that is gathered within any of the SSWEs of a social network according to an embodiment of the invention.

Virtual World Content

A virtual world is a form of content and a contextual visual environment presented to a user at a display of the user's internet-linked device. A virtual world (or 'environment') can include a panoramic environment within which the user can be represented by an avatar, and within which the avatar of the user can move around. Through the content in virtual environments, rooms, etc., other users can be linked to the user in the context of the Content that describes the virtual environment. The user in such a virtual environment can interact with visual elements/content of the virtual environment, can enter and exit at will, and can interact with others who are engaged in the same/similar content whether within or outside the panoramic or virtual environment, etc. Users can also place objects in the panoramic environment, including objects created by the user or by a third party. Those objects can be defined as being content and can be used to link users together who are engaged in the same/similar content. Users can also purchase or engage in a commercial or social exchange with other users to obtain objects for placement in a panoramic environment, or can invite other users to suggest and/or place objects therein. The discussion room capabilities discussed above can apply equally with regard to a virtual environment, with objects and/or other forms of content presented in the virtual environment being selectable to access a discussion room and/or to otherwise link users together who are engaged in the same/similar content.

An ADDnCLICK application can be embedded on a portable memory device (e.g., a memory stick, DVD, CD, etc.), and when connected with an internet-linked device, can scan the device for content and link the user with other users engaged in similar content. The device can be a portable device, providing numerous advantageous capabilities. For example, a hiker bitten by a snake could take a picture of the snake using a portable device. The picture/content can be uploaded to the ADDnCLICK servers, or an embedded image/pattern recognition system can recognize the image of the snake, and the user can be connected to other users engaged in similar content. The user can open an SSWE and inquire of other users regarding the exact identity of the snake, and can likewise request emergencyassistance. An emergency assistance entity can enter the SSWE, receive information regarding or independently recognize the type of snake, and use that information to obtain/prepare an appropriate anti-venom. The emergency assistance entity can then insert an instructional video into the SSWE, and the user can activate the video to learn how to treat the bite in the field. The user can also turn the camera on himself, and a physician can view the images as content in the SSWE and make assessments of the user's condition. In another portion of the SSWE, a rescue entity can post updates of their status to keep the user informed and calm, which the user can regularly access and view. Likewise, other users hiking in the same area and having internet-linked devices may have set an alert via the ADDnCLICK tools to notify them of any content relevant to that area. They may receive an alert, be connected into the SSWE, and realize that the injured user is only a short distance from them. Therefore, they can notify both the user and others of their proximity, and lend aid until a rescue entity arrives. Later, they can receive and/or provide updates to other in the SSWE regarding the injured user's condition.

News media outlets may also be contacted and can receive real-time information regarding the event.

As should be understood from this example, a functional, portable version of the ADDnCLICK application/tools provides tremendous value to a user. Inserting a memory stick or other such application-bearing device into an internet-linked device renders the internet-linked device partially or fully functional for using the ADDnCLICK applications/tools, and enables the tools to search the device for content and provide links related thereto with other users. In the same way, however, ADDnCLICK applications/tools can be stored on nearly any peripheral device having memory storage capabilities, and when connected with an internet-linked device can provide similar function and benefits.

Additionally and/or alternatively, ADDnCLICK applications/tools can be accessed entirely over the internet, so that no part of it regularly resides on a user's internet-linked device. Therefore, the ADDnCLICK applications/tools could be accessed by a user using nearly any internet-linked device anywhere. Regardless whether the application/tools reside on a user device or on a remote server accessible to the user via the internet, the user will be able to benefit from upgrades, updates, and other enhancements to the application/tools.

A SSWE or virtual environment experience (collectively, shared social window experience) can include just one window of current users who are engaged in content metadata or can include all windows of those users that are engaged in the same/similar internet content topic acting as an overall "umbrella" for the content category that the original SSWE has created. For example, a Google search may return 1,000 search results relevant to metadata a user enters. One cannot look at all 1,000 results at the same time, so Google permits viewing the first of fifteen, and then the next fifteen, etc. Likewise, there could be many result pages in a SSWE.

Of course, social networks are not limited to only individuals. Therefore, according to an embodiment, a user can likewise be linked to an organization, a branch of government, or similar collective entities based on various parties in the social network and/or SSWE being linked based on the same or similar content and/or metadata.

ADDnCLICK applications/tools can evaluate content/metadata while a user continues to receive streaming content, and before the streaming completes, the user can be linked to one or more other users based on a similarity of the nature and/or metadata of the content. Likewise, ADDnCLICK social networks can be created based upon the content of various message types and/or content, whether composed or received by a user, including SMS or other text messages, voice, audio, photo, video, etc. social networks may also based upon and/or launched from 'usage learning' programs, online 'e-books', or other similar content that includes, suggests, or make explicit reference to other types of content/information. Further, an ADDnCLICK tool can suggest to a user other content and/or content-based social networks based upon the nature and/or metadata of content with which the user is engaged.

When connected with and participating in a social network of users who are engaged in the same/similar content, a substantial number of those users may be displayed, and therefore a specific social network may include two or more 'result pages', each including a finite number of users, user contributions, content-relevance search results, etc. A user will be able to scroll among and/or between pages to view results, links and/or interactions, and can select from among them at will to interact with the one or more of the other users. This capability helps present a manageable and organized interface to the user, simplifying use of the ADDnCLICK application/tools according to an embodiment.

A social network in embodiments can be launched from virtually any search process, including "hybrid search engines" that are designed to find and sort information stored on a network by using a plurality of separate bodies of metadata. This can include ranking algorithmic processes from: (1) hyperlink references to a given web page (i.e., how many other sites link to a page); (2) hyperlink execution history (i.e., how often people click to open a particular link); (3) metadata derived from a web crawler (i.e., complete index of all websites or other suitable alternatives). Such hybrid search engines compare a set of content metadata derived from a web crawler or taxonomic analysis of all internet text, a user search query, and one or more sets of content metadata that can, for example, include situational metadata derived from the client's network that would model the context awareness (as a means of information content) of the client.

An ADDnCLICK social network can link users together from 'context aware' applications, such as applications that are concentrated around virtual and/or augmented reality. One common way in which humans remember things is by associating them with a current 'context' that they are engaged in, such as when, where and with whom something happened or is happening, or what else is happening concurrently (i.e., what song is playing when something happens). Context, therefore, is any information that can be used to characterize the situation of an entity, and forms a framework for a particular event or occurrence of content. Context awareness is the idea that societies may be constructed, yet because they are still based on reality, they should be aware of the history and context surrounding social interactions. In ad-hoc social networks such as ADDnCLICK, context awareness can be used to link users together into social network communities, not only based on the persons available at a certain site, but also based on additional contextual information that is being gathered regarding the users of the ADDnCLICK social network. The ADDnCLICK social network can use "context awareness" information among its users to link them to others who are engaged in the same/similar context of the situational content metadata they are engaged in relative to live or historically accessed contexts.

There can be widgets within a SSWE enabling interne voice, video, and/or text communications between one SSWE and at least one other SSWE, to link users together who are engaged in the same/similar content. These widgets, in an embodiment, can also be used for communications between a user within a SSWE and others who are not within the SSWE, but who are engaged in the same/similar content elsewhere on the internet.

Widgets can be used within an SSWE to send (e.g., transfer, share) its contents to another SSWE or to a specific individual within a SSWE, and can then use that content to establish socialization links among users who become engaged in the content that has been transferred/shared. These widgets can be used to establish communications from an outside source to a specific individual or to an entire group of individuals in a particular SSWE. These widgets in the SSWE can be used for the delivery of advertisements to a specific individual or to all individuals with the SSWE. When engaged by a user, the advertisements can be used to link readers, viewers or listeners to others who are engaged in the same content or content having a similar form or context. These widgets could be "n-dimensional". Likewise, the SSWE can be n-dimensional.

Internet users can be linked to others who are engaged in (either reading, viewing or listening) advertisements in Virtual Worlds (e.g., virtual environments). As they click on, enter, view, read and/listen to an Advertisement in a Virtual World, users can be linked to each other (in or outside of the Virtual World) based on the same and/or similar metadata descriptors of these ads or of content they are engaged in outside of the Virtual World advertisement.

Socialization can be extended to users "within" ads (non-Virtual World ads) to generate "social" ads among users who are interested in being linked to others in the ad, or alternatively outside of the ad but still on the interne.

Internet users can be linked together within n-dimensional Virtual Worlds that are within other n-dimensional Virtual Worlds (parent worlds). Thus, they can be linked to each other or to any internet user within or outside the Virtual World who is engaged in the same/similar metadata description for the content or the context of the Virtual World, and by any internet content that each user is engaged in.

Conversion of a Shared Social Window Experience into a Widget for Placement within Internet Content and/or Internet Locations.

An existing SSWE can be placed in a widget on a webpage, website, video, text or other location within content or on the actual content (such as on a photo) on the internet. These SSWE widgets can be used to show users one or more snapshots of one or more SSWE's that are being formed and currently being occupied by others who are engaged at that same time on the same/similar content.

A user can click on the SSWE widget and be transported into the SSWE that he has clicked on, and will be connected into a social network with others who are engaged in that SSWE.

A user can drag and drop an SSWE widget to their desktop to monitor and have immediate access to others are who engaged in the same/similar content of the original SSWE, and whose metadata has been stored in the SSWE widget.

SSWE widgets can be embedded into blogs and other internet content. They can also be inserted and propagated throughout the internet like "blidgets" (blogs that are turned into widgets and embedded virally into any place or content on the internet).

In an alternative embodiment, after being linked to others who are engaged in the same/similar content, users can be sent to an internet-based map (e.g., Google Earth) to see where (on earth or within some specific geographic location) the content was originated from or that is the subject matter of the content. The user can then use that internet mapping system to be linked in a social network with others who are located at or near that same location and who are online at that time. For example, geographic coordinates associated with a map as metadata can be related to locations of users via I.P. addresses, etc. In a similar way, live social networking can be enabled based on a user's interaction with or actions relative to a mapping program or other topographic, cartographic or other geographic-centric content.

Figure 12A:
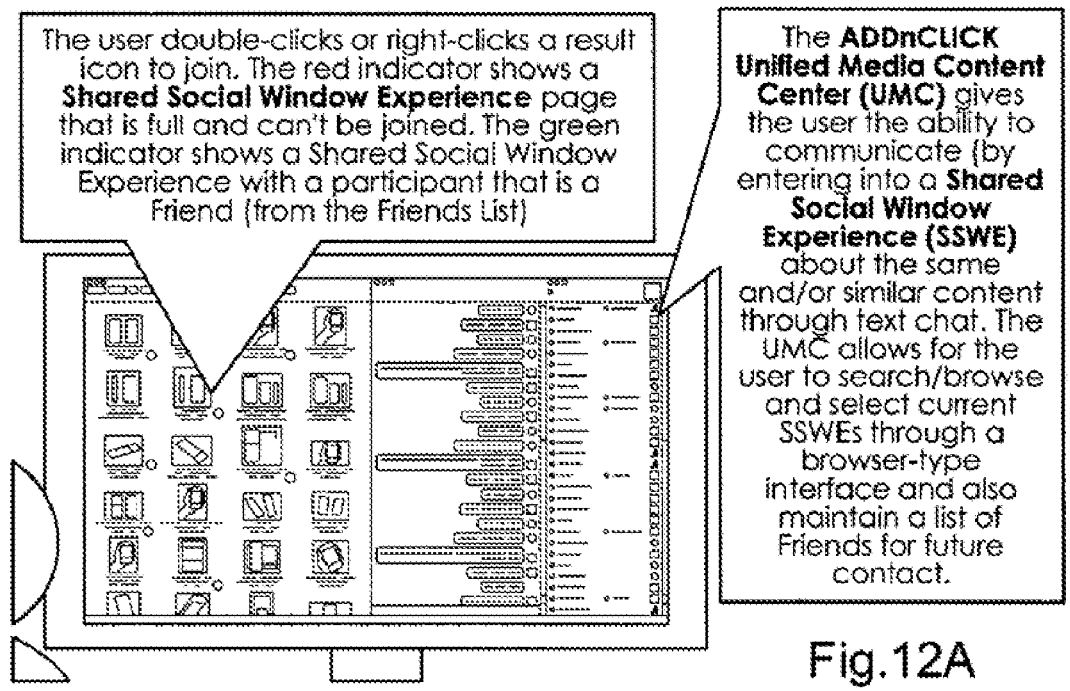
Figure 12B:
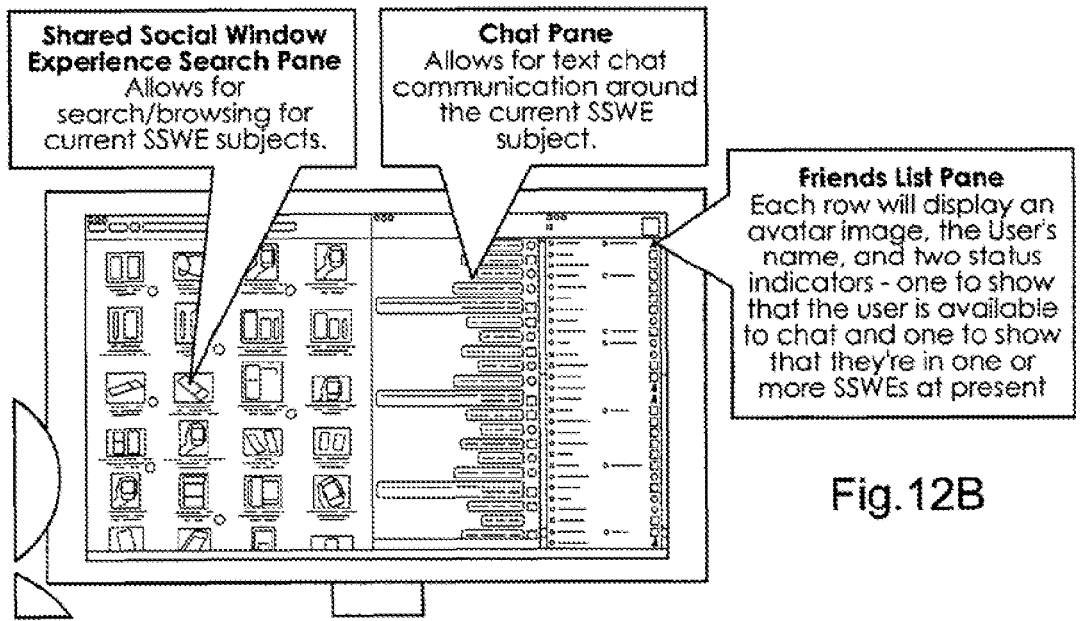

FIGS. 11A-11I describe and depict exemplary embodiments related to the function, purpose, and acquisition of ADDnCLICK tools for social networking. Such tools include, among others, a Unified Media Center (UMC) and a Same/Similar Content Viewer (SSCV). An embodiment of a UMC is shown in FIGS. 12A-12C in more detail, although alternative embodiments also fall within the conceived scope of the invention. FIG. 12C in particular suggests numerous methods by which links can be created between users based on same or similar content being viewed by the users.

Also shown in FIGS. 13A-13H is another ADDnCLICK tool enabled method for linking users based on viewing the same and/or similar content based on tagging and connecting.

Figure 13B:
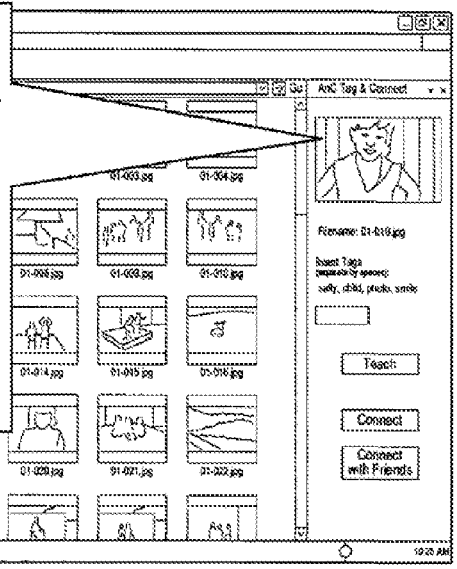
Figure 13C:
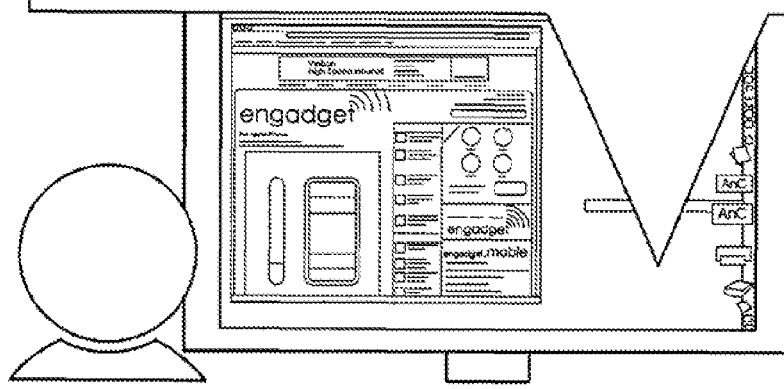
Figure 13D:
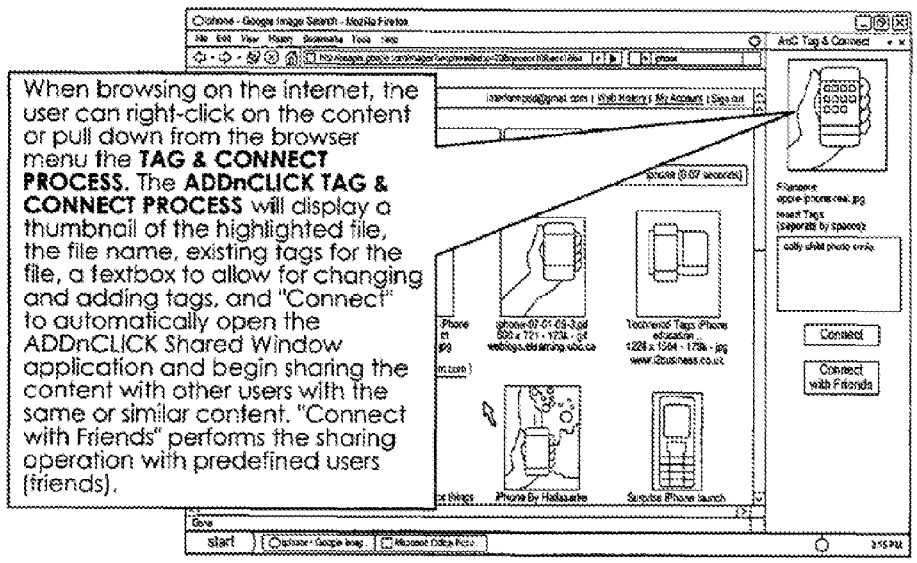
Figure 13E:
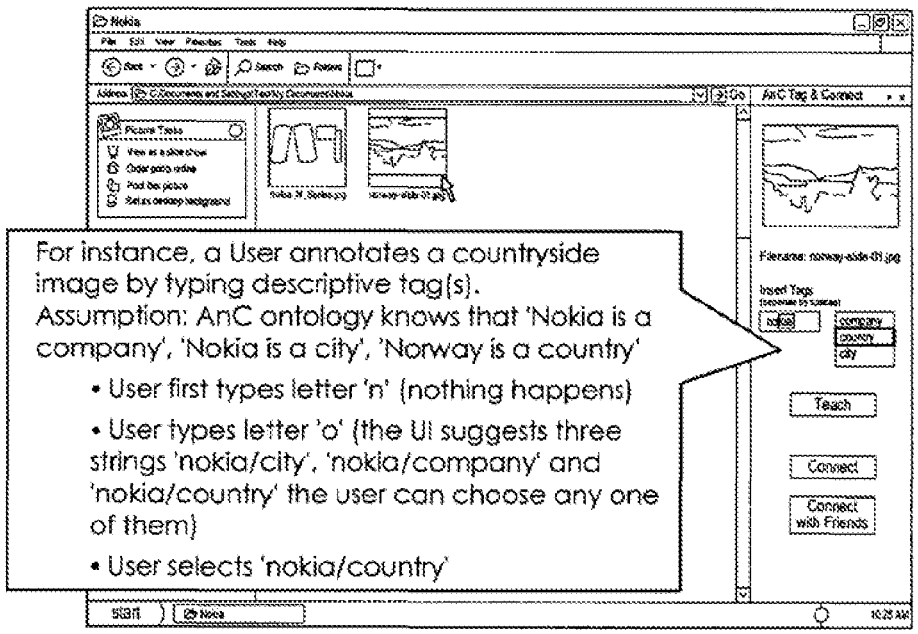
Figure 13F:
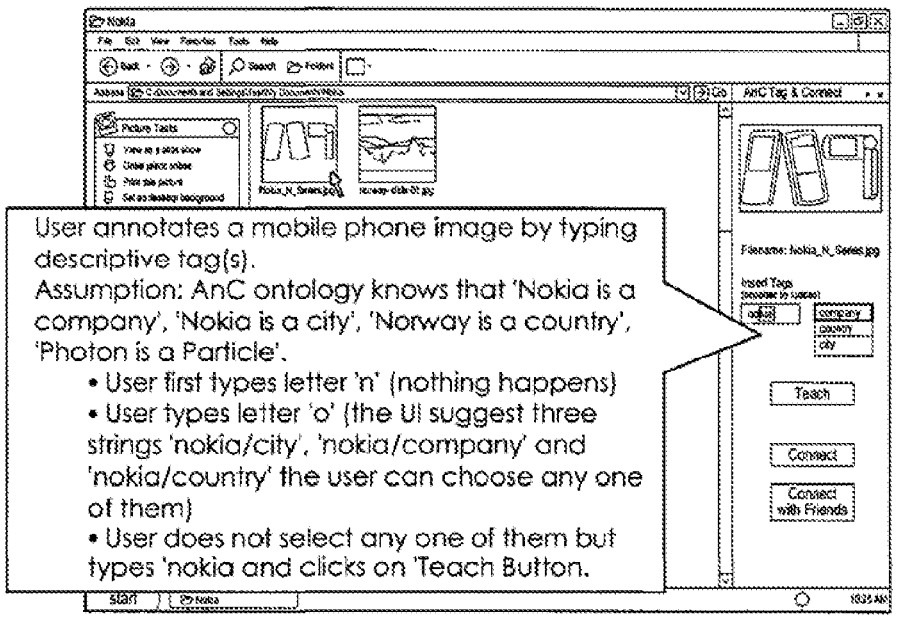
Figure 13G:
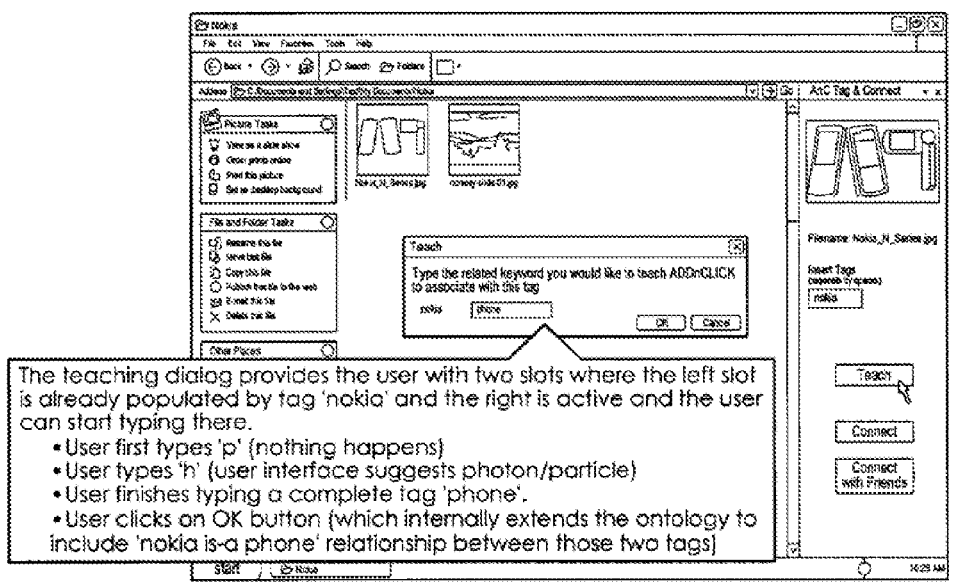
Figure 13H:
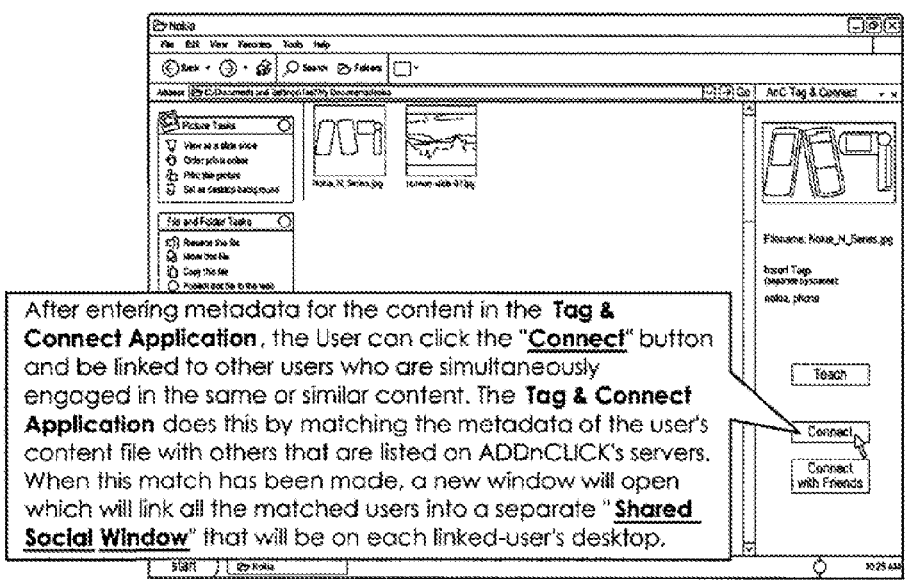
Figure 14A:
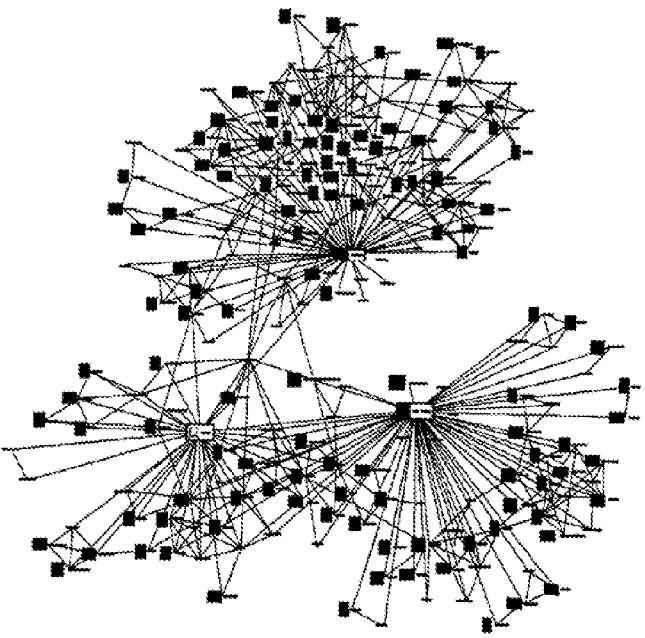

FIG. 13C illustrates that a user can initiate a tag and connect process by dragging a link (or other content) to a UMC, by pressing a button in a browser plugin/extension, or by clicking a link in a browser and choosing an appropriate menu selection from a context menu, although the embodiments are not so limited and other methods can also be similarly configured to initiate a tag and connect process. FIGS. 13F-13H depict a portion of a tagging and connecting process including an ontologically configured auto-fill and teaching capability. This capability interprets input information to present to the user options for tagging. The user can select one of the options, and/or can enter custom information to be used for tagging content and connecting with other users viewing the same or similar content.

FIGS. 14A-14D depict an ontological visual mapping method a user can use to view relationships between content viewers based on, for example, relatedness of content. The user can select avatars in the visual mapping which represent the user and/or content being viewed by the user, with those located closer to the center being more closely related to the user's content than those located toward the periphery. The user can choose to link to one or more users presented in the visual map. Numerous methods for selecting and linking to one or more users using a visual mapping method are conceived within the scope of the invention, such as dragging and dropping avatars, activating and selecting options from a menu, etc. This constitutes still another embodiment of a method and/or system for linking users based on same/similar content.

FIGS. 15A-15C describe exemplary benefits obtainable using the social networking methods and/or systems described herein, as well as some methods for obtaining the tools and capabilities to take advantage of such social networking methods and/or systems.

FIGS. 16A-16E depict various potential uses and benefits of the methods and/or systems described herein, while FIGS. 17A-17B depict some exemplary revenue models according to embodiments of the described methods and/or systems.

ALTERNATIVES AND ADVANTAGES

Those of skill in the art also will appreciate that any one or more of many available software development tools lend themselves to use in straightforwardly implementing (e.g. coding) the invention, and are contemplated as being within the capabilities of those of ordinary skill in the art with an understanding of the present application.

Thus, it will be understood that the present invention is not limited to the methods or the detail of construction, fabrication, material, application or use, as described and illustrated herein. Indeed, any suitable variation of fabrication, use, or application is contemplated as an alternative embodiment, and thus is within the spirit and scope, of the invention.

From the foregoing, those of skill in the art will appreciate that myriad advantages of the present invention include, but are not limited to, the following:

(a) The invention uniquely links users in a social network environment to each other by linking them to the same and/or similar metadata tags (or other descriptive data/definitions/ tags/formats) of the Content they are reading, viewing, listening to, bookmarking, searching, having delivered to them in push and pull applications, etc.: the descriptor tags (the metadata) of the Content are the basis for linking users in a social network. Therefore, all Content on the Internet can be used as the primary and underlying basis for forming social networks.

(b) The invention does not limit social networking to linking users to only other users of the same internet community or website. Instead, the invention enables users to be connected to any and everyone throughout the entire web—to any or all web communities, to any or all web users, to any or all web sites, to any or all web applications containing content or links to content and the descriptor tags (metadata) of that Content.

(c) Since the invention utilizes all Content on the internet and since it can be deployed ubiquitously among all web communities, the invention represents a new underlayer within the internet that makes the offerings of every web community a richer experience for their users. The invention does not compete against the existing web communities—it complements and enhances their offerings to users through the experience of connecting users to each other by linking them to the same and/or similar metadata tags (or other descriptive data/definitions/tags/formats) of any/all Content on the internet they are reading, viewing, listening to, bookmarking, searching, having delivered to them in push and pull applications, been invited to, etc.

(d) The invention enables a richer experience (through the gathering of Users and interactions in a social network) for numerous online activities including: (i) shopping; (ii) education; (iii) ecommerce; (iv) training; (v) communications; (vi) simultaneous sharing of displayed information on internet-connected Devices (e.g., desktop sharing, web browser sharing, etc.); (vii) searching; (viii) push & pull applications; (ix) anonymous communications; (x) new forms of game development and game environments; (xi) rich presence; and ether suitable alternatives.

(e) The invention, through its use of language translation among users and Content, helps to narrow the internet's global and regional language divide.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A method for associating network-linked users with one another based on mutually-expressed indications of interest in device-accessible content, comprising:

registering a user at a central user registry, the registering including recording at a non-transitory data storage medium information corresponding to an identity of the user;

delivering to the registered user device-executable instructions configured, when executed by processing circuitry of a device network-linked to the user registry, to enable the user to register content at a central content registry, wherein the registration of the content includes:

storing metadata of the content at a non-transitory data storage medium of the content registry, and associating with the content a marker comprising coded instructions configured, when executed on a data processing device, to present to the user a graphical user interface (GUI) object which, when selected by the registered user, initiates a network link with another user;

detecting an action of another registered user upon content having metadata;

detecting one or more similarities between metadata of content registered by the user and the metadata of the content acted upon by the other user;

providing an interactive, network-enabled link between the registered user and the other registered user in response to selection by the registered user of the marker displayed at a display device associated with the registered user; and opening a new window on the user's display device in response to the registered user selecting the marker, wherein:

the window includes a thumbnail representation of the content with which the marker was associated;

the new window is configured to present to the registered user and to the other registered user a representation of a three-dimensional environment; and selecting an advertisement displayed within the three-dimensional environment, by an action of the registered user relative to the advertisement, causes the three-dimensional environment to display additional content posted by a sponsor of the advertisement.

2. The method of claim 1, wherein the new window also includes a thumbnail representation of the content acted upon by the other registered user.

3. The method of claim 2, further comprising:

causing a display device associated with the other registered user to display a same item of content that is concurrently displayed to the registered user via the PCW.

4. The method of claim 1, wherein the new window also includes a representation of an advertisement posted by a sponsor of the advertisement.

5. The method of claim 1, wherein the new window includes controls enabling the registered user to invite other users to join the network-enabled link between the registered user and the other registered user.

6. The method of claim 1, wherein the environment includes at least one representation of a vertical surface upon which content can be displayed to the registered user.

7. The method of claim 1, wherein either of the registered user and the other registered user is represented as an avatar within the three-dimensional environment.

8. The method of claim 1, wherein the new window is a persistent client window (PCW).

9. A method of marking network-accessible content for network-enabled, content-based interaction between users, comprising:

receiving via a network connection data indicating a user identity;

confirming at a central user registry that the user identity corresponds to a registered user;

receiving via the network connection metadata of a selected content item;

recording the received metadata at a central content registry; and associating coded instructions with the selected content item, wherein the instructions are configured, when executed on a data processing device, to:

insert a user-viewable and selectable icon at a portion of the content item; and in response to selection of the icon by the registered user or another user, to open a persistent client window (PCW) graphical user interface (GUI) at a display device associated with the registered user, wherein the PCW depicts a three-dimensional environment and includes two or more content display panes at which content can be simultaneously displayed to a user; and providing a means for the registered user and the other user to interact via the PCW, wherein the means comprises one or more selected from the group consisting of a text messaging portion, a video messaging portion, a voice messaging portion, and suitable messaging portion controls.

10. The method of claim 9, wherein the coded instructions are further configured, when executed in response to selection of the icon, to establish a network-enabled link between the registered user and the other user.

11. The method of claim 9, wherein the PCW includes a depiction of the content item.

12. The method of claim 9, wherein either or both of the registered user and the other user are depicted as avatars in the PCW.

13. The method of claim 9, wherein the PCW further includes one or more advertisements visibly displayed to either or both of the registered user and the other user.

14. The method of claim 13, wherein the one or more advertisements are relevant to information submitted to the central user registry by either or both of the registered user.

* * * * *